United States Patent [19]
Ono et al.

[11] Patent Number: 6,036,214
[45] Date of Patent: Mar. 14, 2000

[54] BICYCLE WITH ANTITHEFT DEVICE

[75] Inventors: Takao Ono, Osaka; Masahiro Ito, Higashi-Osaka; Hiroshi Nakano, Yao; Atsushi Kohama, Osaka; Takehiro Miyoshi, Kashiwara; Masashi Kawasaki, Kashiba; Hideki Yamamoto, Fujiidera; Hiroshi Iwamoto, Tondabayashi; Mitsuo Suzuri, Amagasaki; Futoyoshi Morimoto, Osaka, all of Japan

[73] Assignee: Matsushita Electric Industrial Co., Ltd., Japan

[21] Appl. No.: 08/987,248

[22] Filed: Dec. 9, 1997

[30] Foreign Application Priority Data

Dec. 20, 1996 [JP] Japan .................... 8-340276
Apr. 16, 1997 [JP] Japan .................... 9-097816
Oct. 2, 1997 [JP] Japan .................... 9-269102

[51] Int. Cl.⁷ ............................. B62H 1/00
[52] U.S. Cl. .................. 280/288.4; 280/297; 70/233
[58] Field of Search .................. 280/288.4, 293, 280/295, 297

[56] References Cited

U.S. PATENT DOCUMENTS

| | | | |
|---|---|---|---|
| 4,095,823 | 6/1978 | Nishida | 280/764 |
| 4,444,407 | 4/1984 | Calmonte et al. | 280/297 |
| 4,571,965 | 2/1986 | LeRoux | 70/226 |
| 4,841,757 | 6/1989 | Guthrie | 70/236 |
| 5,114,167 | 5/1992 | Shieh | 280/297 |
| 5,433,552 | 7/1995 | Thyu | 403/378 |
| 5,618,052 | 4/1997 | Rendall | 280/288.4 |
| 5,678,435 | 10/1997 | Hodson | 70/233 |

FOREIGN PATENT DOCUMENTS

| | | |
|---|---|---|
| 0630802 A2 | 12/1994 | European Pat. Off. |
| 0729878 | 9/1996 | European Pat. Off. |
| 0849148 A2 | 6/1998 | European Pat. Off. |
| 58-75092 | 5/1983 | Japan . |
| 57-33585 | 2/1992 | Japan . |
| 8-104269 | 4/1996 | Japan . |
| 8-239071 | 9/1996 | Japan . |
| 8-310463 | 11/1996 | Japan . |
| 1105756 | 4/1999 | Japan . |

*Primary Examiner*—Paul N. Dickson
*Assistant Examiner*—Daniel Yeagley
*Attorney, Agent, or Firm*—Parkhurst & Wendel, L.L.P.

[57] ABSTRACT

The present invention provides a bicycle equipped with an antitheft device of the type which suspends the function of the bicycle as by locking the saddle in unridable form and which requires a fewer number of operating steps for parking the bicycle. The bicycle is characterized in that it is provided with a key device for locking the saddle in the parked state, a stand locking device for locking the stand in the erected state, and a connecting rod which is adapted to be pulled up in operative connection with the turning movement of the saddle from the in-service state to the parked state and whose lower end is connected to the stand locking device. When the saddle is turned to the parked state, the connecting rod is pulled and the stand is locked by the stand locking device. When the saddle is turned to the in-service state, the connecting rod is depressed to cancel the locked state.

9 Claims, 47 Drawing Sheets

FIG.1
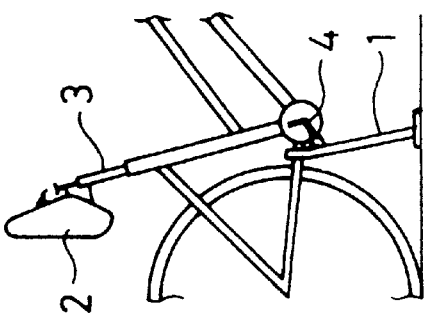
(a)
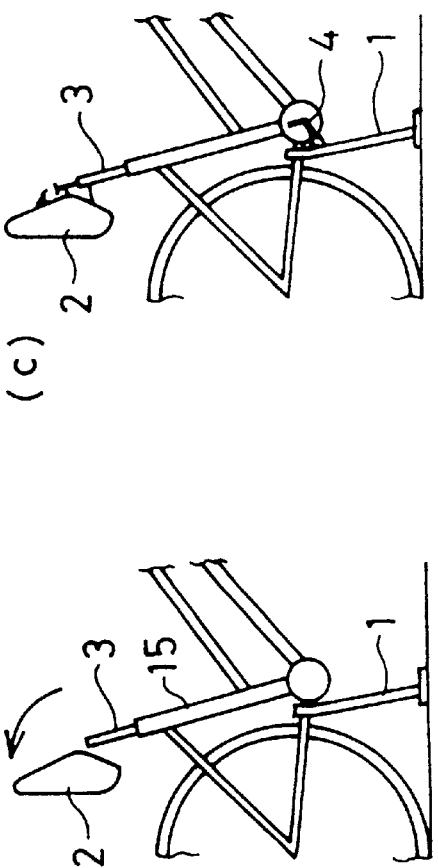
(b)
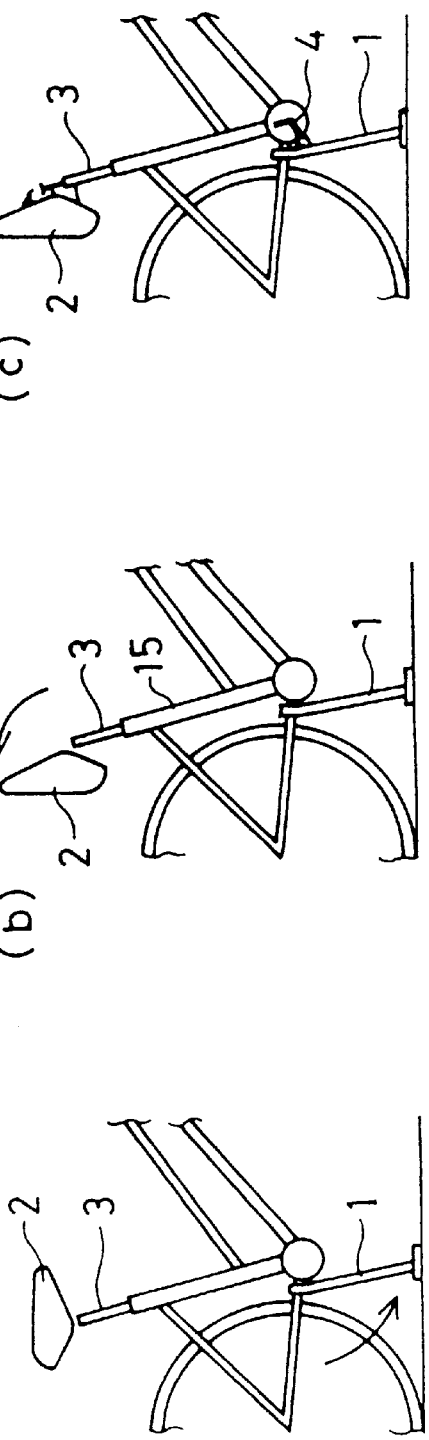
(c)
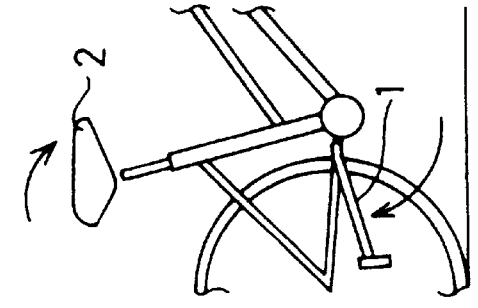
(d)
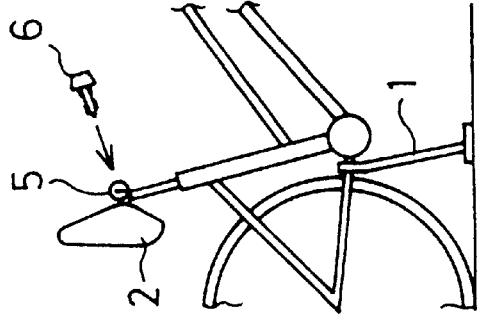
(e)
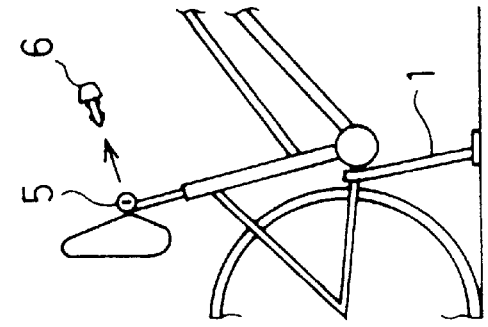
(f)

FIG.3
(a)
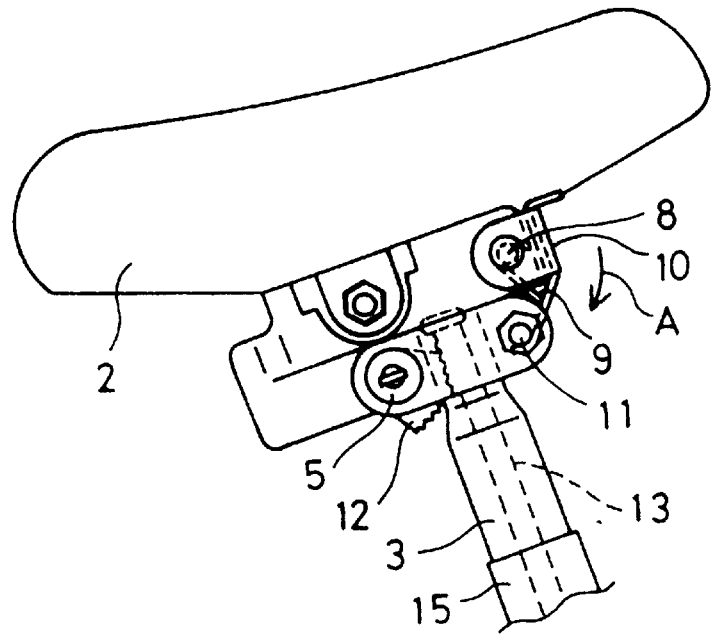
(b)
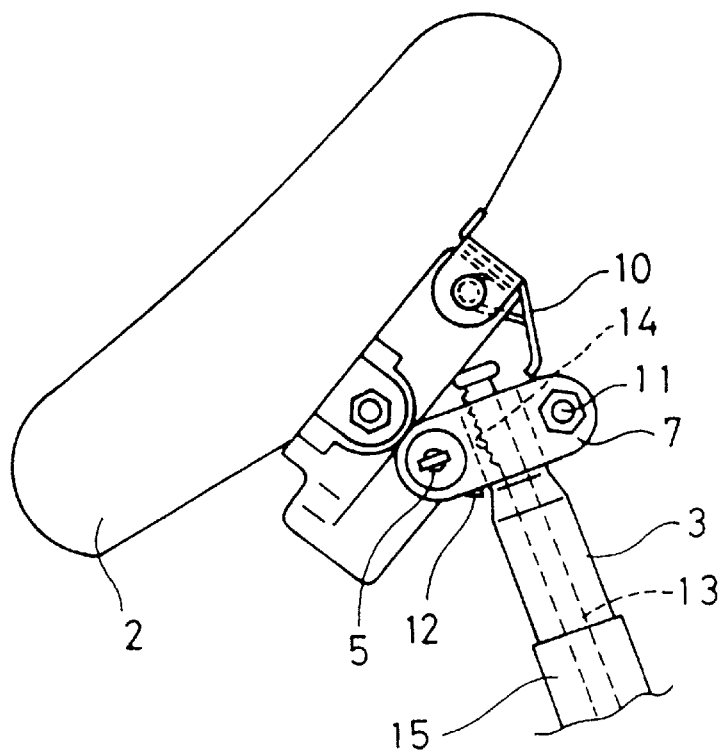

FIG.4
(a)
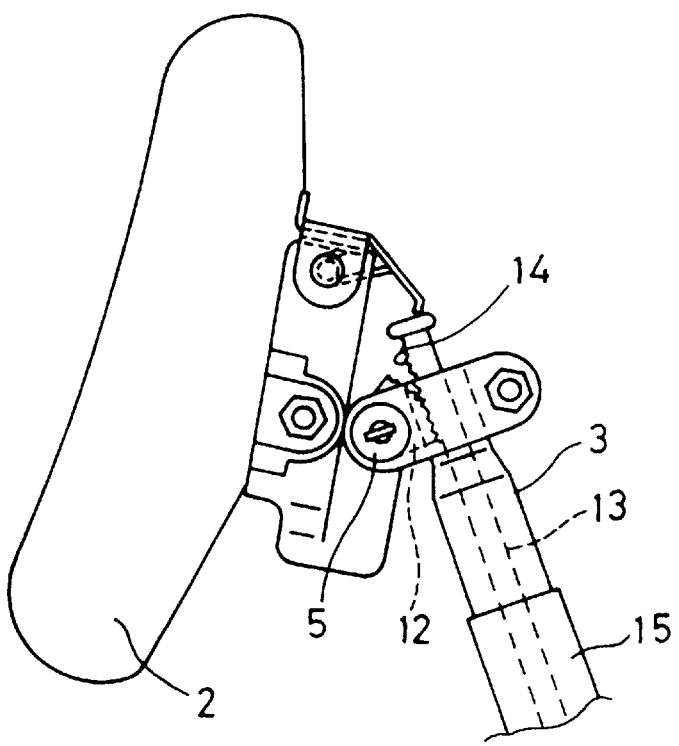
(b)
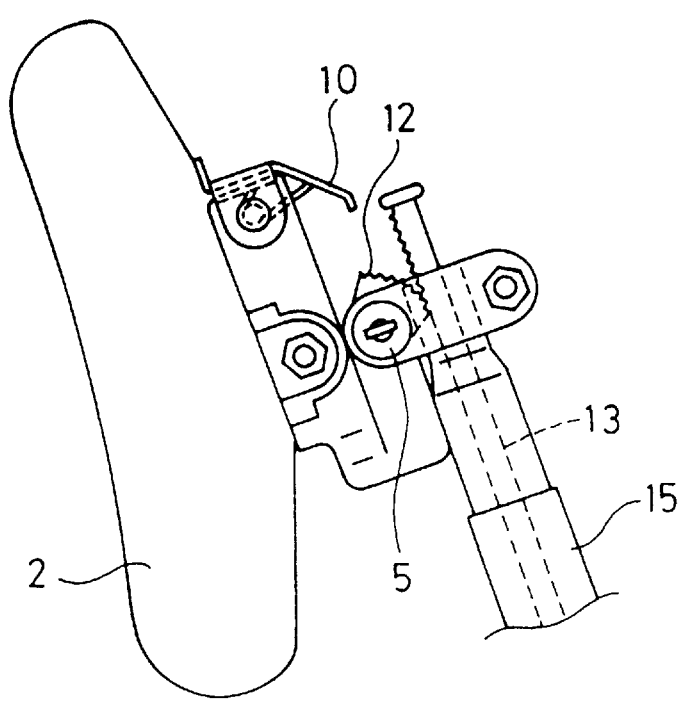

FIG.10
(a)
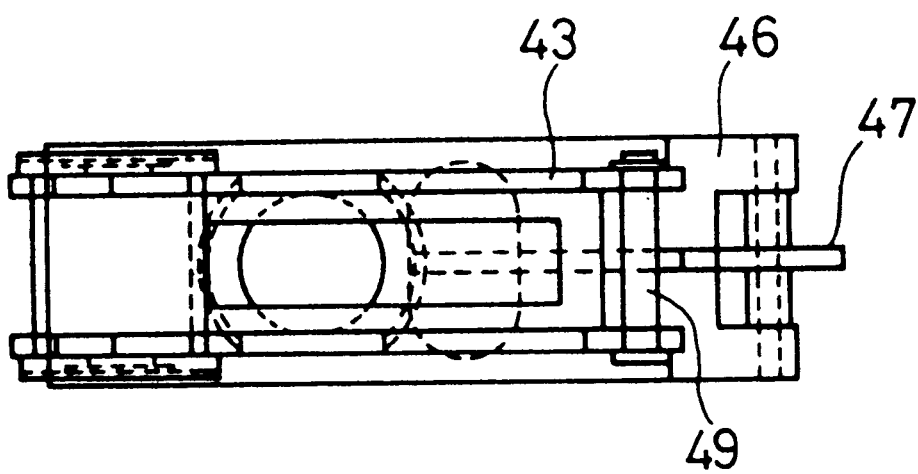
(b)
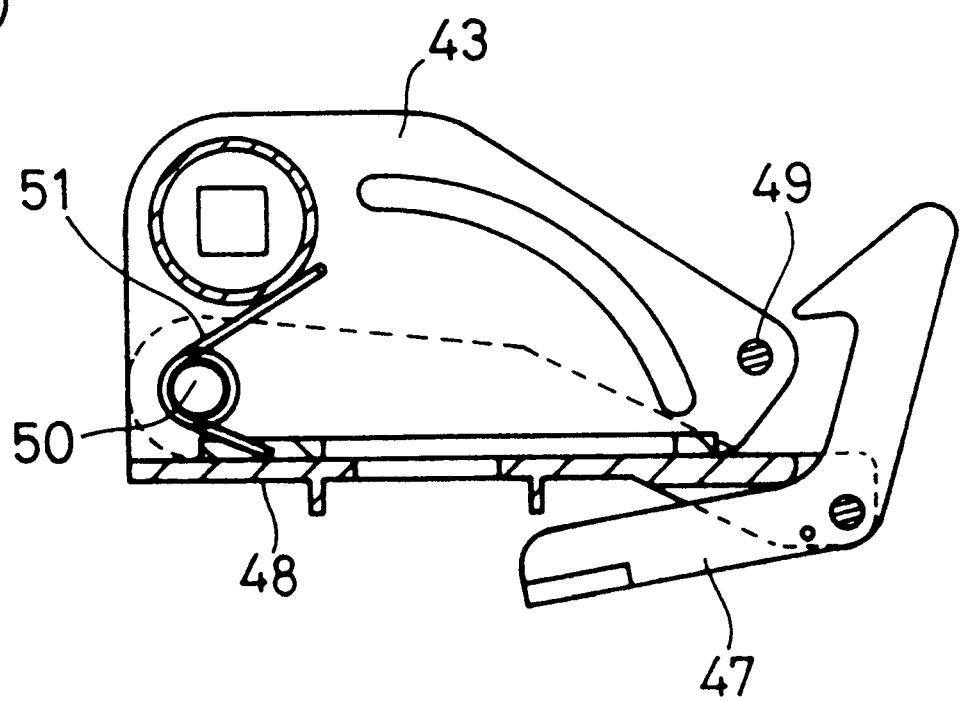

FIG.13
(a)
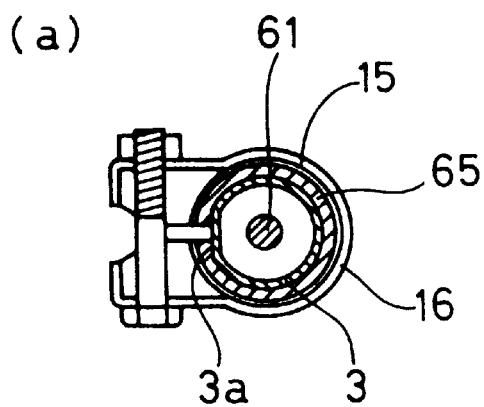
(b)
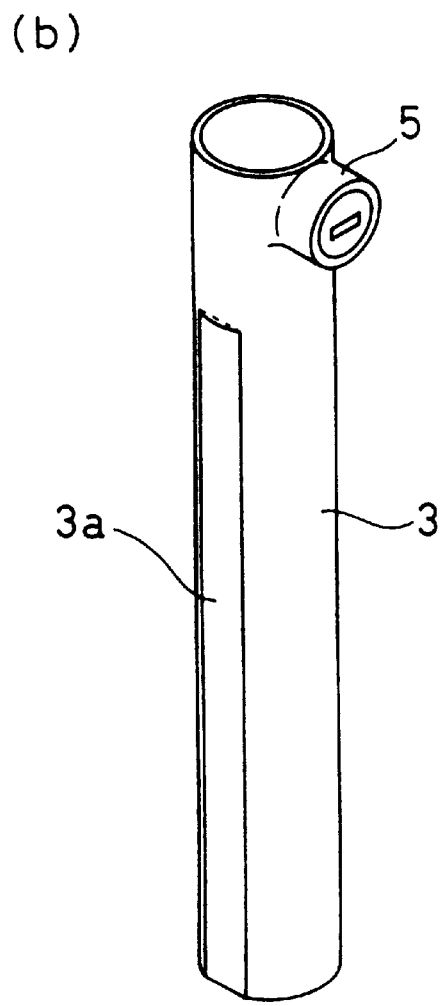

FIG.20
(a)
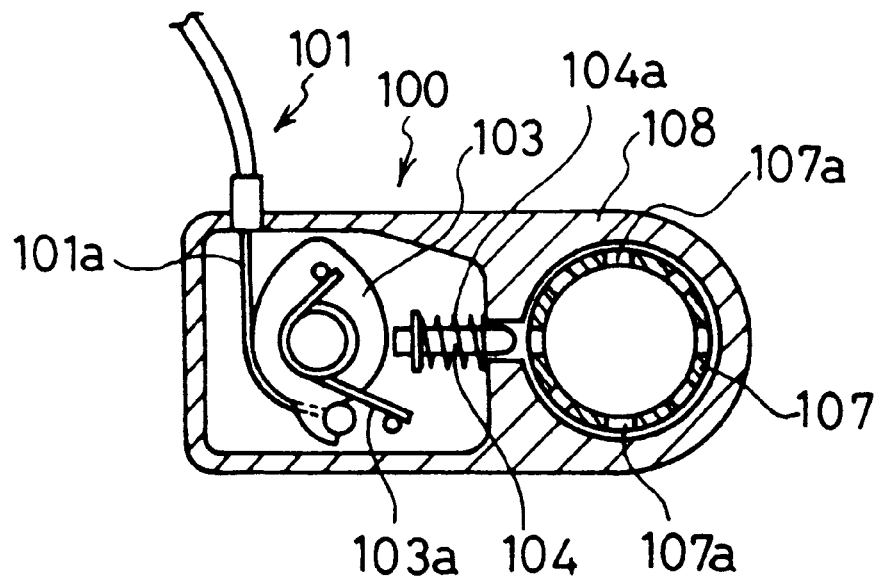
(b)
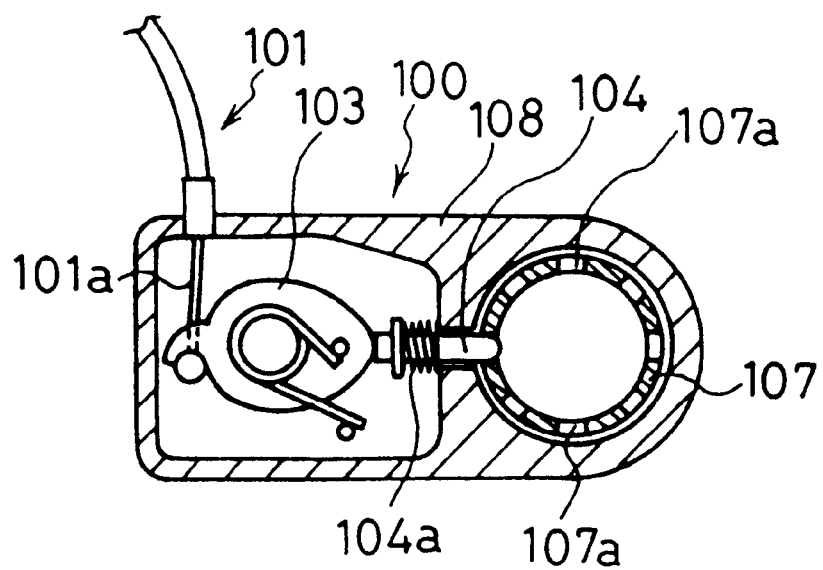

FIG.24
(a)
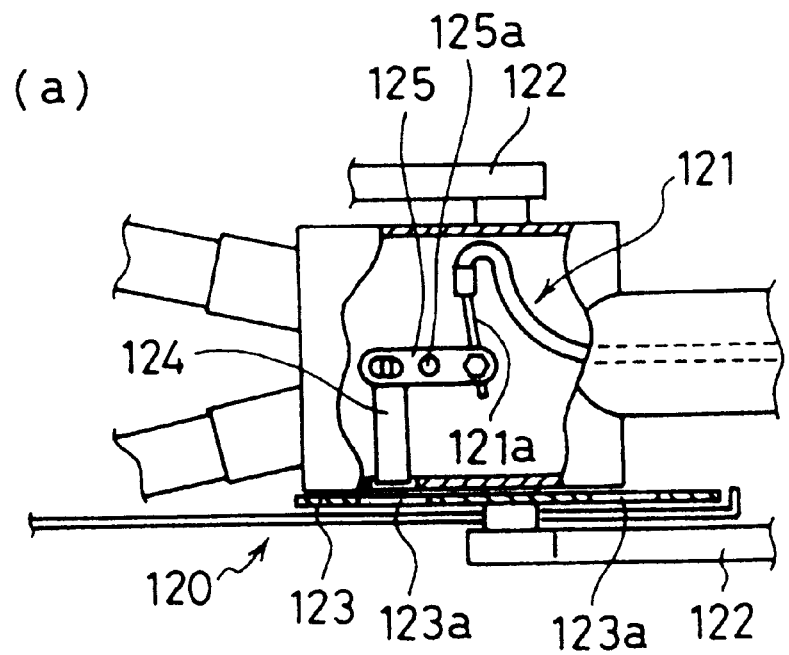
(b)
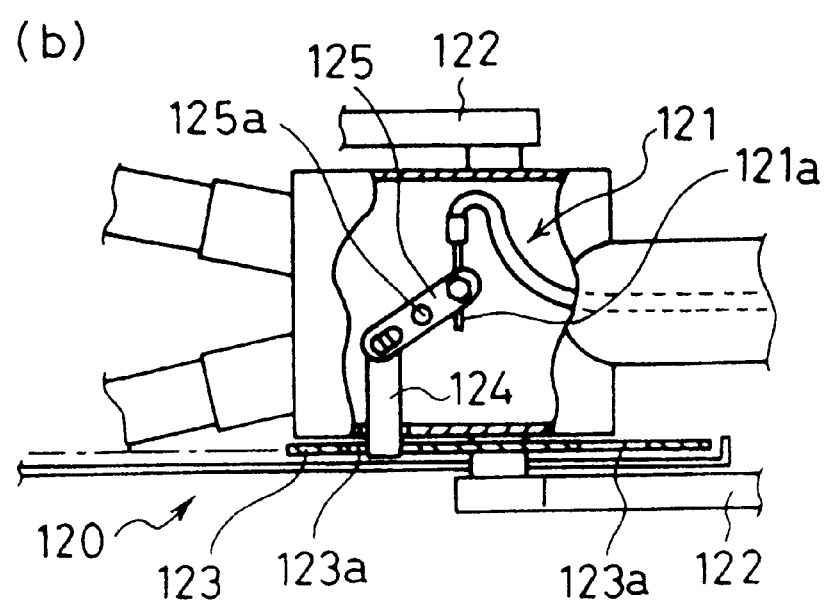

FIG. 28
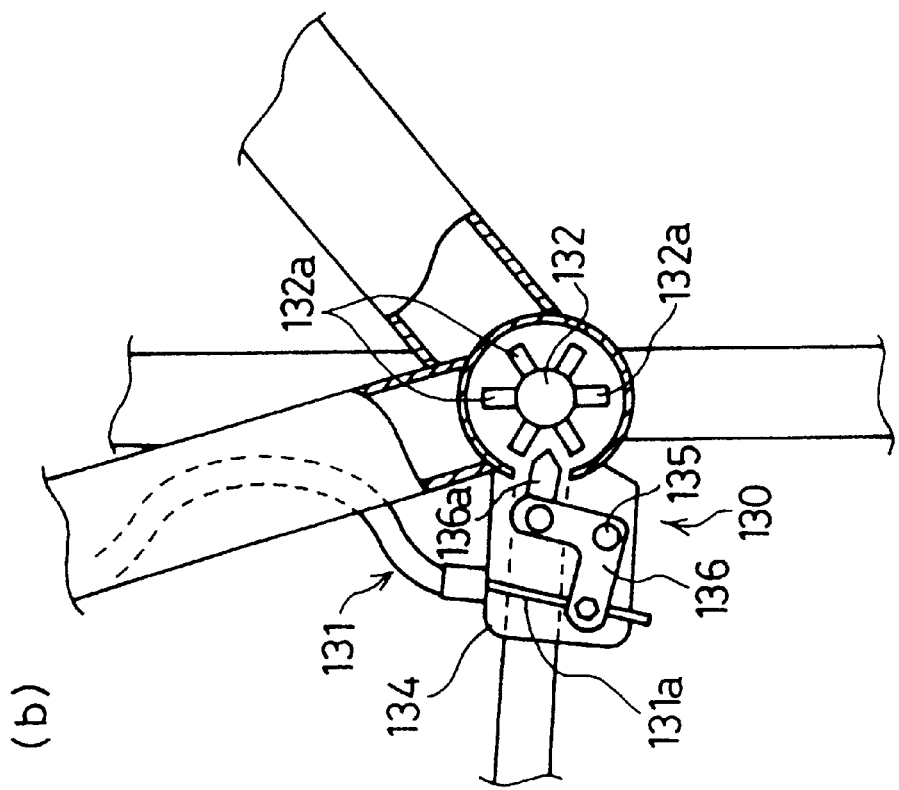
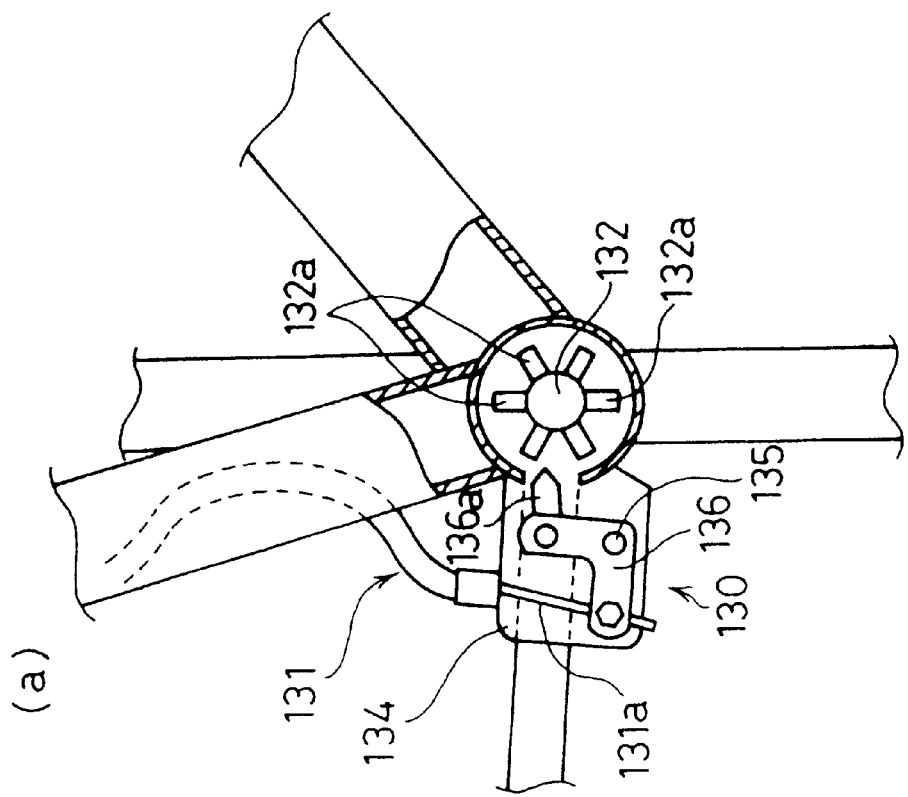

FIG.32
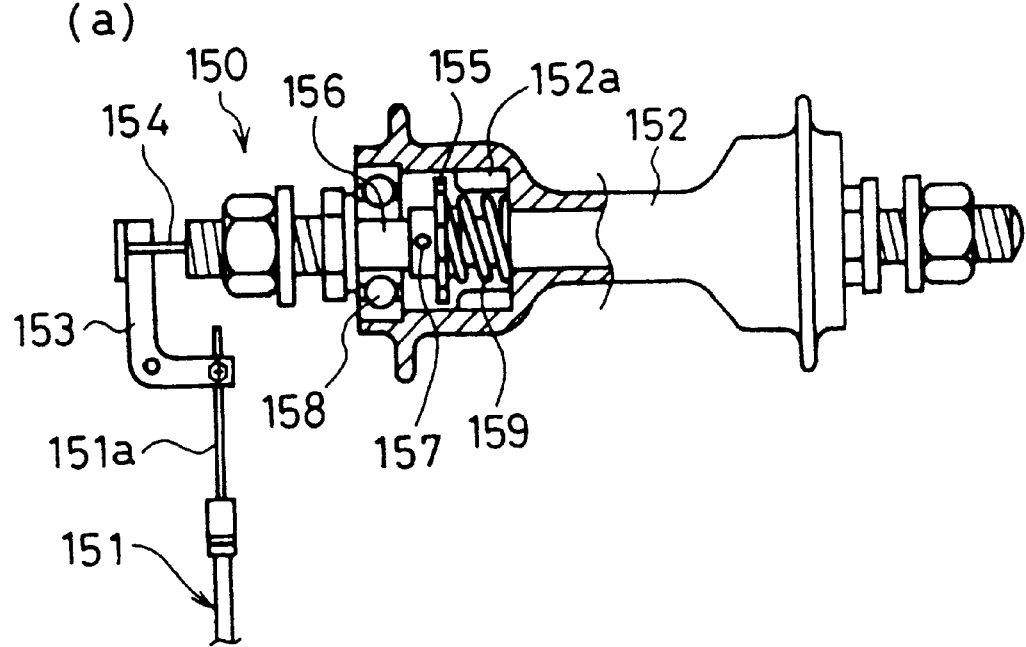
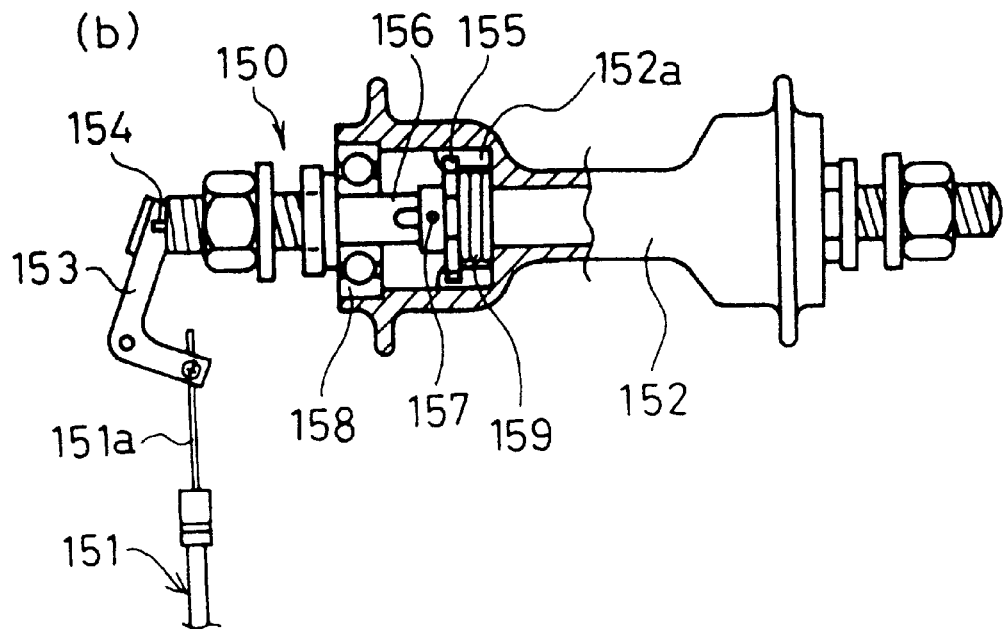

FIG. 35
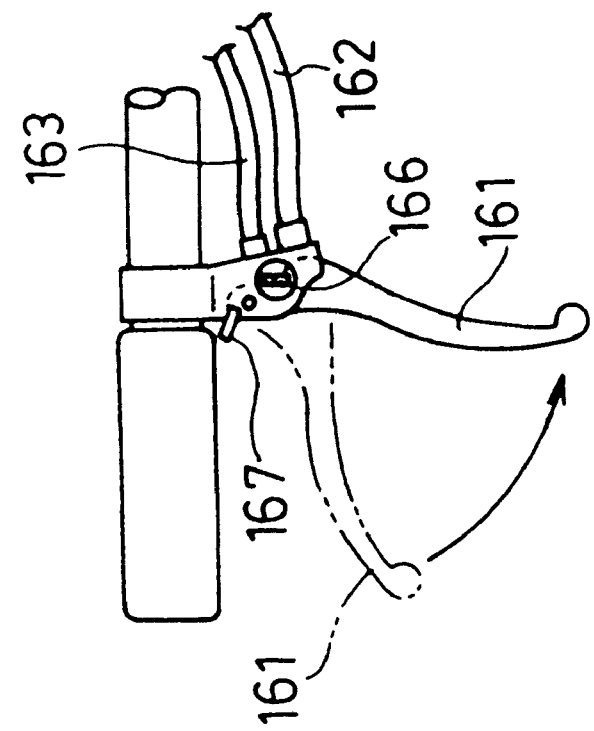
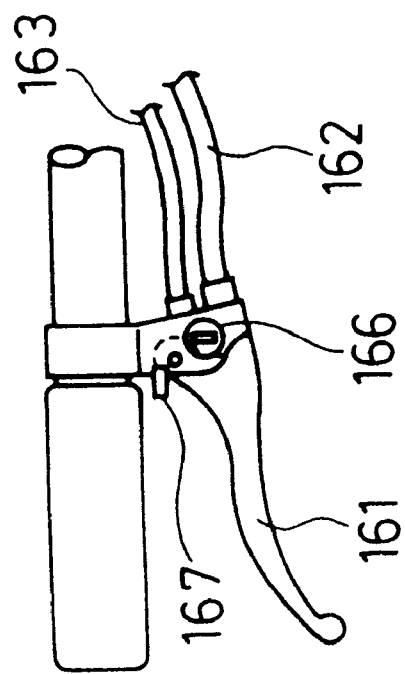

BICYCLE WITH ANTITHEFT DEVICE

FIELD OF THE INVENTION

The present invention relates to a bicycle with an antitheft device.

BACKGROUND ART OF THE INVENTION

To prevent bicycles from being stolen during parking, various locks have heretofore been proposed, the conventional locks being constructed such that when the lock is applied to the front or rear wheel, it prevents the rotation of the wheel.

Such locks, however, pose a problem that they allow a person who is going to commit an illegal act to form a notion that it is possible to break the lock and ride away with the bicycle.

Accordingly, another type of antitheft device different from a lock may be contemplated which is adapted to lock the saddle itself in an unridable form which gives a notion of "unridableness", thereby preventing theft.

Even if such antitheft device which locks the saddle in an unridable form is to be employed, however, the legitimate bicycle owner has to perform three operations in parking his bicycle; erecting the stand, locking the thus-erected stand or applying a separate lock, and locking the saddle itself in an unridable form.

DISCLOSURE OF THE INVENTION

The present invention is intended to provide a bicycle having an antitheft device of the type which, though suspending the function of the bicycle, as by locking in an unridable form the saddle itself which is one of the functional means constituting the bicycle, requires a fewer number of operations in parking the bicycle.

A bicycle with an antitheft device as described in an embodiment is provided with a plurality of functional means, which differ in function, constituting the bicycle, and function suspending means for suspending the functions of said plurality of functional means in operative connection with each other.

According to this arrangement, actuation of the function suspending means suspend the functions of the plurality of functional means in operative connection with each other. Therefore, a plurality of functions can be suspended by a fewer operations, whereby theft can be reliably prevented.

A bicycle with an antitheft device as described in another embodiment constructed such that the plurality of functional means comprise functional means with which the rider of the bicycle comes in contact during the running of the bicycle and functional means with which he never comes in contact, and the function suspending means locks one of said two functional means to thereby suspend the function thereof.

According to this arrangement, actuation of the function suspending means causes the functional means with which the rider comes in contact and the functional means with which the rider never comes in contact to have their functions to be suspended in operative connection with each other, thereby effectively suspending the functions of the plurality of the functional means to make prevention of theft further reliable.

In addition, the functional means of the bicycle in each embodiment are the saddle, frame, pedal torque transmitting means, wheels and other components which perform various functions in the bicycle. Further, as for the direction of operative connection, it may be a predetermined one direction or mutually opposite directions may be used.

A bicycle with an antitheft device as described in a further embodiment characterized in that it comprises a saddle supported with respect to a seat pillar such that it is movable between an in-service state and a parked state with the saddle seat surface inclined, a key device for locking the saddle in said parked state, a stand locking device for locking the stand in the erected state, and connecting means for bringing the stand locking device into a locked state in operative connection with the movement of the saddle from the in-service state to the parked state.

According to this arrangement, when the saddle is moved to the parked state, the connecting means is pulled up to lock the stand while the stand locking device is held in the erected state. When the saddle is moved to the in-service state, the connecting means is depressed to unlock the stand locking device.

A bicycle with an antitheft device as described in an embodiment characterized in that the connecting means is disposed inside the seat tube of the bicycle frame, this arrangement making the construction compact.

A bicycle with an antitheft device as described in another embodiment characterized in that it comprises a saddle supported with respect to a seat pillar such that it is movable between an in-service state and a parked state with the saddle seat surface inclined, a key device for locking the saddle in said parked state, a stand locking device for locking the stand in the erected state, and a connecting rod adapted to be pulled up in operative connection with the movement of the saddle from the in-service state to the parked state and having a lower end connected to the stand locking device, said connecting rod being disposed inside the seat tube and seat pillar of the bicycle frame, said connecting rod being provided with fixing means adapted to be actuated with the saddle put in said parked state for fixing the seat pillar with respect to the seat tube.

According to this arrangement, movement of the saddle to the parked state actuates the fixing means to fix the seat pillar to the seat tube, and even if a person attempts to vertically move or rotate the seat pillar with respect to the seat tube, said fixing means prevents the vertical or rotary movement of the seat pillar, ensuring a more reliable operation.

A bicycle with an antitheft device as described in a further embodiment comprises a bicycle frame, a rear wheel supported by said bicycle frame and connected to transmission means including a pedal and a crank, a front wheel supported by said bicycle frame, a handle supported by said bicycle frame, a saddle supported on a seat pillar installed on said bicycle frame, and a locking device for locking the bicycle in the non-running state, said bicycle being characterized in that said saddle is attached to said seat pillar such that it can be stopped at two positions establishing an in-service state and a parked state, said bicycle including elastic means for urging said saddle toward the parked position (the position of parked state), said saddle being supported such that it can be manually moved from the parked position to the in-service position (the position of in-service state) against the force of said elastic means, a first locking device for locking said saddle in the parked position, and a second locking device adapted to be actuated in operative connection with the movement of said saddle from the in-service position to the parked position for locking the bicycle in the non-running state.

According to this arrangement, when the saddle is moved from the in-service position to the parked position, the second device is automatically locked, providing satisfactory operability.

A bicycle with an antitheft device as described in the further embodiment characterized in that the second locking device is constituted by a stand locking device adapted to lock the stand in the erected state in operative connection with the movement of the saddle from the in-service position to the parked position.

According to this arrangement, when the saddle is moved from the in-service position to the parked position, the second locking device is automatically locked and the stand is locked in the erected state.

A bicycle with an antitheft device as described in another embodiment characterized in that it includes connecting means which transmits to the second locking device the movement of the saddle from the in-service position to the parked position, said connecting means being disposed inside the bicycle frame.

According to this arrangement, since the movement is transmitted by the connecting means which is not exposed to the outside, intentional damage to the connecting means can be prevented, so that the effect of theft prevention can be further enhanced.

A bicycle with an antitheft device as described in another embodiment comprises a bicycle frame, front and rear wheels supported by said bicycle frame, a handle supported by said bicycle frame, a saddle supported on a seat pillar installed on said bicycle frame, and a stand for supporting said bicycle frame and other components, said bicycle being characterized in that said saddle is attached to said seat pillar such that it can be stopped at two positions establishing an in-service state and a parked state, said bicycle including elastic means for urging said saddle toward the parked position, said saddle being supported such that it can be manually moved from the parked position to the in-service position against the force of said elastic means, and a first locking device for locking said saddle in the parked position, said first locking device being constructed such that it can be locked by the urging force of said elastic means and requires a key only when it is desired to undo the lock.

According to this arrangement, when the first locking device is to be locked, there is no need to use any key, thus further improving the convenient feature.

A bicycle with an antitheft device as described in an additional embodiment comprises a bicycle frame, front and rear wheels supported by said bicycle frame, a handle supported by said bicycle frame, a saddle supported on a seat pillar installed on said bicycle frame, and a locking device for locking the bicycle in the non-running state, said bicycle being characterized in that a key section for said locking device is disposed under said saddle and in that connecting means for transmitting the operation of said key section to the locking device is disposed inside the bicycle frame, the arrangement being such that operating said key section actuates said locking device.

According to this arrangement, the locking device for locking the bicycle in the non-running state is actuated in operative connection with the operation of the key section; therefore, when the key section is locked, the locking device is locked in operative connection therewith, thus improving the operability.

A bicycle with an antitheft device as described in another embodiment comprises a bicycle frame, a rear wheel supported by said bicycle frame and connected to transmission means including a pedal and a crank, a front wheel supported by said bicycle frame, a handle supported by said bicycle frame, a saddle supported on a seat pillar installed on said bicycle frame, and a locking device for locking the bicycle in the non-running state, said bicycle being characterized in that a key section for said locking device is disposed in the movable section of the bicycle and in that connecting means for transmitting to the locking device the movement of said movable section to the parked position is disposed inside the seat tube of the bicycle frame, the arrangement being such that said locking device is actuated in operative connection with the movement of said movable section to the parked position.

According to this arrangement, the locking device is actuated in operative connection with the movement of the movable section to the parked position; therefore, when the movable section is moved as by an action for locking the key section, the locking device is also actuated in operative connection therewith, thus improving the operability.

In addition, the movable section referred to herein is the saddle, the handle supported by the frame or the like which can be moved from the state of use or the normal ridable state to the parked state which inhibits riding, and the key section for said movable section may be arranged so that it is locked when the movable section is moved to the parked position or it may be locked by a separate key.

A bicycle with an antitheft device as described in another embodiment comprises a bicycle frame, a rear wheel supported by said bicycle frame and connected to transmission means including a pedal and a crank, a front wheel supported by said frame, a handle supported by said bicycle frame, a saddle supported on a seat pillar installed on said bicycle frame, and a locking device for locking the bicycle in the non-running state, said bicycle being characterized in that a key section for said locking device is disposed in the vicinity of said saddle, and in that connecting means for transmitting the operation of said key section to the locking device is disposed inside the seat tube of the bicycle frame, the arrangement being such that the operation of said key section establishes the operative connection between the fixing of the movable section of said bicycle and the actuation of said locking device, the center of said seat tube and the center of rotation of said crank being in the non-crossing state.

According to this arrangement, since the center of the seat tube and the center of rotation of said crank are in the non-crossing state, the connecting means provided in the seat tube is prevented from interfering with the crank.

A bicycle with an antitheft device as described in another embodiment comprises a bicycle frame, a rear wheel supported by said bicycle frame and connected to transmission means including a pedal and a crank, a front wheel supported by said frame, a handle supported by said bicycle frame, a saddle supported on a seat pillar installed on said bicycle frame, and a locking device for locking the bicycle in the non-running state, said bicycle being characterized in that a key section for said locking device is disposed in the vicinity of said saddle, and in that connecting means for transmitting the operation of said key section to the locking device is disposed inside the seat tube of the bicycle frame, the arrangement being such that the operation of said key section actuates said locking device, the interior of said seat tube being non-circular so as to prevent the seat pillar of any saddle in general use from being inserted therein.

According to this arrangement, even if someone pulls out the seat pillar from the seat tube and removes the saddle, trying to insert the circular seat pillar supporting a saddle in general use into the seat tube, it cannot be inserted since the interior of the seat tube is non-circular, whereby replacement by a saddle in general use is prevented; thus, the effect of theft prevention can be enhanced.

A bicycle with an antitheft device as described in another embodiment is characterized in that the seat tube of the bicycle frame supporting the seat pillar is formed with a hole, and a seat pillar slip-off preventing member which extends through said hole radially outwardly of the seat pillar is attached to the seat pillar, said seat pillar slip-off preventing member being removable from the seat pillar only by a special tool different from tools in general use.

According to this arrangement, since the seat pillar slip-off preventing member prevents the seat pillar itself from slipping off the interior of the seat tube, replacement by a saddle in general use can be prevented; thus, the effect of theft prevention can be enhanced.

A bicycle with an antitheft device as described in another embodiment is characterized in that the seat tube of the bicycle frame supporting the seat pillar is formed with a hole, and a seat pillar slip-off preventing member which extends through said hole radially outwardly of the seat pillar is fixed to the seat pillar by soldering or by using a thermoplastic resin adhesive agent.

According to this arrangement, since the seat pillar slip-off preventing member strongly fixed in position by soldering or by using a thermoplastic resin adhesive agent prevents the seat pillar from slipping off the interior of the seat tube, replacement by a saddle in general use can be prevented.

A bicycle with an antitheft device as described in another embodiment is characterized in that it comprises a saddle supported on a seat pillar such that it is movable between an in-service state and a parked state with the saddle seat surface inclined, a key device for locking the saddle in said parked state, and fixing means for fixing the seat pillar within said bicycle frame in operative connection with the movement of the saddle from the in-service state to the parked state.

According to this arrangement, the movement of the saddle to the parked state actuates the fixing means to fix the seat pillar within the frame, so that even if an attempt is made to move the seat pillar vertically with respect to the frame or to rotate it, the fixing means prevents the vertical or rotary movement of the seat pillar; thus, the effect of theft prevention can be enhanced.

BRIEF DESCRIPTION OF THE DRAWINGS

FIG. 1 is a view for explaining the in-service state of a bicycle with an antitheft device according to a first embodiment of the present invention;

FIG. 3 is an explanatory view showing the support construction of a saddle in said embodiment;

FIG. 4 is an explanatory view showing the support construction of the saddle in said embodiment;

In FIG. 10, (a) and (b) are a plan view and a fragmentary front view of the connecting portion of the saddle of said embodiment;

In FIG. 13, (a) and (b) are a sectional view taken in the direction of arrow B—B in FIG. 12 and a perspective view of a seat tube;

In FIG. 16, (b) is a fragmentary enlarged front view showing the state of the brake device when the saddle is put into the parked state;

In FIG. 16, (c) is a fragmentary enlarged front view showing the state of said brake device when the brake lever is in operation;

In FIG. 18, (b) is a fragmentary enlarged front view showing in said embodiment the state of the circle lock when the saddle is in the parked state;

In FIG. 20, (a) is a fragmentary enlarged plan sectional view showing in said embodiment the state of a handle locking mechanism when the saddle is in the in-service state;

In FIG. 20, (b) is a fragmentary enlarged plan sectional view showing in said embodiment the state of the handle locking mechanism when the saddle is in the parked state;

In FIG. 22, (b) is an enlarged plan sectional view of the octagonal portion of a front fork stem in said embodiment;

In FIG. 22, (c) is a fragmentary enlarged front view showing in said embodiment the state of the handle locking mechanism when the saddle is in the parked state;

In FIG. 24, (a) is a fragmentary enlarged plan view showing in said embodiment the state of a crank locking mechanism when the saddle is in the in-service state;

In FIG. 24, (b) is a fragmentary enlarged plan view showing in said embodiment the state of the crank locking mechanist when the saddle is in the parked state;

In FIG. 28, (a) is a fragmentary enlarged front view showing in said embodiment the state of a crank locking mechanism when the saddle is in the in-service state;

In FIG. 28, (b) is a fragmentary enlarged front view showing in said embodiment the state of the crank locking mechanism when the saddle is in the parked state;

In FIG. 32, (a) is a fragmentary enlarged front view showing in said embodiment the state of a hub locking mechanism when the saddle is in the in-service state;

In FIG. 32, (b) is a fragmentary enlarged front view showing in said embodiment the state of the hub locking mechanism when the saddle is in the parked state;

In FIG. 35, (a) is a fragmentary enlarged side view showing in said embodiment the state of a brake lever when the saddle is in the in-service state;

In FIG. 35, (b) is a fragmentary enlarged side view showing in said embodiment the state of the brake lever when the saddle is in the parked state;

In FIG. 36, (b) is a fragmentary enlarged front view showing in said embodiment the state of the circle lock when the brake lever is in the locked state;

DESCRIPTION OF THE EMBODIMENTS

Figure 2:
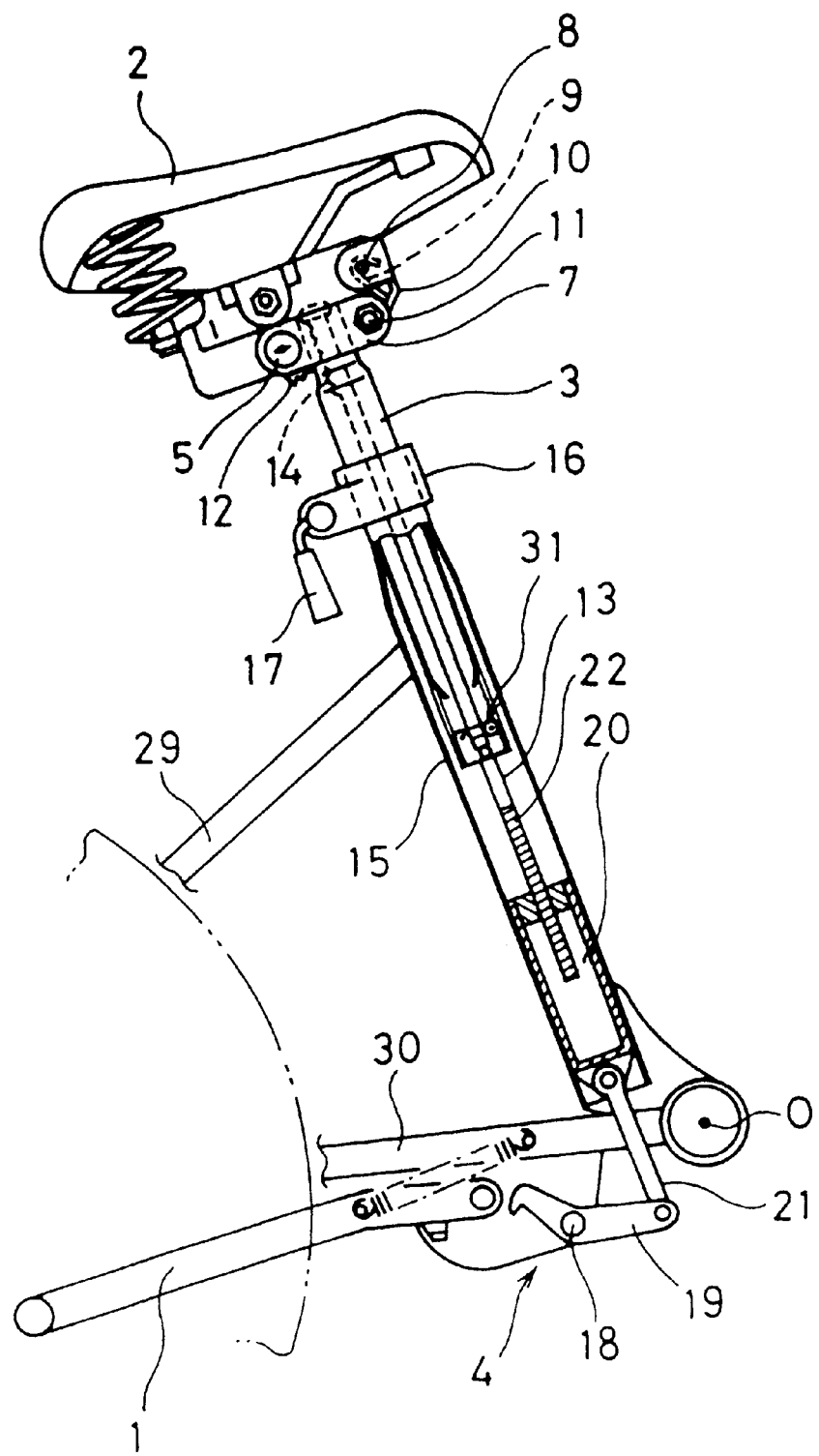
FIG. 2 is a fragmentary front view showing the in-service state of said embodiment.

The invention will now be described with reference to FIGS. 1 through 47.

FIG. 1 shows the in-service state of a bicycle with an antitheft device according to an embodiment of the invention, (a) through (d) showing the transition from the in-service state to the locked parked state, (e) and (f) showing the transition from the locked parked state to the in-service state. In addition, by the in-service state is meant, as prescribed by Japanese Industrial Standard (JIS D9101), a state of a bicycle which allows a person to ride, or a state of a bicycle in which a person uses the bicycle as he rides it.

When it is desired to park the bicycle as shown in (a) of FIG. 1, the user erects the stand 1 and then, as shown in (b) of FIG. 1, grips the front portion of the saddle 2 to turn it with respect to the seat pillar 3 until it assumes the parked state with the saddle seat surface inclined.

In operative connection with the turning of the saddle 2, the stand 1 is locked by a stand locking device 4 as shown in (c) of FIG. 1.

In this state, a key 6 is extracted from a cylinder lock 5 as shown in (d) of FIG. 1, whereby the locking is completed. The locked state prevents the saddle 2 from being turned.

To change the parked state to the in-service state, as shown in (e) of FIG. 1, the key 6 is inserted, for unlocking, into the cylinder lock 5 which is a first locking means and the saddle 2 is restored as shown in (f) of FIG. 1, thereby unlocking the stand 1 which has been locked by the stand locking device 4 serving as a second locking means and a movable section. In this state the stand 1 is leveled, whereby the state is changed into the in-service state.

The construction for attaching the saddle 2 and seat pillar 3, the construction of the stand locking device 4, and the mechanism for operative connection between the turning of the saddle 2 and the stand locking device 4 are as shown in FIGS. 2 through 7.

As shown in (a) and (b) of FIGS. 2 and 3, the saddle 2 is attached to the upper end of the seat pillar 3 by a mounting member 7. The saddle 2 is attached to the mounting member 7 through the cylinder lock 5 so that it is turnable around the cylinder lock as shown in (b) of FIG. 3 and (a) and (b) of FIG. 4.

The saddle 2 is provided with a lever 10 which is turnably supported on a pin 8 and urged in the direction of arrow A by a spring 9, it being arranged that in the in-service state, the front end of the lever 10 is engaged with the mounting screw shaft 11 of the mounting member 7 to prevent the turning of the saddle 2.

The saddle 2 is provided with an integrally turnable sector gear 12, while the seat pillar 3 is internally provided with a liftably supported connecting rod 13 serving as connecting means. The upper end portion of the connecting rod 13 is formed with a toothed rack 14 with which the sector gear 12 operatively connected with the saddle 2 is meshing.

Therefore, when the user cancels the engagement between A the lever 10 and the mounting screw shaft 11 of the mounting member 7 with the stand 1 erected as shown in (b) of FIG. 1 and grips the saddle and turns it upward as shown in (b) of FIG. 3, the sector gear 12 pulls the connecting rod 13 upward as shown in (a) and (b) of FIG. 4.

The seat pillar 3 is fitted in the seat tube 15 of the bicycle frame as shown in FIG. 2, and the position of the seat pillar 3 relative to the seat tube 15 is controlled by tightening the handle 17 of a seat lug 16 at a position where the saddle level is suitable, so as to prevent movement of the seat pillar 3.

The stand locking device 4 comprises a locking lever 19 pivotally supported at its intermediate portion on a shaft 18 in the vicinity of the base end of the stand 1, a cylinder 20 liftably received in the lower end portion of the seat tube 15, and a link 21 which connects the lower end of the cylinder 20 to the base end of the locking lever 19.

Screwed into the upper end of the cylinder 20 is a threaded portion 22 formed on the lower end of the connecting rod 13, so that the cylinder 20 will be lifted and lowered inside the seat tube 15 in operative connection with the upward and downward movement of the connecting rod 13. Further, the center of the seat tube 15 and the center O of the crank are in a non-crossing state to prevent the link 21 from interfering with the crank.

Figure 5:
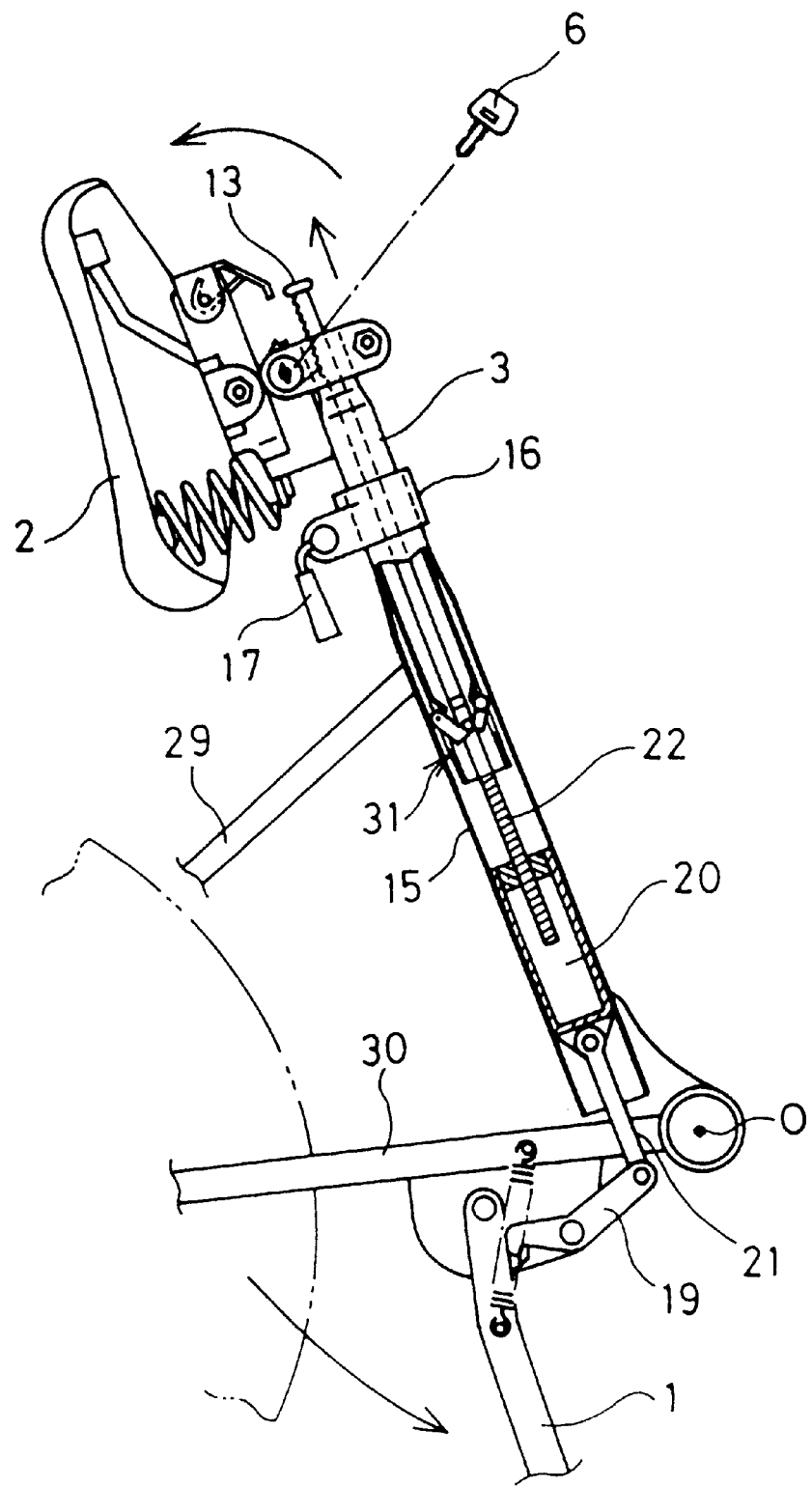
FIG. 5 is a fragmentary front view showing the parked state of said embodiment.

As a result of such arrangement, in the parked state with the saddle seat surface inclined as shown in (c) and (d) of FIG. 1, the front end of the locking lever 19, as shown in FIG. 5, engages the stand 1 to prevent the latter from being leveled.

Figure 6:
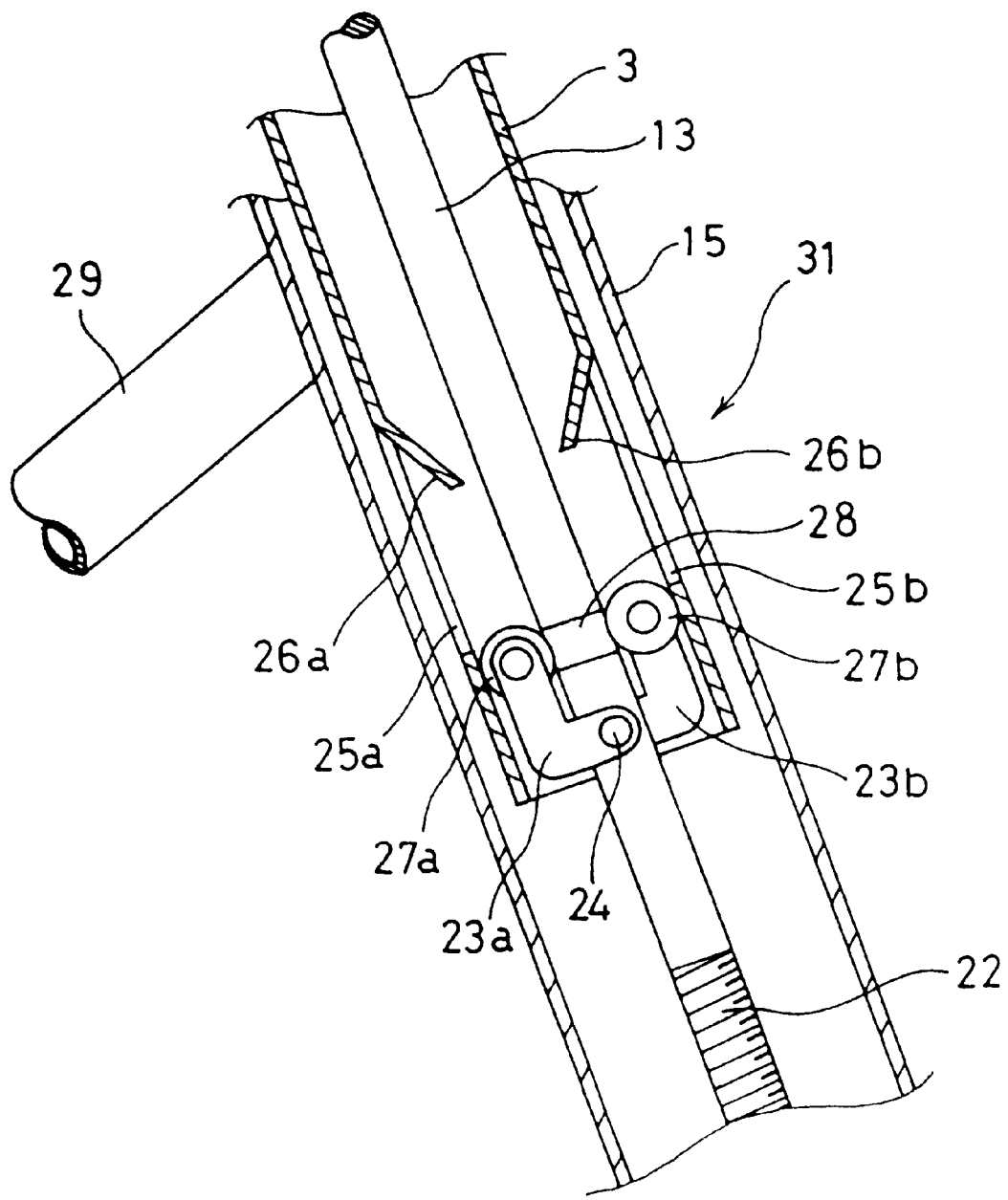
FIG. 6 is an enlarged sectional view showing the in-service state of said embodiment.

In addition, the connecting rod 13 has locking cams 23a and 23b attached to the intermediate portion thereof by pins 24, as shown in FIGS. 2 and 6, which cams serve as fixing means and movable sections. Further, the lower end of the seat pillar 3 is formed with openings 25a and 25b and bent elements 26a and 26b inwardly bent for insertion into the upper regions of said openings 25a and 25b. The numeral 29 denotes a seat stay and 30 denotes a chain stay.

Figure 7:
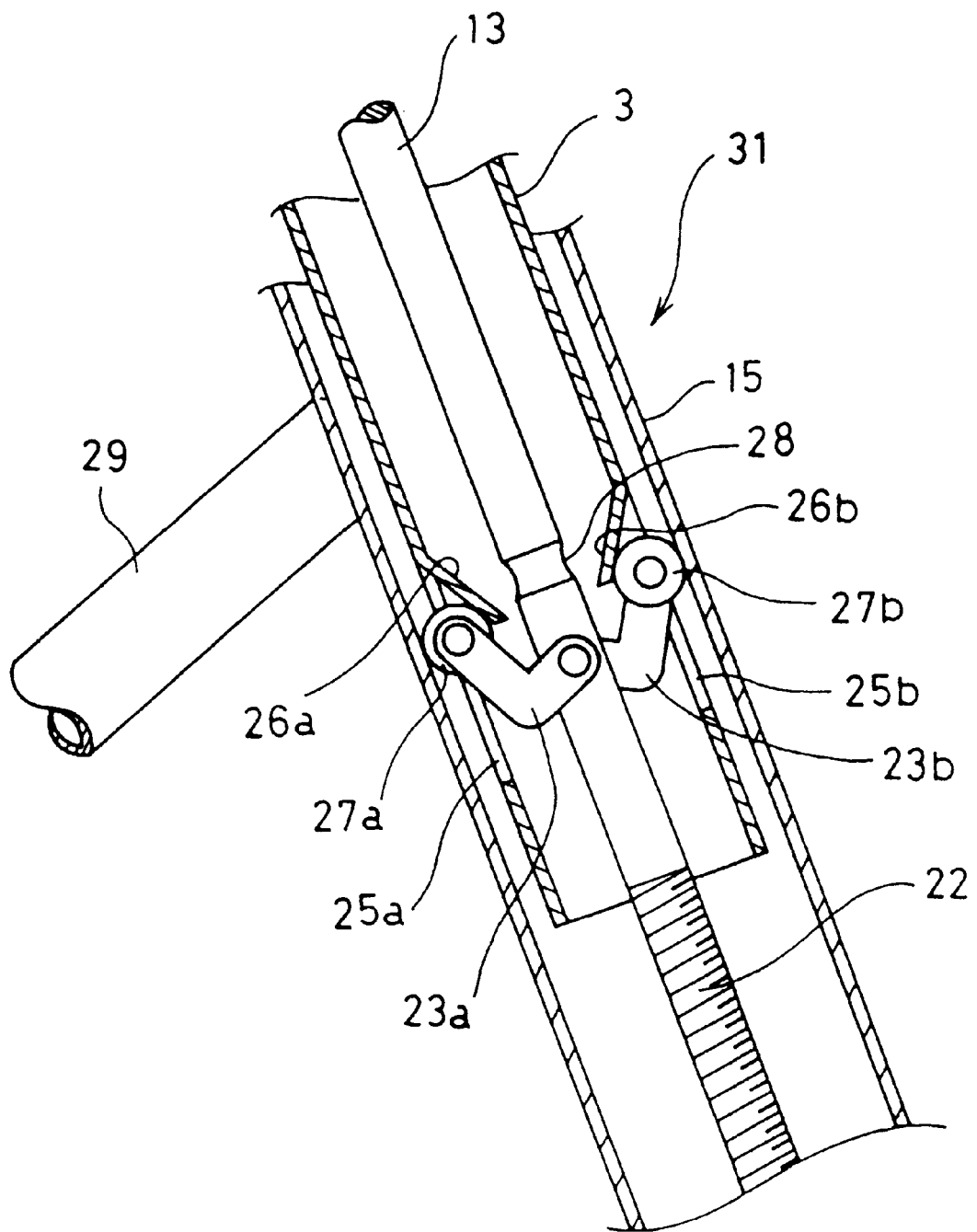
FIG. 7 is an enlarged sectional view showing the parked state of said embodiment.

In the in-service state shown in (a) of FIG. 1 which is established prior to the connecting rod 13 being pulled up, the locking cams 23a and 23b are stored inside the seat pillar 3 as shown in FIGS. 2 and 6, whereas in the parked state with the saddle seat surface inclined as shown in (c) and (d) of FIG. 1, as a result of the connecting rod 13 being pulled up, as shown in FIGS. 5 and 7, rollers 27a and 27b on the front ends of the locking cams 23a and 23b abut against the lower surfaces of the bent elements 26a and 26b of the seat pillar 3 and the locking cams 23a and 23b are turned around the pins 24 and expanded through the openings 25a and 25b in the seat pillar 3 until they abut against the seat tube, with the rollers 27a and 27b wedged, for firm engagement, between the seat tube 15 and the bent elements 26a and 26b of the seat pillar 3.

In addition, the connecting rod 13, as shown in FIG. 7, is formed with a recess 28, so that in the state in which the saddle 2 is restored to the in-service position by using the genuine key 6, the locking cams 23a and 23b, as shown in FIG. 6, are restored to their original positions with the rollers 27a and 27b partly received in the recess 28.

Thus, since the bicycle is locked in the parked state with the saddle seat surface inclined, the idea that the bicycle is "unridable" is developed, thereby making it possible to prevent theft. Further, at the time of locking, the stand 1 can be locked in operative connection with the turning of the saddle 2 in the manner shown in (b) of FIG. 1, while at the time of unlocking, the stand 1 can be unlocked in operative connection with the turning of the saddle 2 in the manner shown in (f) of FIG. 1, thus improving the operability.

Further, in the parked state shown in (e) of FIG. 1, even if the following illegal conduct is committed, the bicycle with an antitheft device in this embodiment is reliably protected from theft in that the following fixing means 31 is provided so that the stand 1 can be maintained in the locked state shown in FIG. 5.

More particularly, when a dishonest person tries to loosen the handle 17 of the seat lug 16 so as to push up or down or turn the seat pillar 3 with respect to the seat tube 15, in the parked state as described above (see FIG. 5), the rollers 27a and 27b firmly engage between the seat tube 15 and the bent elements 26a and 26b of the seat pillar 3, resulting in friction being produced between the seat tube 15 and the seat pillar 3 and hence the seat pillar 3 is fixed to the seat tube 15, thereby preventing upward or downward movement or turning movement of the seat pillar 3.

Figure 8:
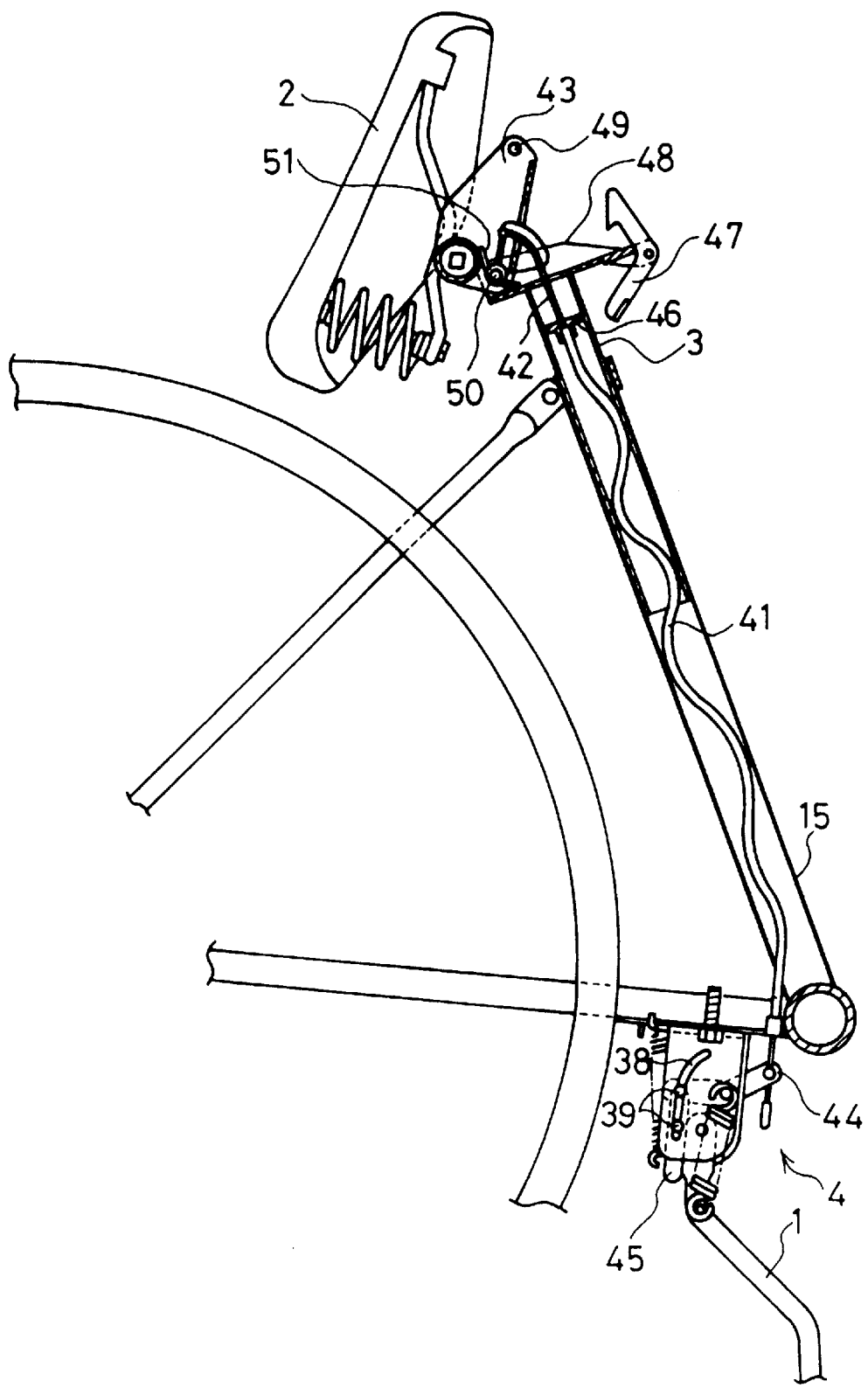
FIG. 8 is a fragmentary front view showing the in-service state of a bicycle with an antitheft device according to a second embodiment of the present invention.
Figure 9:
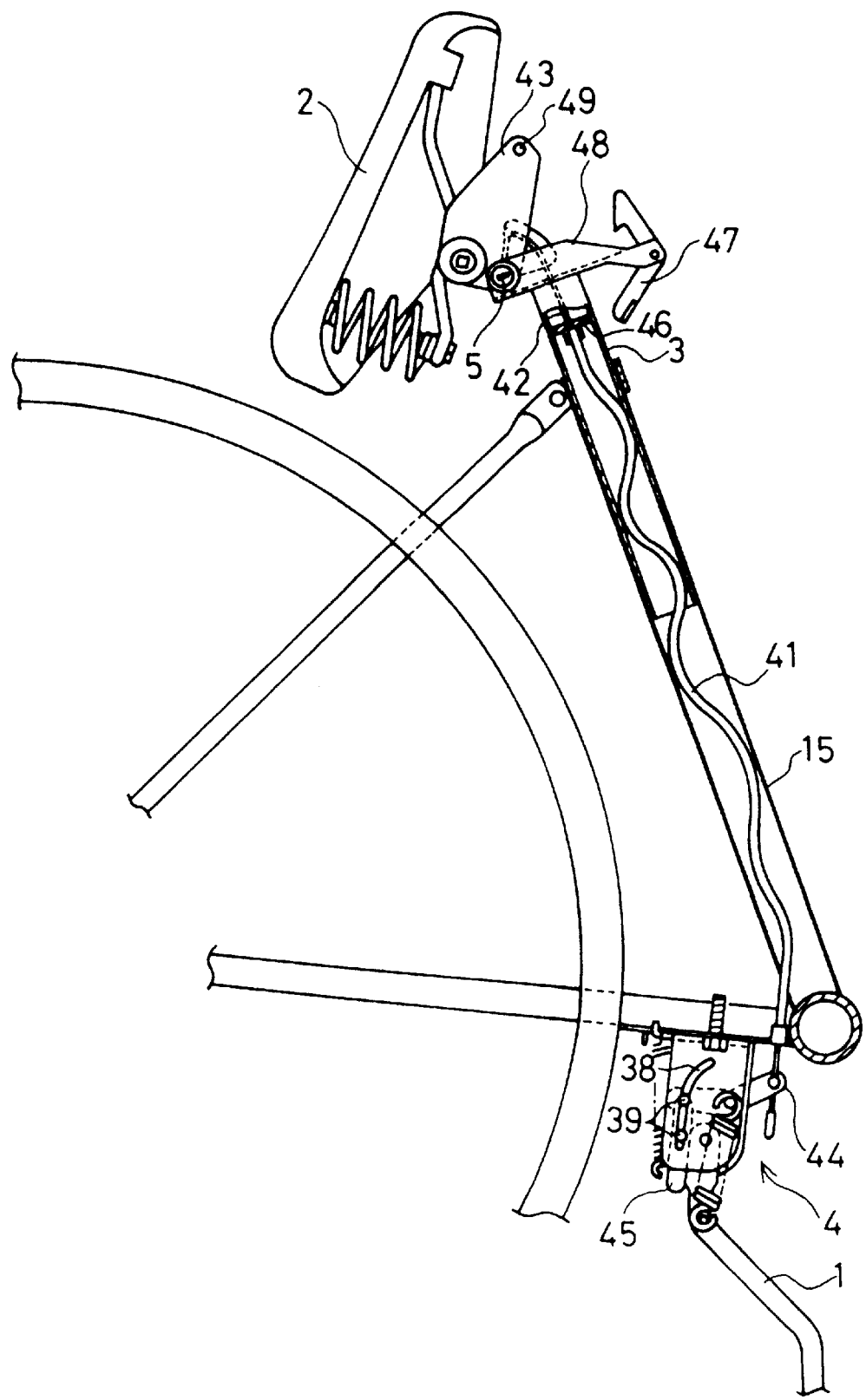
FIG. 9 is a fragmentary front view showing the in-service state of said embodiment.

As for the means for operative connection between the turning movement of the saddle 2 and the stand locking device 4, the connecting rod 13 may be replaced by a wire structure as in a second embodiment shown in FIGS. 8 and 9.

In FIGS. 8 and 9, the numeral 41 denotes an outer wire and 42 denotes an inner wire which, except for its opposite ends, is held by the outer wire 41 so that it can come in and out, the upper end of said inner wire 42 being attached to a saddle support block 43 which supports the saddle 2, the lower end of said inner wire 42 being connected to a swing lever 44 which is pivotally supported for swing movement in the stand locking device 4. And when the saddle 2 is turned upward so as to enter into the parked state as shown in FIGS. 8 and 9, the inner wire 42 is pulled up to swing the swing lever 44 of the stand locking device 4, whereby the locking lever 45 pivotally connected to said swing lever 44 through a pin 39 is lowered along a cam groove 38 through the intermediary of the pin 39 to extend along the rear surface of the base portion of the stand 1. Therefore, an attempt to turn the stand 1 rearward will result in the stand 1 abutting against the locking lever 45; thus, any attempt to level the stand 1 is defeated, the stand 1 being locked in the erected state.

Further, when the saddle 2 is pushed down from the parked state and turned toward the in-service state, the inner wire 42 is pulled down, so that the locking lever 45 connected to the swing lever 44 is moved upward to assume a state in which it is remote from the rear surface of the base portion of the stand 1, thus allowing the stand 1 to be erected and inclined as desired.

In addition, the numeral 46 denotes a support seat for the outer wire 41 fixed to the interior of the upper end portion of the seat pillar 3. The numeral 47 denotes a hook pivotally supported by a mounting member 48 fixed to the upper end of the seat pillar 3, said hook being engageable with an engaging pin 49 fixed on the front end of the saddle support block 43.

Further, as shown also in (b) of FIG. 10, a connecting pin 50 for connecting the mounting member 48 of the seat pillar 3 to the saddle support block 43 has an urging spring 51 fitted thereon to serve as elastic means, said urging spring 51 urging the saddle 2 toward the parked position. And the saddle 2 is supported such that it can be manually moved from the parked position to the in-service position against the force of the urging spring 51. If, therefore with the saddle 2 in the in-service position, one end of the hook 47 is depressed to disengage the other end thereof from the engaging pin 49, the saddle 2 is pushed up by the force of the urging spring 51 and turned until it reaches the parked position.

When it is desired to change the in-service state to the parked state, this can be attained simply by disengaging the hook 47 from the engaging pin 49, whereupon the saddle 2 (as the movable section including the saddle 2 and its support block 43) is turned until it reaches the parked state, and simultaneously therewith the cylinder lock 5 (see FIG. 9) which is the key section is automatically locked in the parked state. In this case, therefore, the key 6 is unnecessary. And only when it is desired to change the parked state to the in-service state, the key 6 is inserted into the cylinder lock 5 to open the latter, thereby allowing the saddle 2 to be manually depressed into the in-service state. Thus, the key 6 is required only for locking and is unnecessary for unlocking and hence the operability is high. And when the cylinder lock 5 is opened by the key 6, the saddle 2 is pushed up by the force of the urging spring 51 and turned until it reaches the parked position, and in response thereto the stand locking device 4 is locked.

Figure 11:
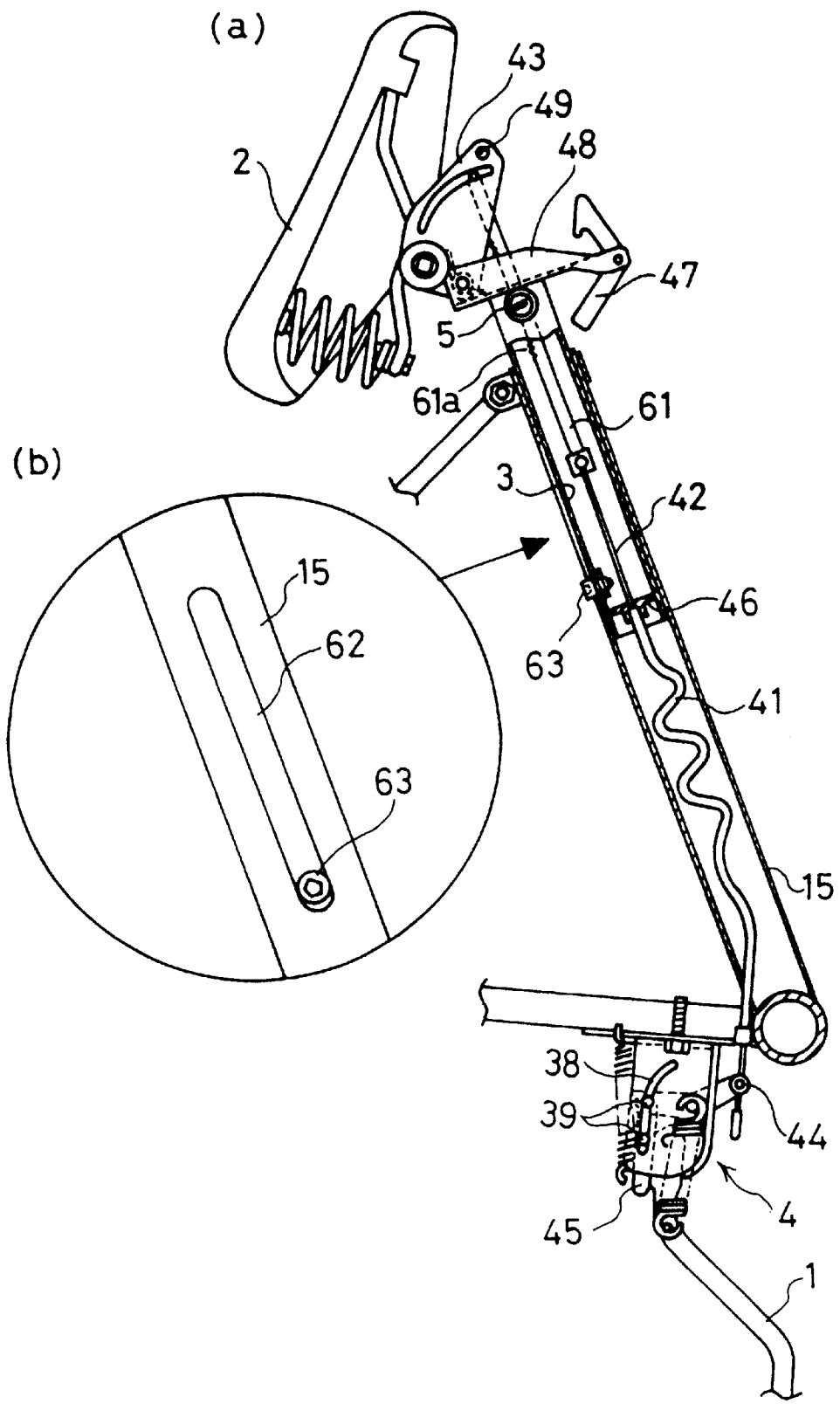
In FIG. 11, (a) and (b) are a fragmentary front view and a fragmentary enlarged view of a bicycle with an antitheft device according to a third embodiment of the present invention.

Further, as shown as a third embodiment of the invention in (a) of FIG. 11, a rod 61 and a wire structure may be used as means for establishing the operative connection between the turning movement of the saddle 2 and the stand locking device 4. In this embodiment, the rod 61 is connected to the saddle 2 and the upper end of the inner wire 42 is connected to the lower end of the rod 61. According to this arrangement, the use of the rod 61 in the region below the saddle 2 which is exposed to the outside prevents the wire for connection (hereinafter referred to as the connecting wire) from being intentionally cut.

Further, in this embodiment, as shown enlarged in (b) of FIG. 11, a vertically extending elongated opening 62 is formed in the seat tube 15 supporting the seat pillar 3, and a locking bolt 63 serving as a seat pillar slip-off preventing member extends through said elongated opening 62 radially outwardly of the seat pillar 3 and is screwed into the seat pillar 3. This locking bolt 63 is removable only by using a special tool different from tools in general use, such as plus drivers, minus drivers and hexagon bar spanners. In this embodiment, the head of the locking bolt 63 is formed with a right pentagonal hole, so that the locking bolt 63 can be turned only by a special pentagonal bar spanner.

According to this arrangement, any attempt to extract the seat pillar 3 from the seat tube 15 is defeated in that the locking bolt 63 abuts against the upper end of the elongated opening 62 in the seat tube 15, preventing such extraction. Thus, since the seat pillar 3 itself can be prevented from slipping off the seat tube 15, the saddle 2 is protected from being replaced by a saddle in general use.

In addition, in this embodiment, with the cylinder lock 5 opened by inserting the key 6 thereinto, the seat pillar 3 is lifted or lowered to adjust the height of the saddle 2, and then the cylinder lock 5 is fastened and engaged in a portion thereof (not shown) with the toothed portion 61a of the rod 61, thereby fixing the height. In order to allow this height adjustment to be made properly, the opening 62 in the seat tube 15 is elongated; however, the invention is not limited thereto and if height adjustment is unnecessary, a simple circular opening may be employed. Further, the projecting height of the head of the locking bolt 63 serving as a seat pillar slip-off preventing member is not limited to the one shown in the above embodiment; it has only to function to prevent slip-off, and any height may be employed so long as it is larger than the diameter of the upper end opening in the seat tube 15.

Further, instead of the special seat pillar slip-off preventing member, a seat pillar slip-off preventing member, such as a bolt of general shape may be fixed in position by soldering or by using a an adhesive agent made of thermoplastic resin. According to this arrangement, since it cannot be removed except by a special method such as heating by high frequency waves, the same effects can be obtained.

Figure 12:
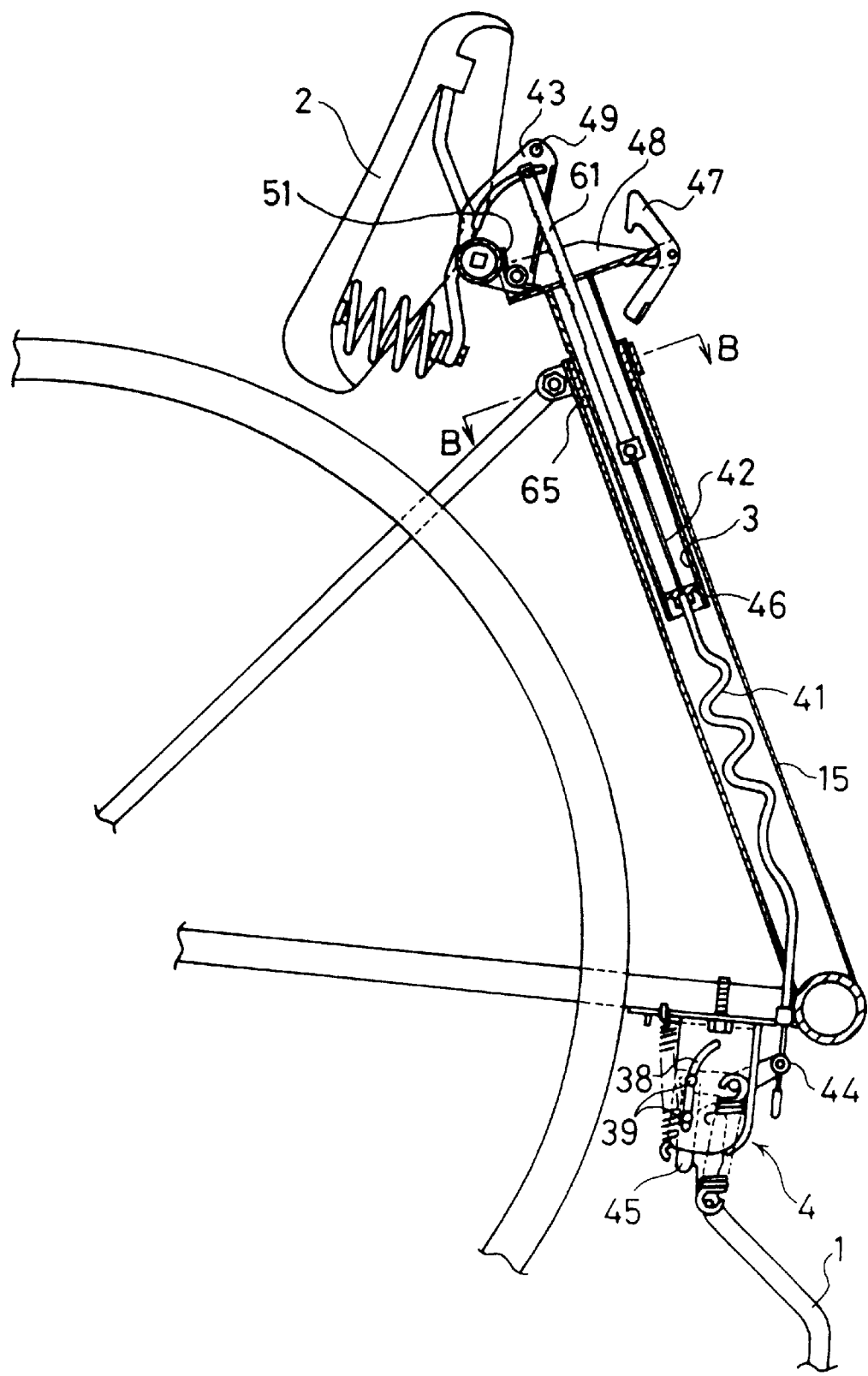
FIG. 12 is a fragmentary front view of a bicycle with an antitheft device according to a fourth embodiment of the present invention.

A fourth embodiment of the invention is shown in FIG. 12 and (a) and (b) of FIG. 13. In this embodiment, as shown in (a) and (b) of FIG. 13, a split spacer 65 partly cut in flat shape is fitted in the upper end of the seat tube 15, with the result that the inner shape of the seat tube 15 is non-circular. Further, in conformity therewith, the portion of the seat pillar 3 to be inserted in the seat tube 15 is laterally cut to provide a flat portion 3a.

Therefore, even if someone extracts this seat pillar 3 from the seat tube 15 to remove the saddle 2 and attempts to insert a circular seat pillar which supports a saddle in general use into the seat tube 15, the non-circular internal shape of the seat tube 15 prevents it from being inserted; thus, replacement by a saddle in general use is prevented.

In addition, the inner shape of the seat tube 15 may be elliptic or any other shape so long as it is non-circular. Further, in this embodiment, a spacer 65 separate from the seat tube 15 is provided, and the inner shape of this spacer 65 is made non-circular; since this spacer 65 is processed separately from the seat tube 15 which is part of the frame, it can be produced with a high degree of precision, providing the effect that the force with which the saddle 2 is fixed can be increased. However, the invention is not limited thereto.

Figure 14:
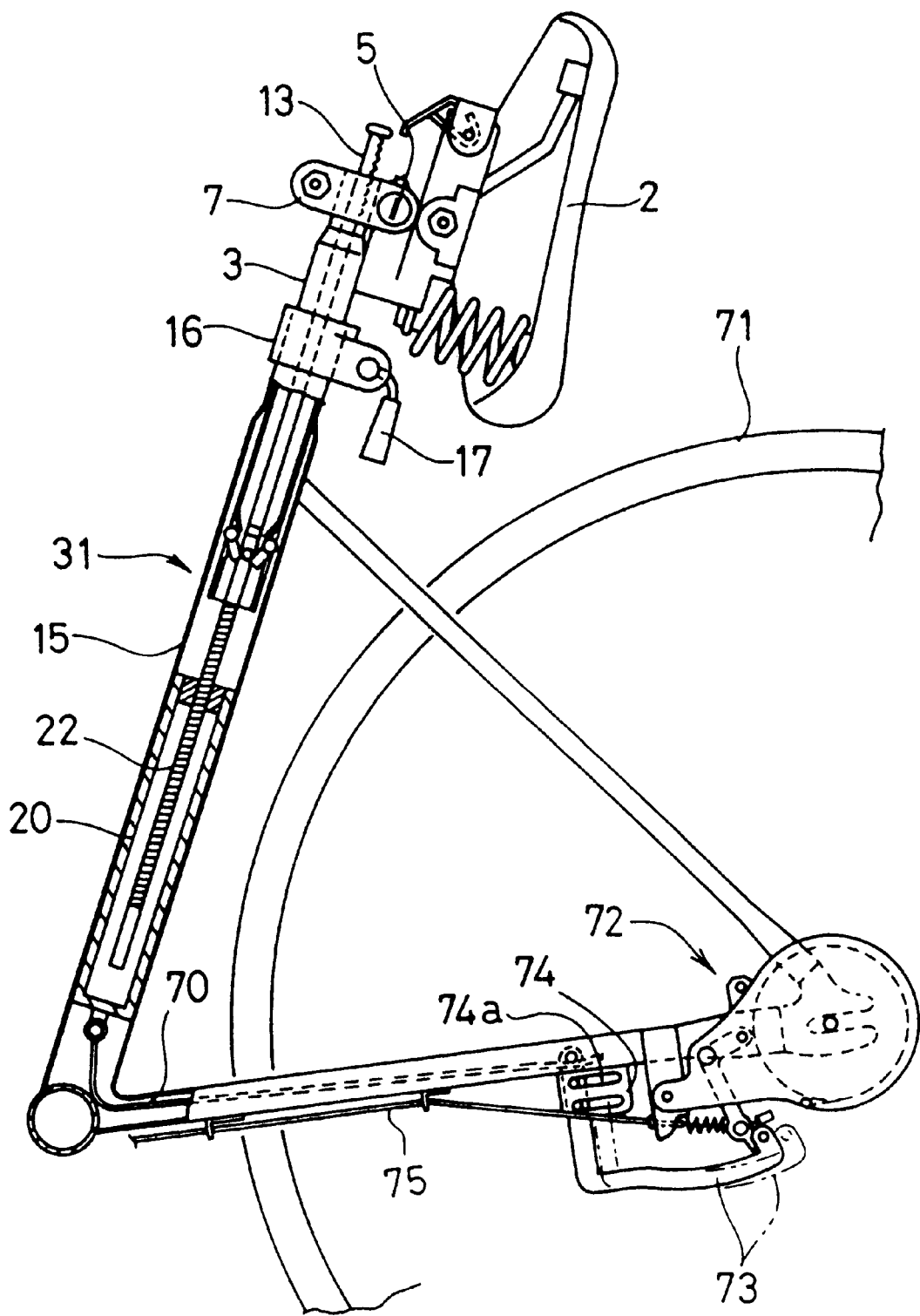
FIG. 14 is a fragmentary front view of a bicycle with an antitheft device according to a fifth embodiment of the present invention.

Further, FIG. 14 shows a fifth embodiment of the invention. In this embodiment, a connecting wire 70 is connected to the lower end of a cylinder 20 of the same construction as that shown in FIG. 1. The front end of this connecting wire 70 is attached to a slide lever 73 slidably designed and transversely disposed in the vicinity of a hub brake device 72 for the rear wheel 71 which serves as second locking means and movable section. And when the saddle 2 is turned to the parked position, the slide lever 73 is forwardly moved along a groove 74a in a support guide 74 through the intermediary of the cylinder 20 and the connecting wire 70, as shown in solid line in FIG. 14, so as to actuate the brake device 72.

With this arrangement also, the hub brake device 72 for the rear wheel 71 will be automatically actuated in operative connection with the turning movement of the saddle 2 to brake the bicycle in the non-running state. In addition, the numeral 75 in FIG. 14 denotes a wire connected to a brake lever (not shown), and the hub brake device 72 can be actuated also by the brake lever.

Figure 15:
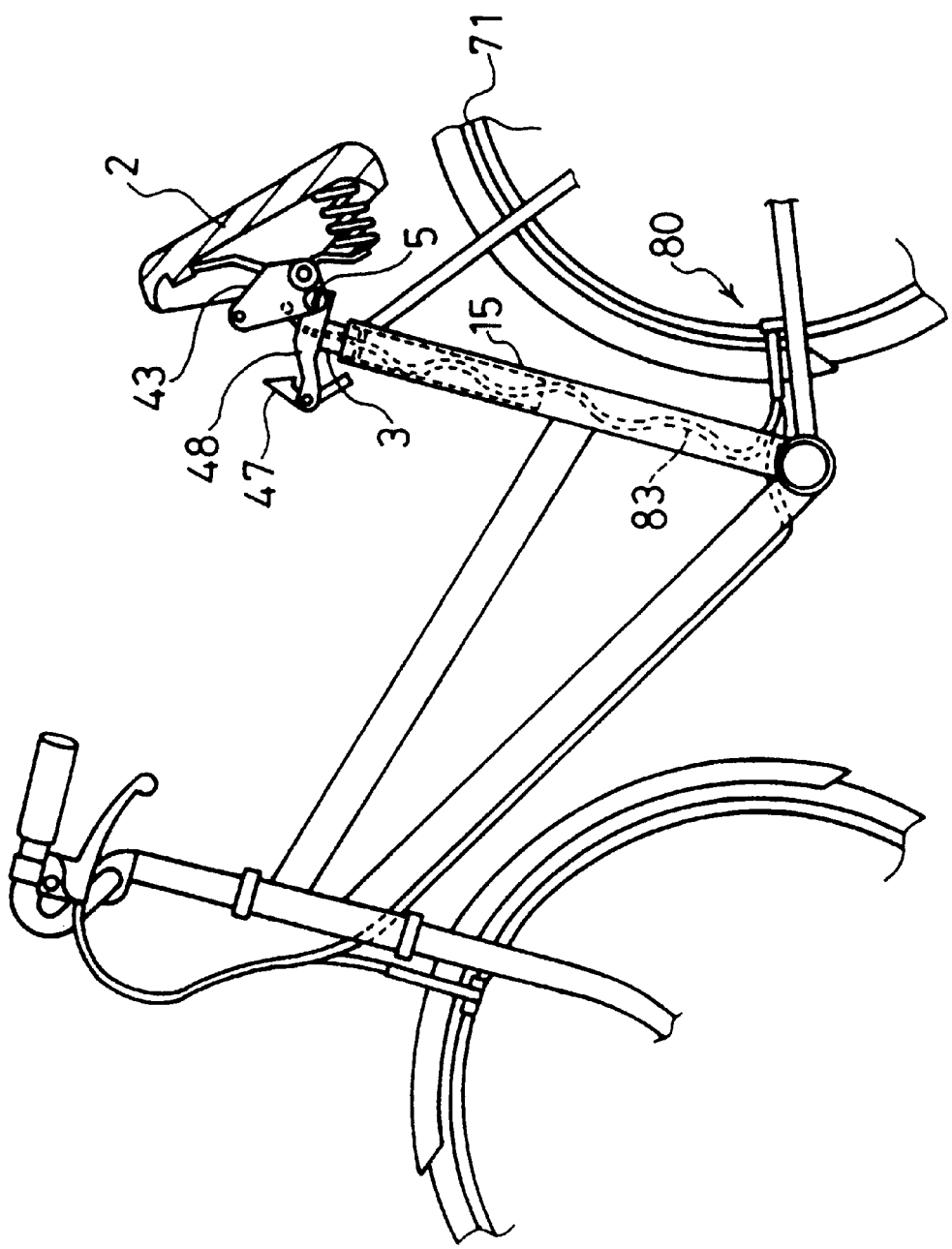
FIG. 15 is a fragmentary front view of a bicycle with an antitheft device according to a sixth embodiment of the present invention.
Figure 16:
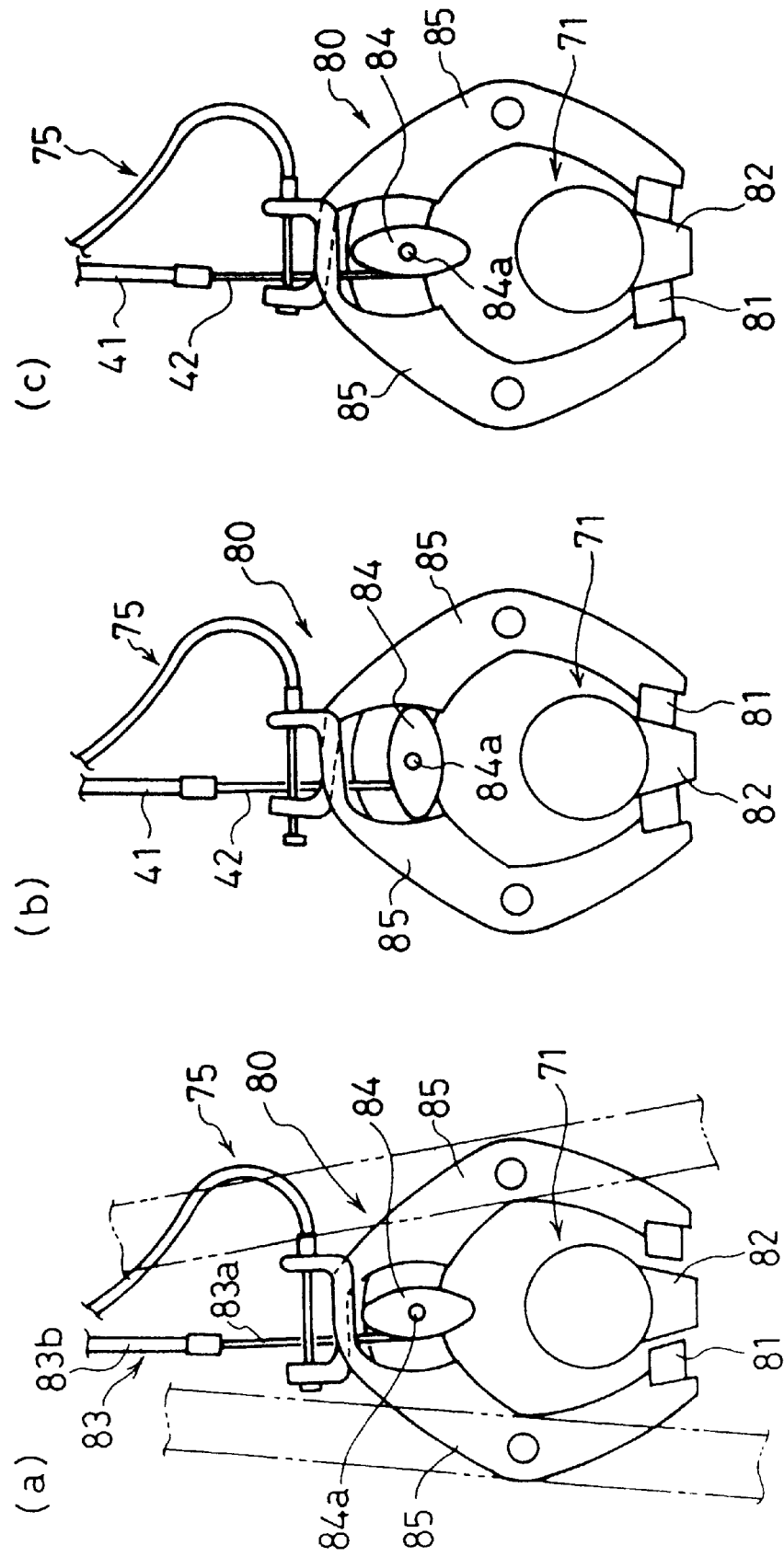
In FIG. 16, (a) is a fragmentary enlarged front view showing the in-service state of a brake device for the rear wheel in said embodiment.

Further, as shown as a sixth embodiment in FIGS. 15 and 16, the front end of a connecting wire 83a which transmits the turning movement of the saddle 2 from the in-service state to the parked state may be connected to a brake device 80 of the type which presses a brake shoe 81 against the rim 82 of the rear wheel 71. That is, when the saddle 2 is turned from the in-service state to the parked state, as shown in (a) and (b) of FIG. 16, a cam 84 connected to the front end of the inner wire 83a is turned around the axis of a shaft 84a to spread a brake arm 85, whereby the brake shoe 81 attached to the brake arm 85 abuts against the rim 82 of the rear wheel 71, thus braking the latter.

With this arrangement also, the turning movement of the saddle 2 to the parked state results in the saddle 2 being locked by the cylinder lock 5, and the brake device 80 for the rear wheel 71 is automatically actuated in operative connection with the turning movement of the saddle 2, so that the bicycle is braked in the non-running state. In addition, in FIG. 16, 83b denotes an outer wire for the connecting wire 83 and 75 denotes a wire connected to a brake lever (not shown), it being arranged that, as shown in (c) of FIG. 16, the brake device 80 can be actuated also by the brake lever. Further, though not shown, return springs are provided for urging the cam 84 and brake arm 85 to the state shown in (a) of FIG. 16.

Figure 17:
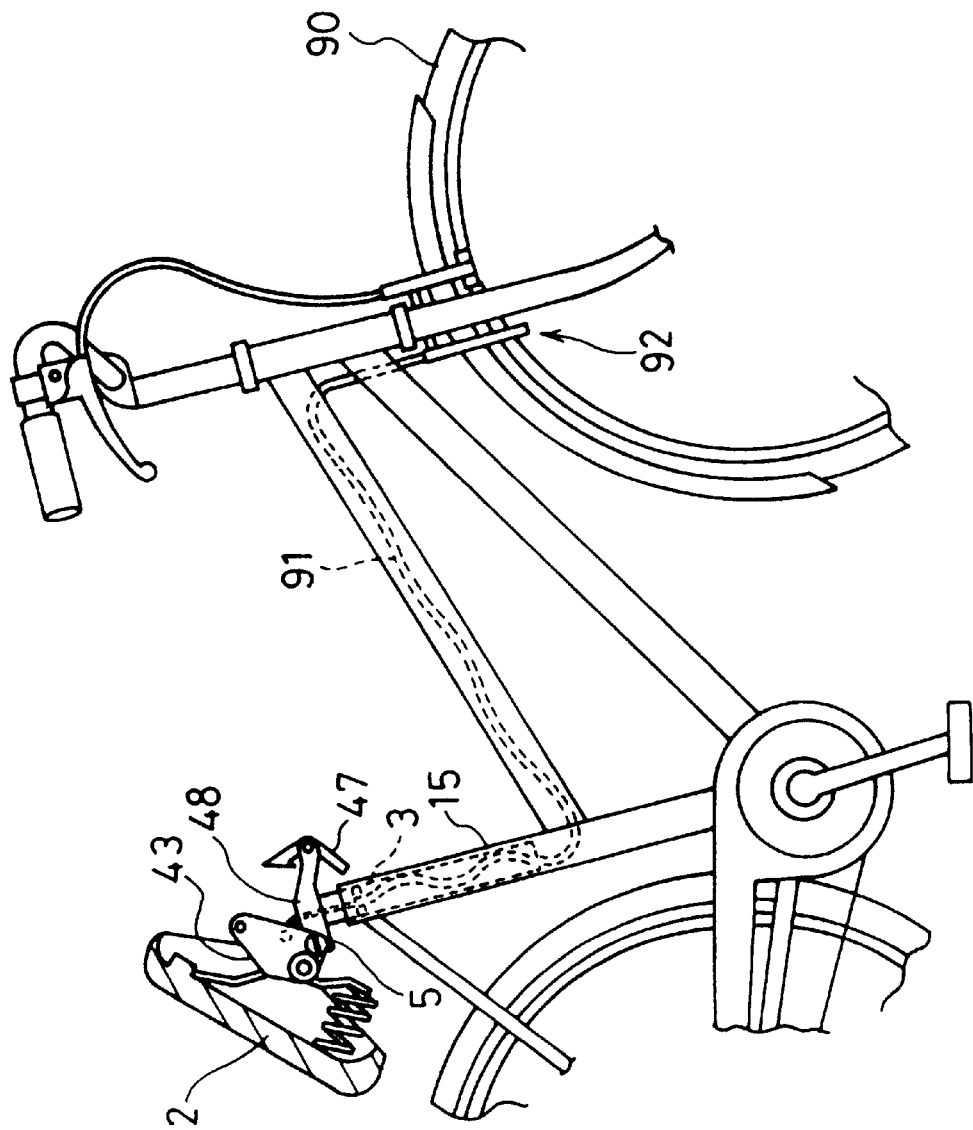
FIG. 17 is a fragmentary front view of a bicycle with an antitheft device according to a seventh embodiment of the present invention.
Figure 18:
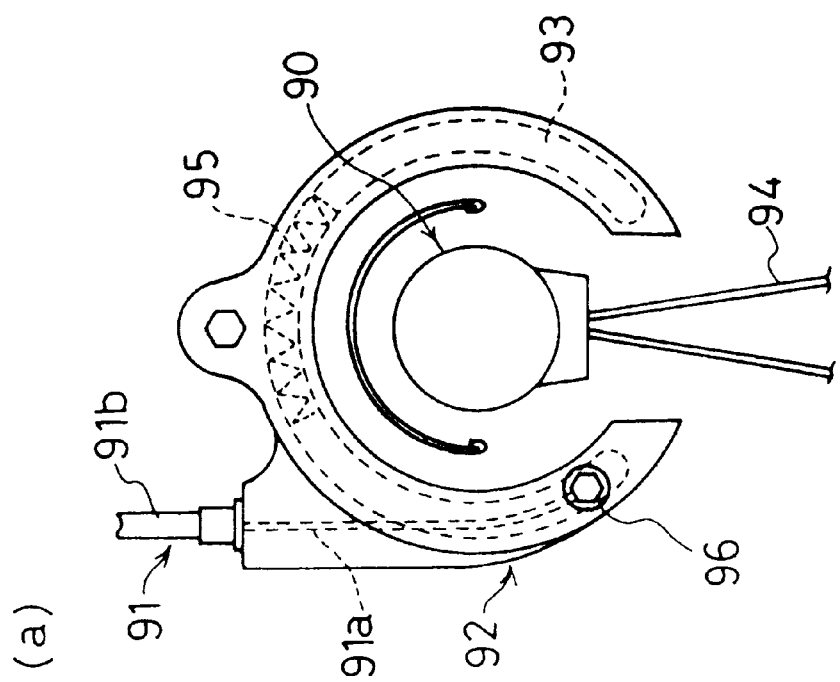
In FIG. 18, (a) is a fragmentary enlarged front view showing in said embodiment the state of a circle lock when the saddle is in the in-service state.

FIGS. 17 and 18 show a seventh embodiment of the invention, wherein a connecting wire 91 for transmitting the turning movement of the saddle 2 from the in-service state to the parked state is connected to a circle lock 92 provided for the front wheel 90. And when the saddle 2 is turned from the in-service position to the parked position, as shown in (a) and (b) of FIG. 18, the locking bar 93 of the circle lock 92 is inserted between spokes 94 of the front wheel 90 by the inner wire 91a to prevent the rotation of the front wheel 90.

With this arrangement also, the saddle 2 is locked by the cylinder lock 5 in response to the turning movement of the saddle 2 to the parked state, and the circle lock 92 for the front wheel 90 is automatically fastened in operative connection with the turning movement of the saddle 2, whereby the bicycle is locked in the non-running state. In addition, in FIG. 18, 91b denotes the outer wire of the connecting wire 91; 95 denotes a return spring for urging the locking bar 93 toward the unlocking side, and 96 denotes a wire attaching hole.

Figure 19:
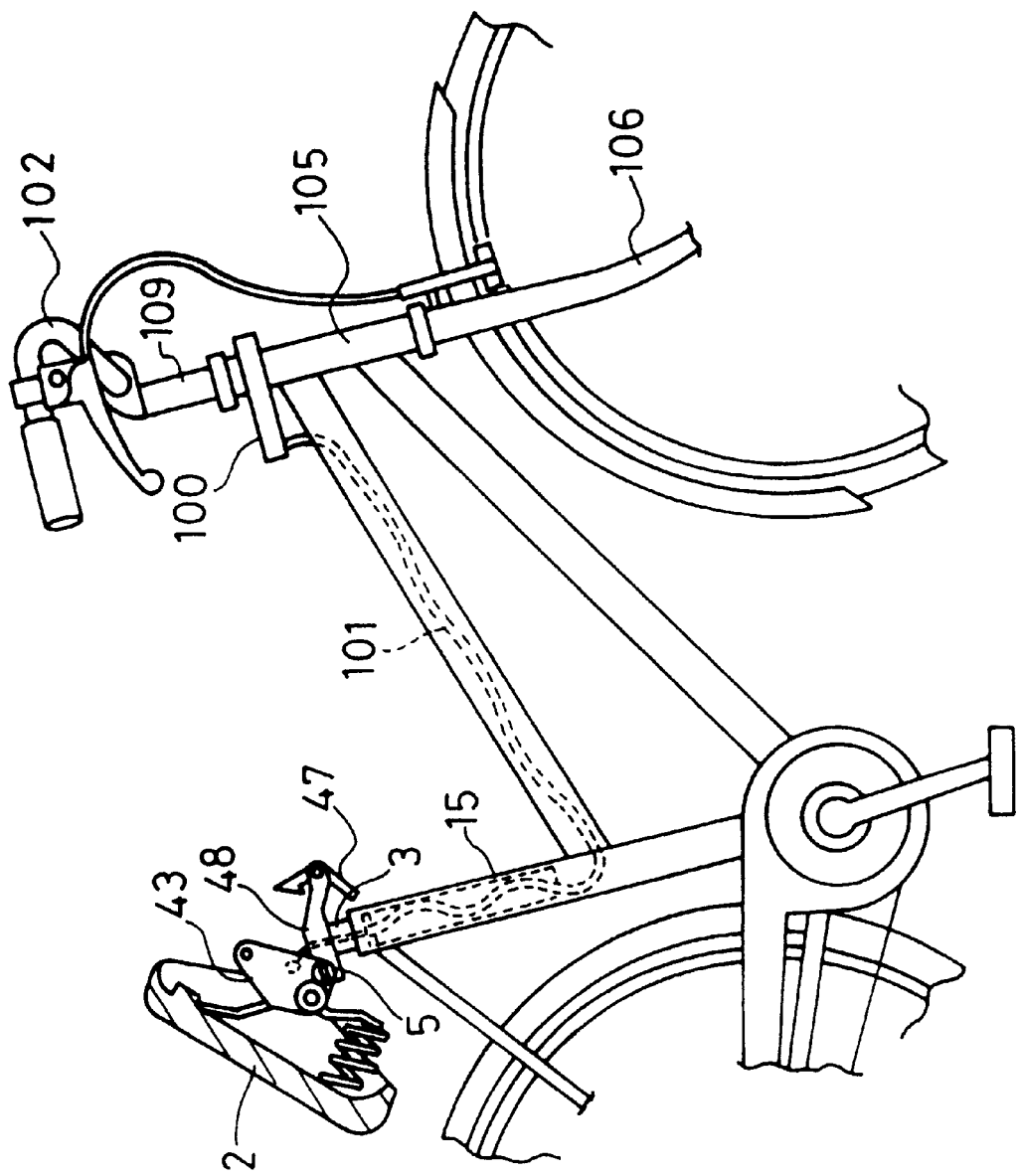
FIG. 19 is a fragmentary front view of a bicycle with an antitheft device according to an eighth embodiment of the present invention.

FIGS. 19 and 20 show en eighth embodiment of the invention, wherein a connecting wire 101 which transmits the turning movement of the saddle 2 from the in-service state to the parked state is connected to a handle locking mechanism 100 which makes the handle 102 immovable. And when the saddle 2 is turned from the in-service position to the parked position, as shown in (a) and (b) of FIG. 20, the cam 103 of the handle locking mechanism 100 is turned through the inner wire 101a of the connecting wire 101, and the locking pin 104 adapted to be forwardly projected by the cam 103 fits in one of the engaging holes 107a in a front fork stem 107 connected to a head tube 105. Therefore, when the locking pin 104 fits in the engaging hole 107a, and a head tube 105 and a case 108 fixed to a front fork 106 become unable to move relative to each other, thereby preventing the movement of the handle stem 109 and handle 102 which are attached to the front fork 106.

With this arrangement also, the saddle 2 is locked by the cylinder lock 5 in response to its turning movement to the parked state, and the handle, i.e., handlebar 102 is automatically nonrotatably fixed by the handle locking mechanism 100 in operative connection with the turning movement of the saddle 2; thus, any attempt to ride will fail. In addition, in FIG. 20, the characters 103a and 104a denote return springs for the cam 103 and the locking pin 104.

Figure 21:
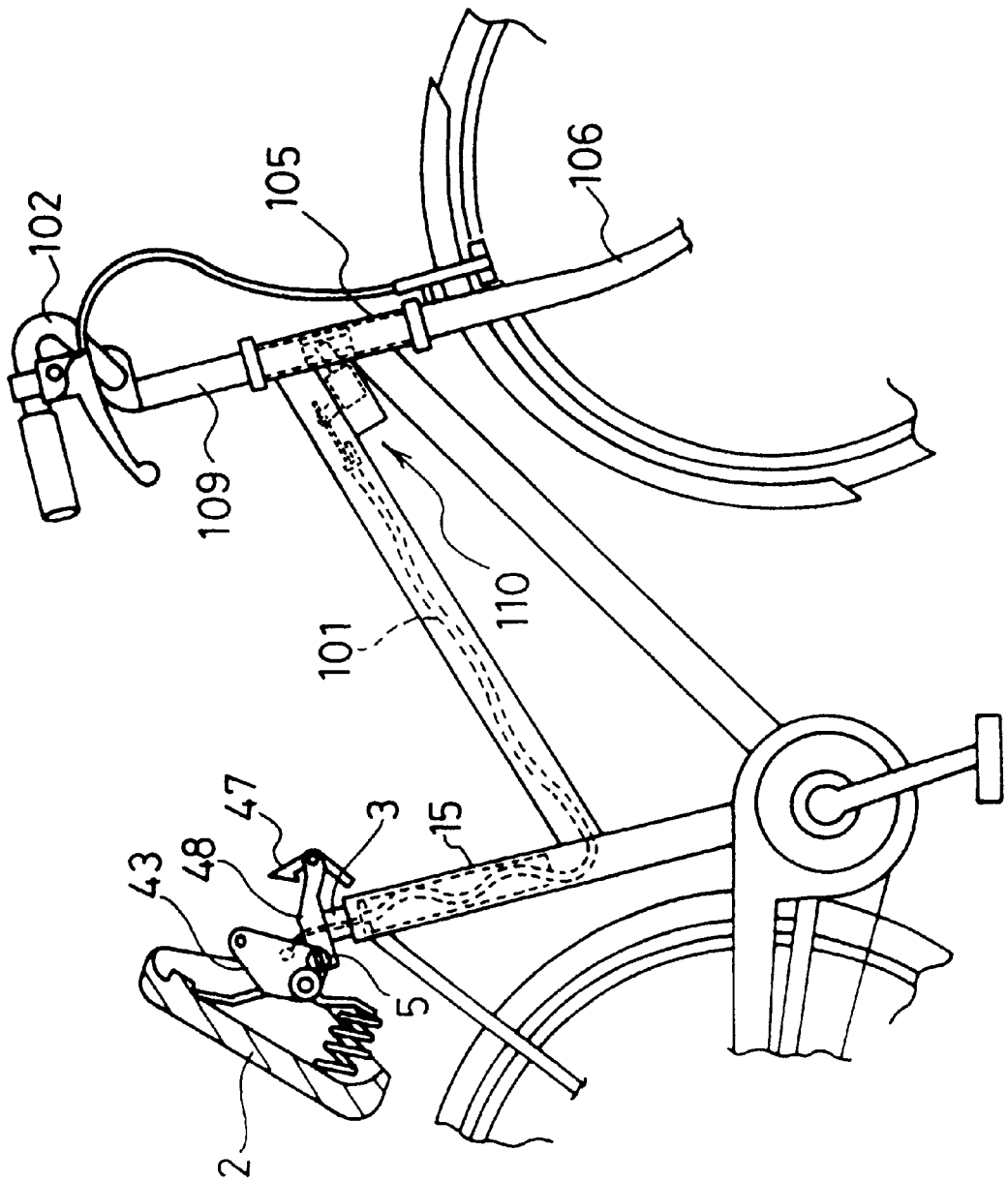
FIG. 21 is a fragmentary front view of a bicycle with an antitheft device according to a ninth embodiment of the present invention.
Figure 22:
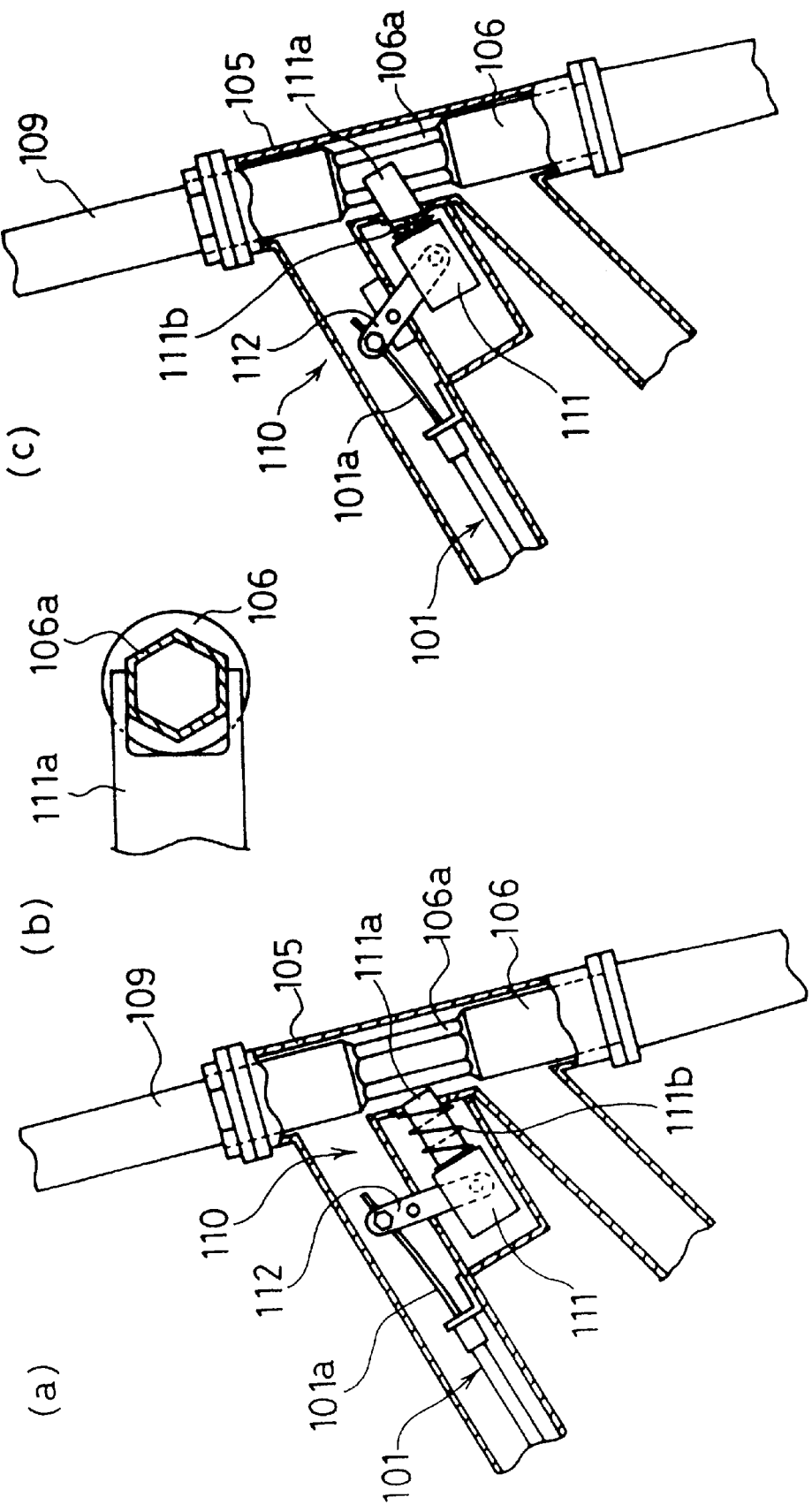
In FIG. 22, (a) is a fragmentary enlarged front view showing in said embodiment the state of a handle locking mechanism when the saddle is in the in-service state.
Figure 23:
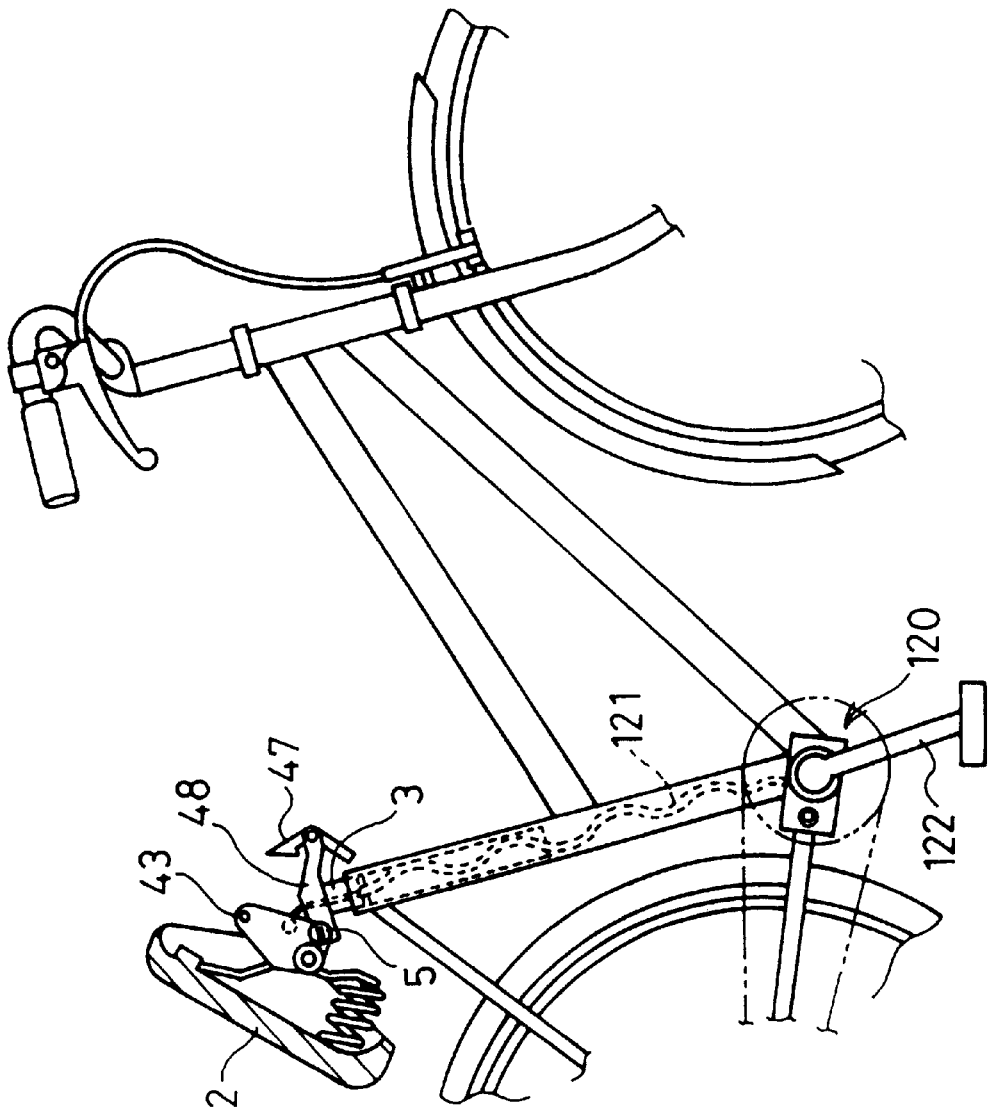
FIG. 23 is a fragmentary front view of a bicycle with an antitheft device according to a tenth embodiment of the present invention.

Further, as shown in a ninth embodiment in FIGS. 21 and 22, a handle locking mechanism 110 of different construction may be used to restrain the handle 102 from moving.

That is, an engaging member 111 having an arm 111a adapted to move into and out of engagement with an octagonal section 106a formed in the front fork 106 is connected to the front end of the inner wire 101a of the connecting wire 101 through a crank lever 112. Therefor, when the saddle 2 turned from the in-service position to the parked position, it is locked by the cylinder lock 5 and, as shown in (a)–(c) of FIG. 22, the arm 111a of the engaging member 111 engages the octagonal section 106a of the front fork 106 through the crank lever 112 which is pulled by the inner wire 110a of the connecting wire 101, whereby the front fork 106, the handle stem 109 and handle 102 fixed to said front form 106 are restrained from moving.

With this arrangement also, in operative connection with the turning movement of the saddle 2, the handle 102 is automatically nonrotatably fixed by the handle locking mechanism 110, so that any attempt to ride will fail. In addition, in FIG. 22, the character 111b denotes a return spring for the engaging member 111.

Figure 25:
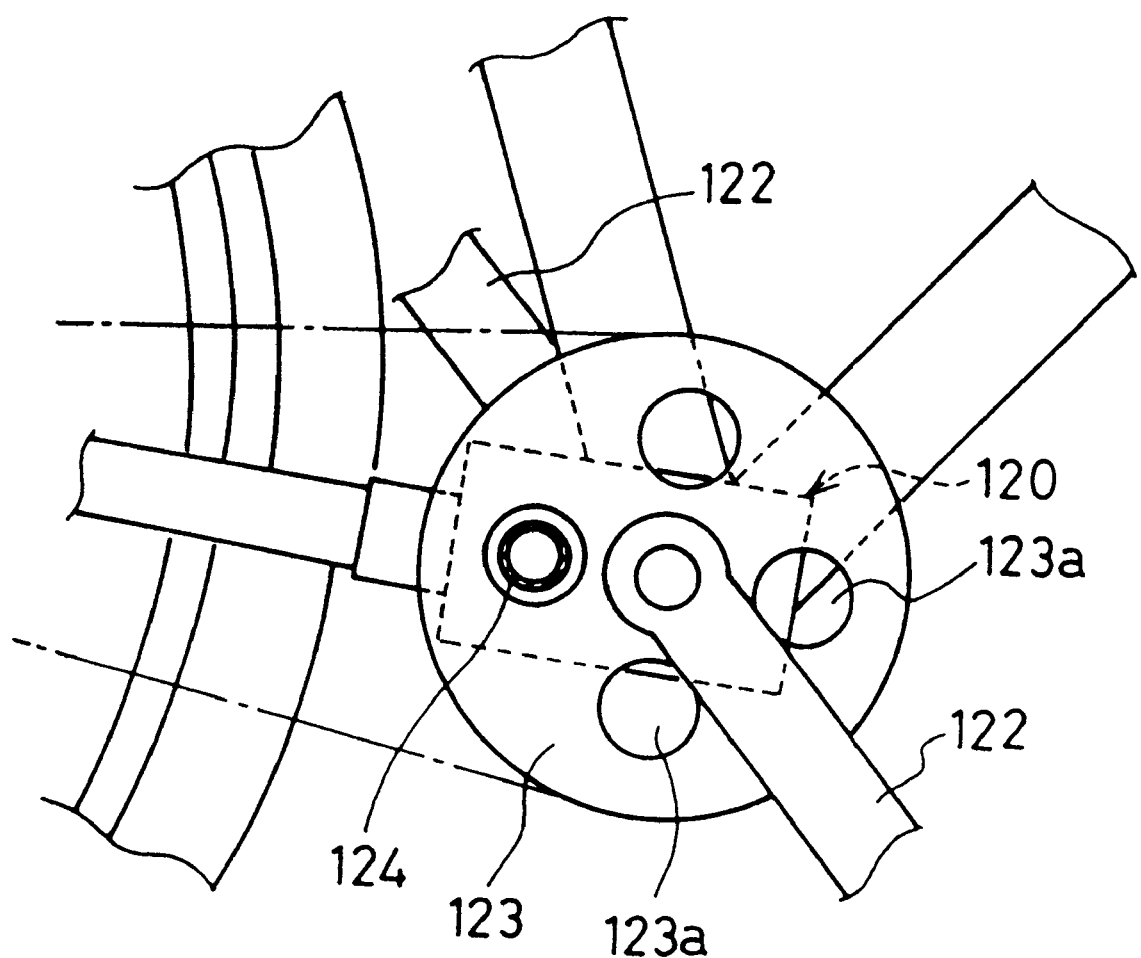
FIG. 25 is a principal front view of a crank gear plate when the saddle is in the parked state in said embodiment.
Figure 26:
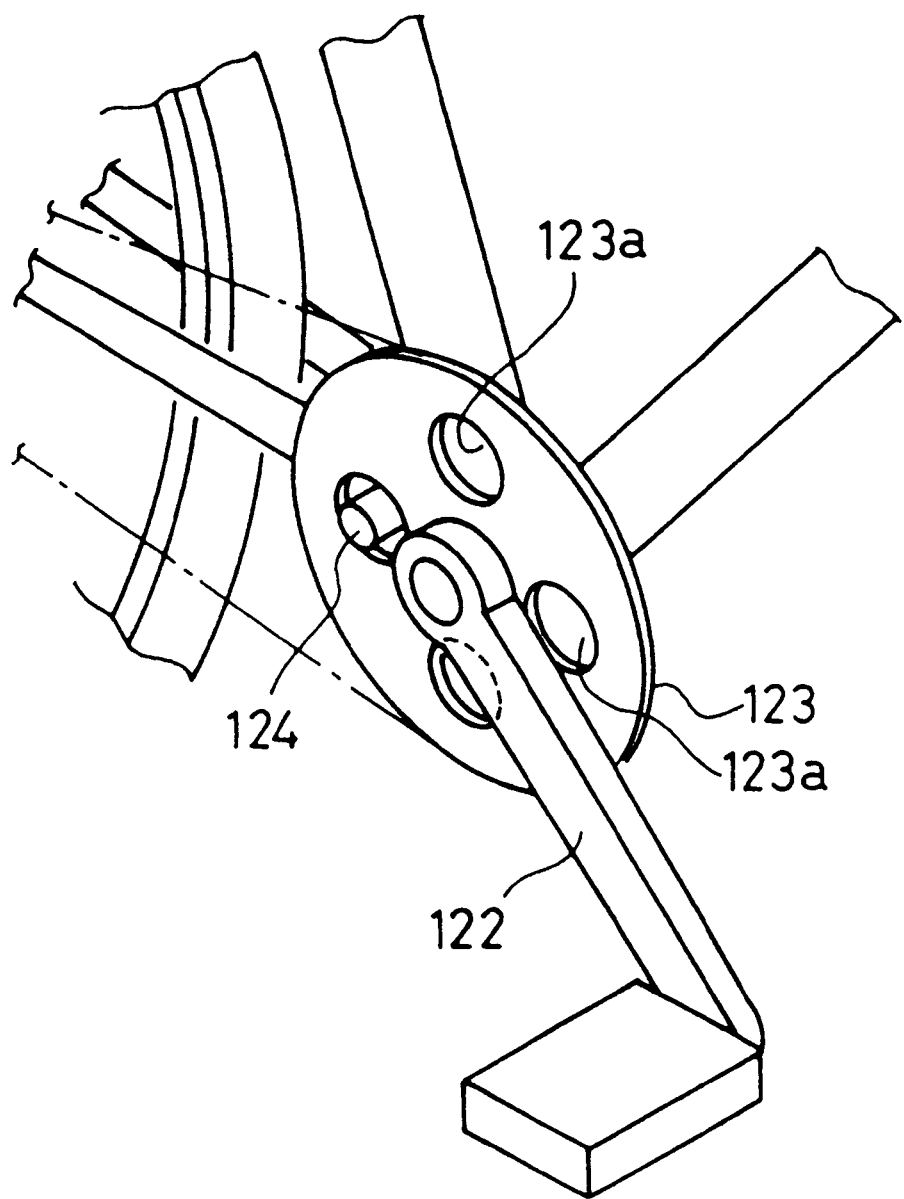
FIG. 26 is a principal perspective view of the crank gear plate when the saddle in said embodiment is in the parked state.

Further, FIGS. 23 through 26 show a tenth embodiment of the invention, wherein the parts having the same constructions or functions as in the preceding embodiment are denoted by the same reference characters as used before and a detailed description thereof is omitted, and chiefly the parts different from those described above will be described. In this embodiment, a connecting wire 121 which transmits the turning movement of the saddle 2 from the in-service state to the parked state is connected to a crank locking mechanism 120 which restrains a crank arm 122 from moving. And when the saddle 2 is turned from the in-service position to the parked position, as shown in FIGS. 24 through 26, a locking bar 124 connected to a crank lever 125 which is adapted to swing around the axis of a shaft 125a connected to the inner wire 121a of a connecting wire 121 is inserted into an ornamental hole 123a in a gear plate 123. With this arrangement also, when the saddle 2 is turned from the in-service state to the parked state, it is locked by the cylinder lock 5 and in operative connection with the turning movement of the saddle 2, the crank locking mechanism 120 restrains a pedaling crank arm 122 from moving, thus making it impossible to ride.

Figure 27:
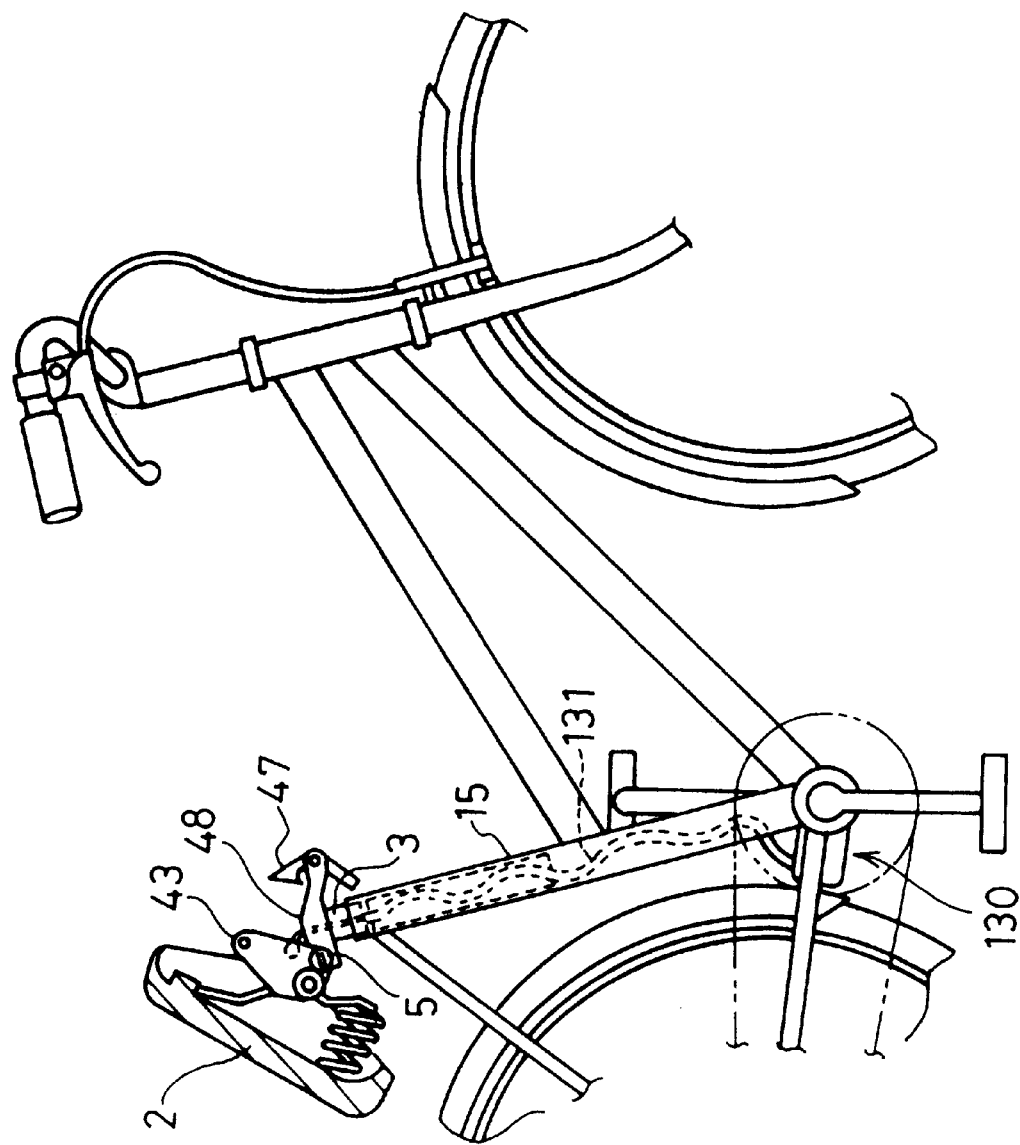
FIG. 27 is a fragmentary front view of a bicycle with an antitheft device according to an 11th embodiment of the present invention.

Further, FIGS. 27 and 28 show an 11th embodiment of the invention, wherein the parts having the same constructions or functions as in the preceding embodiment are denoted by the same reference characters as used before and a detailed description thereof is omitted, and chiefly the parts different from those described above will be described. In this embodiment, a connecting wire 131 which transmits the turning movement of the saddle 2 from the in-service state to the parked state is connected to a crank locking mechanism 130 which restrains the crank shaft 132 from moving. That is, in this embodiment, the crank shaft 132 is formed with a plurality of teeth 132a, and a support plate 134 installed in the vicinity of the crank shaft 132 is provided with a crank lever 136 which swings through a pin 135. Further, one end of a crank lever 136 is connected to the inner wire 131a of the connecting wire 131.

And when the saddle 2 is turned from the in-service position to the parked position, it is locked by the cylinder lock 5 and, as shown in (a) and (b) of FIG. 28, the turning movement of the saddle 2 causes the toothed section 136a formed on the other end of the crank lever 136 to mesh with the toothed section 132a of the crank shaft 132, thereby restraining the crank shaft 132 from rotating; thus, making it impossible to ride.

Figure 29:
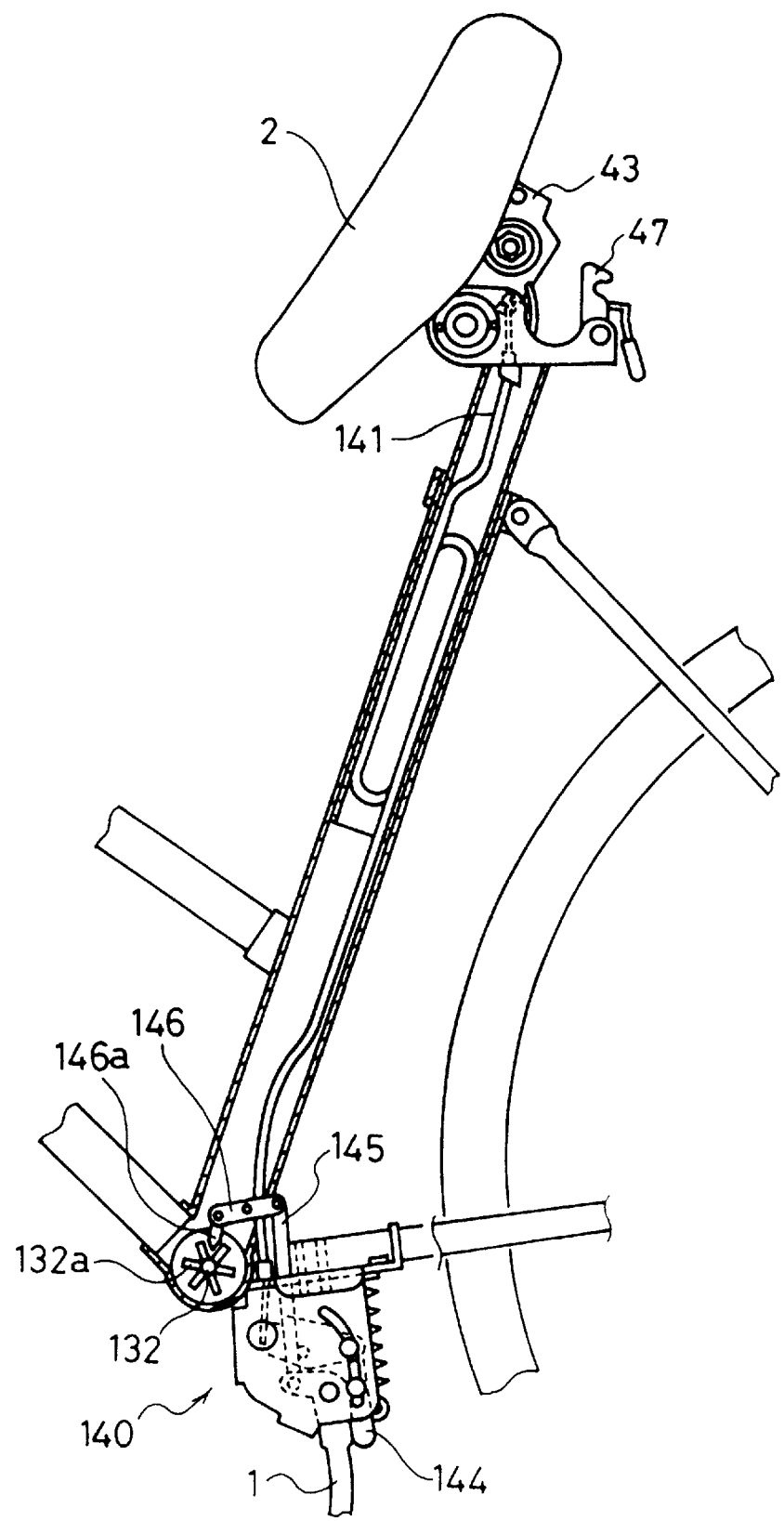
FIG. 29 is a fragmentary front view of a bicycle with an antitheft device according to a 12th embodiment of the present invention.
Figure 30:
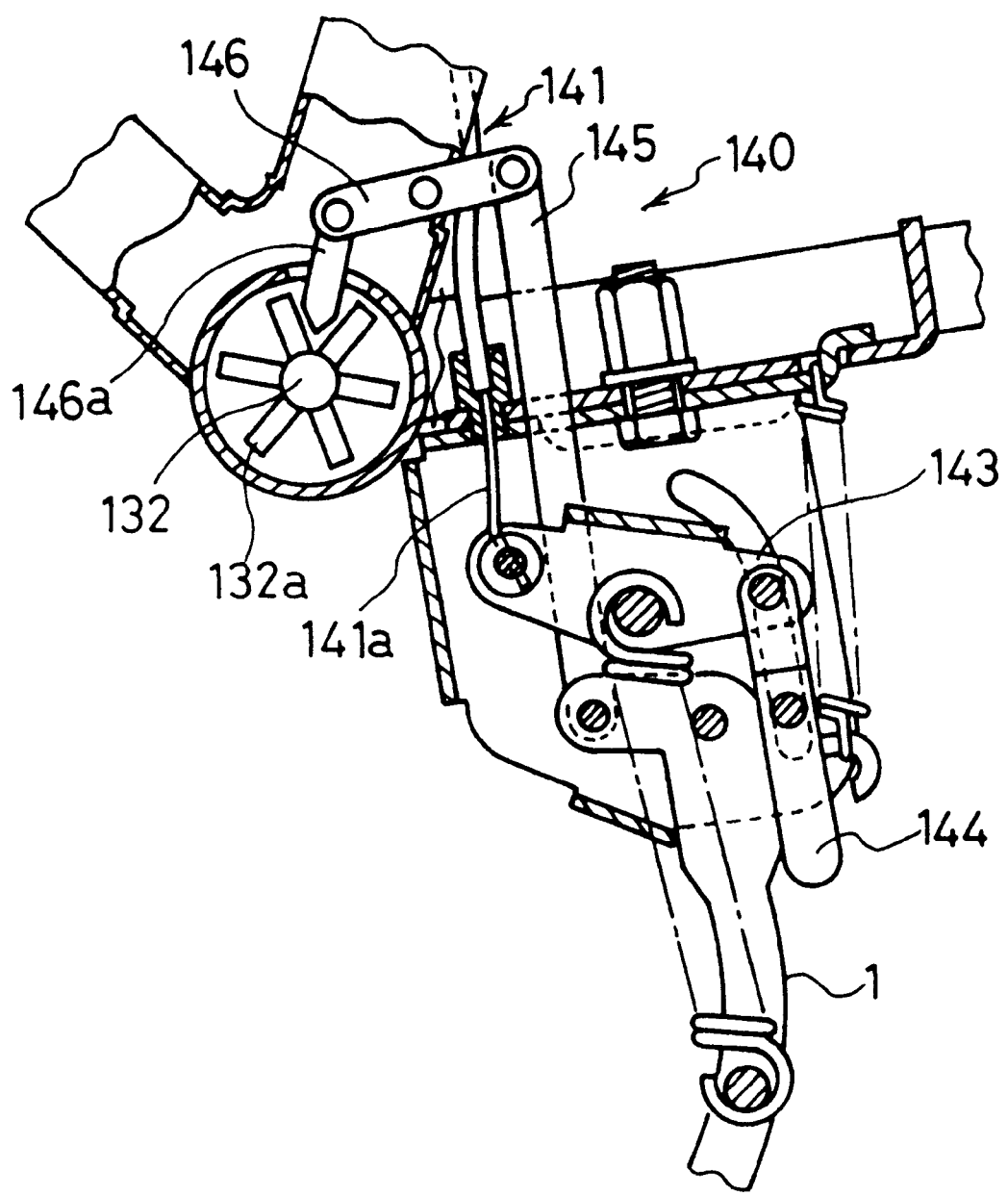
FIG. 30 is a fragmentary enlarged front view showing in said embodiment the state of a crank stand locking mechanism when the saddle is in the parked state.

Further, FIGS. 29 and 30 show a 12th embodiment of the invention, wherein the parts having the same constructions or functions as in the preceding embodiment are denoted by the same reference characters as used before and a detailed description thereof is omitted, and chiefly the parts different from those described above will be described. In this embodiment, a connecting wire 141 which transmits the turning movement of the saddle 2 from the in-service state to the parked state may be connected to a crank stand locking mechanism 140 which restrains a pedal crank shaft 132 from moving and which locks the stand 1 in the erected state. In this embodiment, when the saddle 2 is turned from the in-service state to the parked state to pull the inner wire 141*a* of the connecting wire 141 connected to the saddle 2 by the cylinder lock 5, a first arm 143 and a second arm 144 are moved to the positions shown in FIG. 30, so that the stand 1 is locked in the erected state, and concurrently therewith the toothed section 146*a* formed on the other end of the crank lever 146 meshes with the toothed section 132*a* of the pedal crank shaft 132 through the intermediary of a crank lever 146 and a third arm 145 connected to the stand 1, thereby restraining the pedal crank shaft 132 from rotating, thus making it impossible to ride.

According to this embodiment, since the turning movement of the saddle 2 from the in-service state to the parked state is transmitted to the crank stand locking mechanism 140 which performs two functions, namely, the function of locking the stand 1 in the erected state and the function of restraining the turning movement of the pedal crank shaft 132, three functions of the bicycle are regulated, so that the bicycle is protected more positively from being stolen. In addition, in this embodiment, no cylinder lock is illustrated; however, it goes without saying that such cylinder lock may be provided in the saddle 2 or the crank stand locking mechanism 140.

Figure 31:
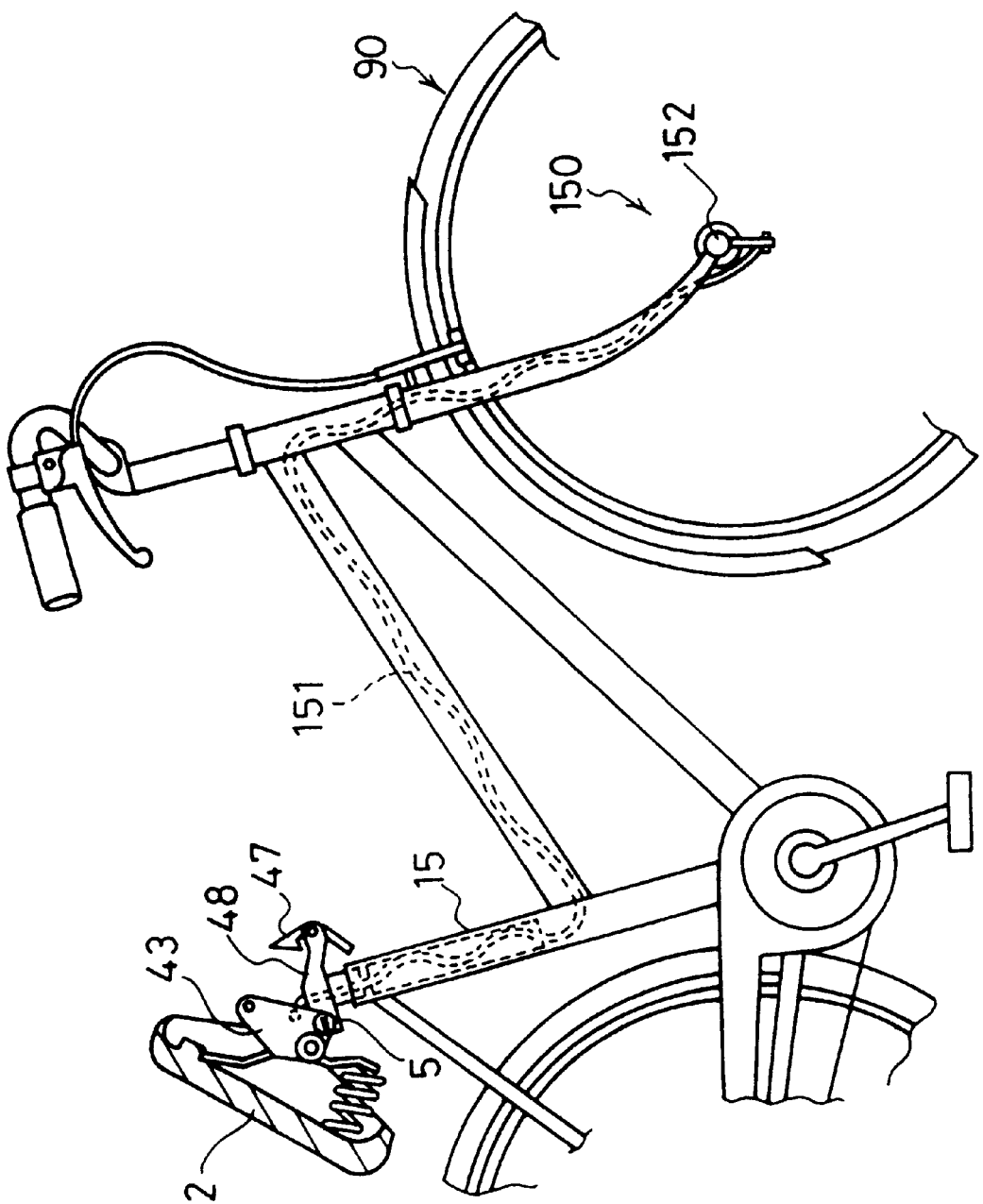
FIG. 31 is a fragmentary front view of a bicycle with an antitheft device according to a 13th embodiment of the present invention.
Figure 33:
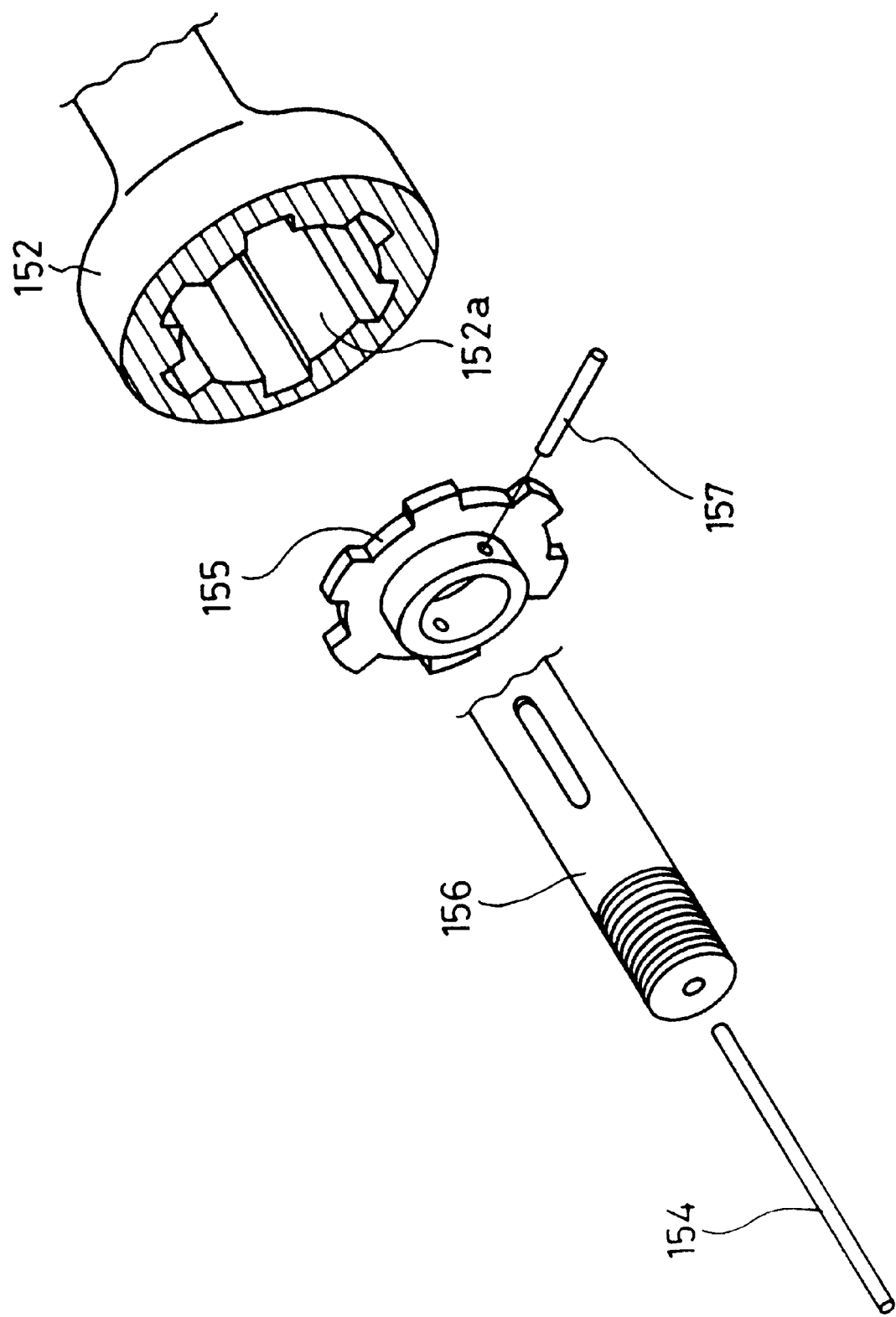
FIG. 33 is a principal developed perspective view of the hub locking mechanism in said embodiment.

Further, FIGS. 31 through 33 show a 13th embodiment of the invention, wherein the parts having the same constructions or functions as in the preceding embodiment are denoted by the same reference characters as used before and a detailed description thereof is omitted, and chiefly the parts different from those described above will be described. In this embodiment, a connecting wire 151 which transmits the turning movement of the saddle 2 from the in-service state to the parked state is connected to a hub locking mechanism 150 which restrains the hub body 152 of the front wheel 90 from moving. That is, in this embodiment, one end of an L-shaped crank swingable lever 153 is connected to the inner wire 151*a* of the connecting wire 151, and said L-shaped crank lever 153 is connected through a crank rod 154 to a slide member 155, which is movable transversely of a hub shaft 156 within the hub body 152, by a pin 157. As shown in FIG. 33, the slide member 155 is substantially in the form of a gear, and the portion of the hub body 152 corresponding to the slide member 155 is also formed with internal toothed section 152*a* of similar shape.

And when the saddle 2 is turned from the in-service position to the parked position, it is locked by the cylinder lock 5, and the turning movement of the saddle 2 results in pulling the inner wire 151*a* of the connecting wire 151, whereupon, as shown in (a) and (b) of FIG. 32, the slide member 155 engages the internal toothed section 152*a* of the hub body 152, thereby locking the hub body 152, and hence the front wheel 90, so as to prevent it from rotating.

With this arrangement also, since the front wheel 90 is locked by the hub locking mechanism 150 in operative connection with the turning movement of the saddle 2, it becomes impossible to ride. In addition, in FIGS. 31 through 33, the numeral 158 denotes a bearing for rotatably supporting the hub body 152 with respect to the hub shaft 156, and 159 denotes a spring for urging the slide member 155 away from the internal toothed section 152*a* of the hub body 152.

Figure 34:
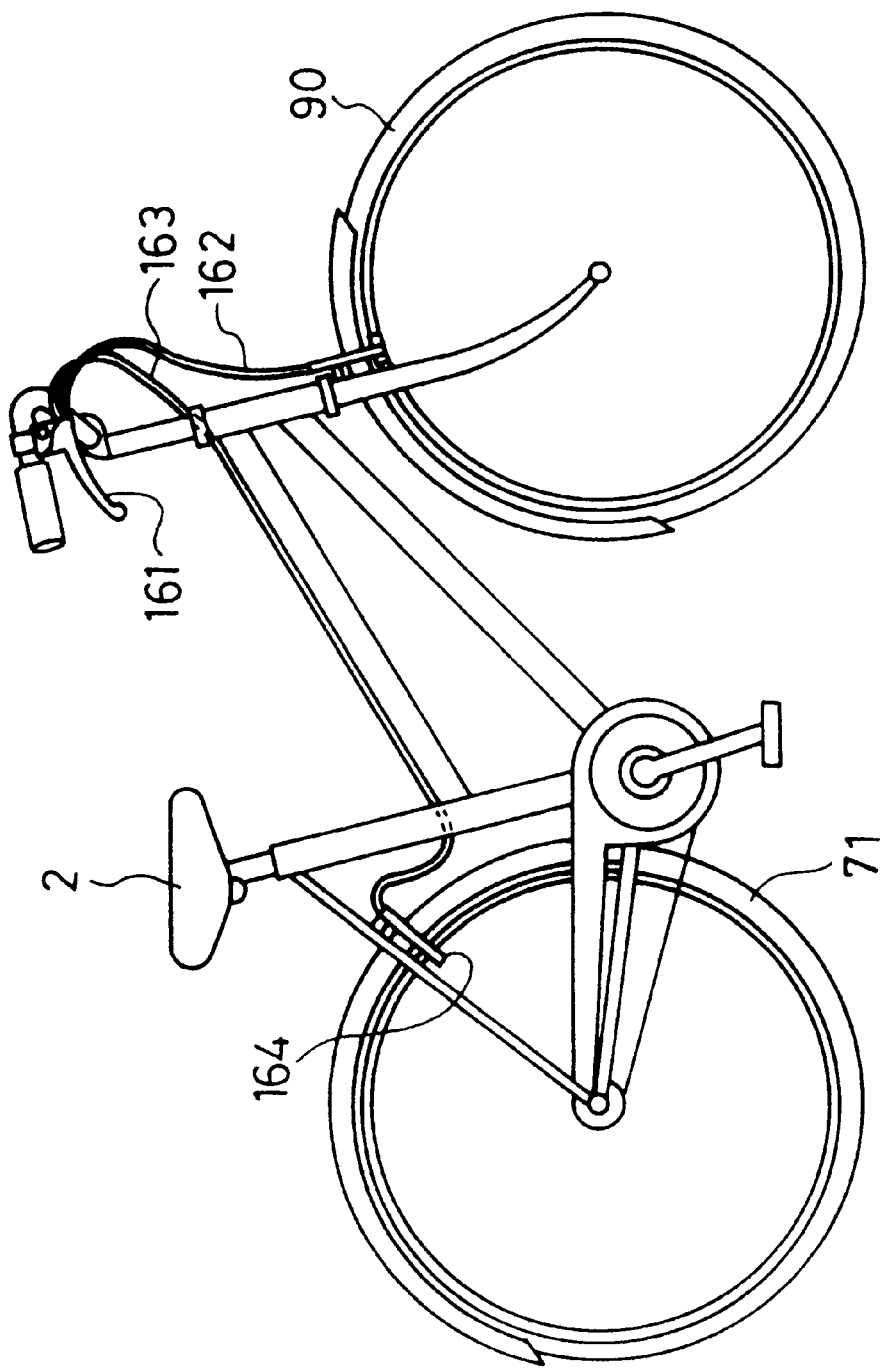
FIG. 34 is a fragmentary front view of a bicycle with an antitheft device according to a 14th embodiment of the present invention.
Figure 36:
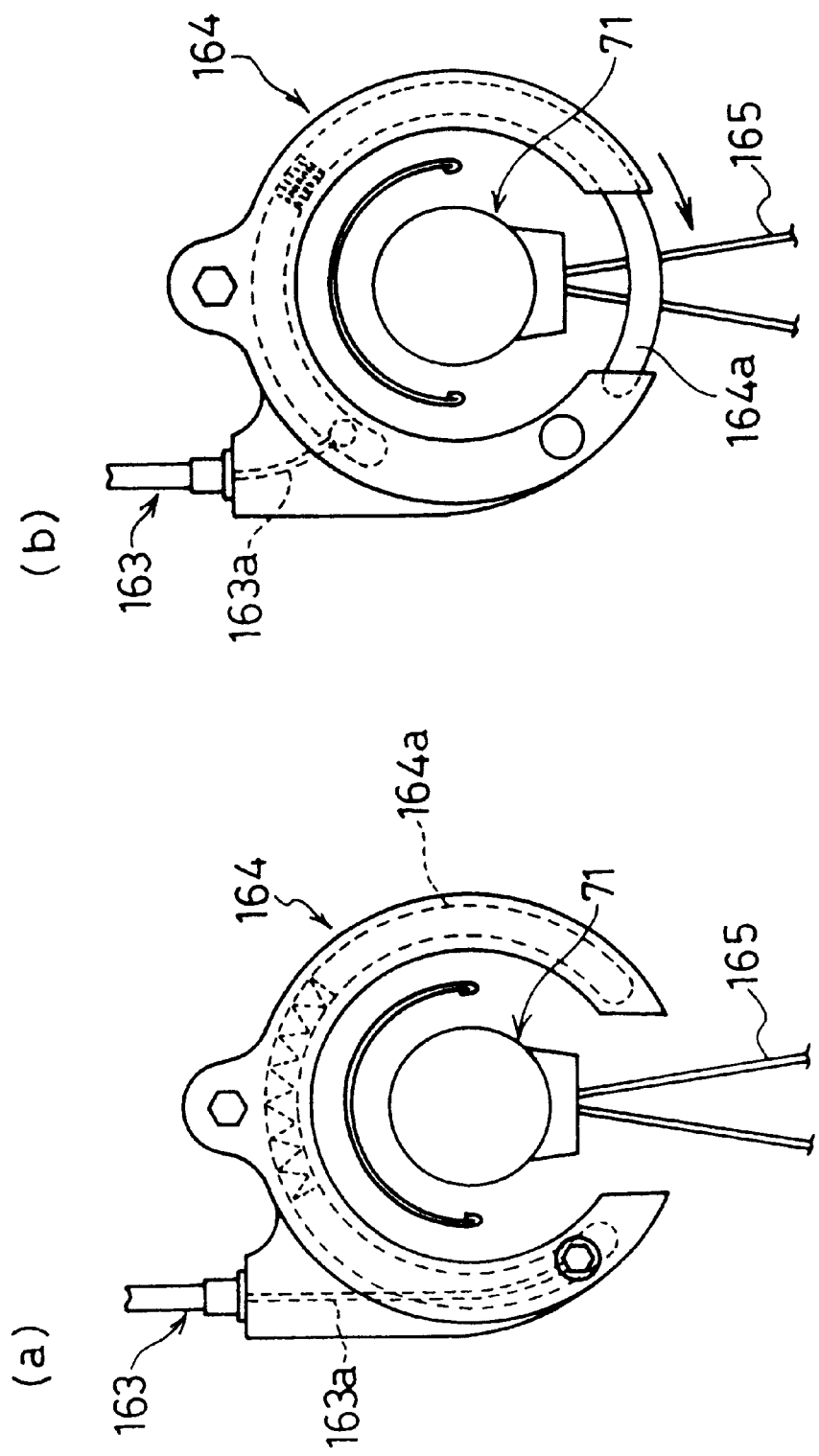
In FIG. 36, (a) is a fragmentary enlarged front view showing in said embodiment the state of a circle lock when it is in the in-service state.

FIGS. 34 through 36 show a 14th embodiment of the invention. The parts having the same constructions or functions as in the preceding embodiment are denoted by the same reference characters as used before and a detailed description thereof is omitted, and chiefly the parts different from those described above will be described. In this embodiment, a connecting wire 163 which, separate from a wire 162 associated with the brake device for the front wheel 90, transmits an operation directed to the lock position (see (b) of FIG. 35) of a brake lever 161 for braking the front wheel 90 to said brake lever 161 is connected to a circle lock 164 installed on the rear wheel 71. And when the brake lever 161 is operated to move from the in-service position shown in (a) of FIG. 35 to the locked position shown in (b) of FIG. 35, the locking bar 164*a* of the circle lock 164 is inserted between spokes 165 of the rear wheel 71 by the inner wire 163*a* of the connecting wire 163, as shown in (a) and (b) of FIG. 36, thereby preventing the rear wheel 71 from rotating.

According to this arrangement, the circle lock 164 for the rear wheel 71 is automatically locked in the non-running state in operative connection with the locking operation of the brake lever 161; thus, performing such locking operation makes it impossible to operate the brake lever 161 and inhibits the rotation of the rear wheel 71. In addition, in FIG. 35, the numeral 166 denotes a cylinder lock for locking the brake lever 161 in the locked position, and 167 denotes a protective bar for protecting the brake lever 161 from moving to the locked position during use.

Figure 37:
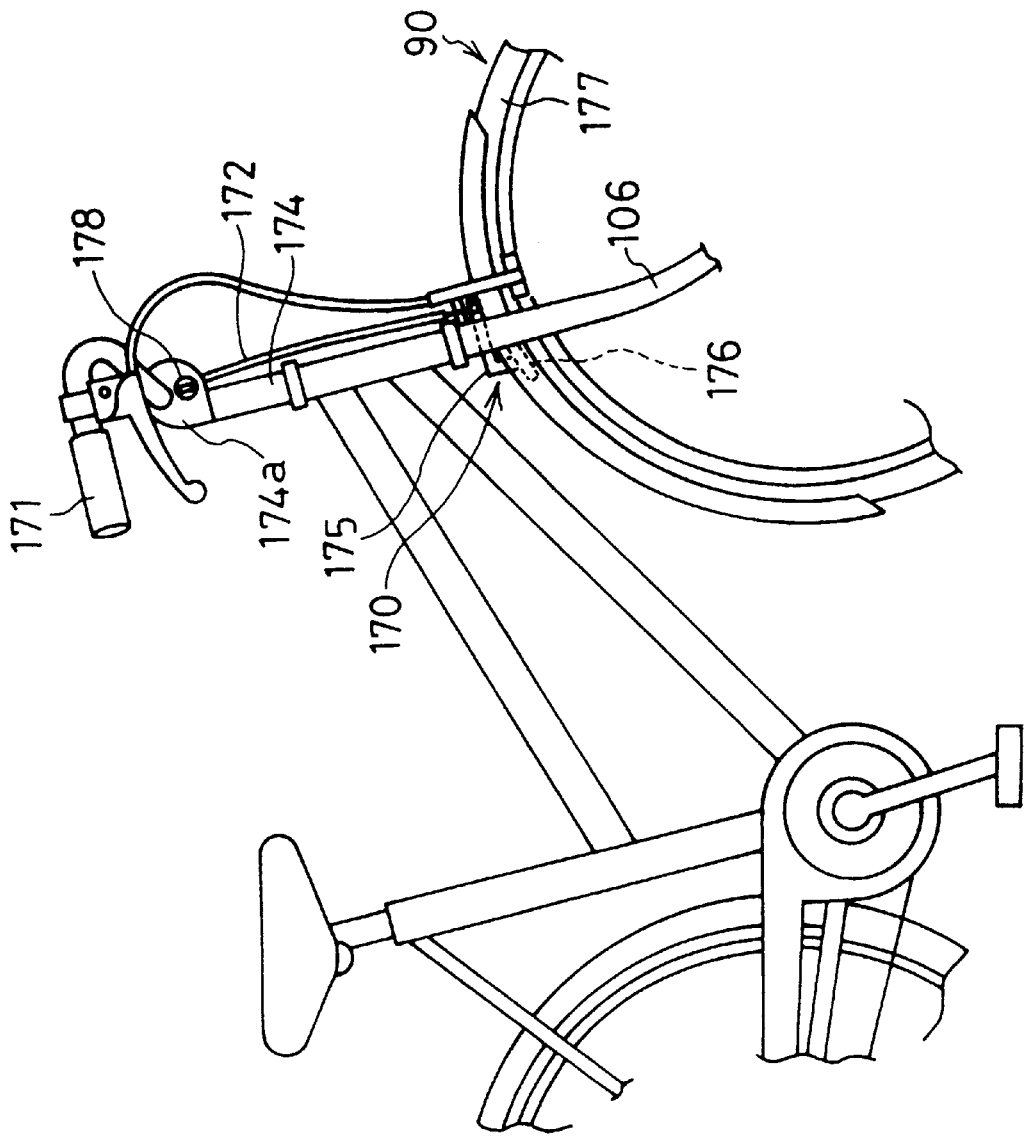
FIG. 37 is a fragmentary front view of a bicycle with an antitheft device according to a 15th embodiment of the present invention.
Figure 38:
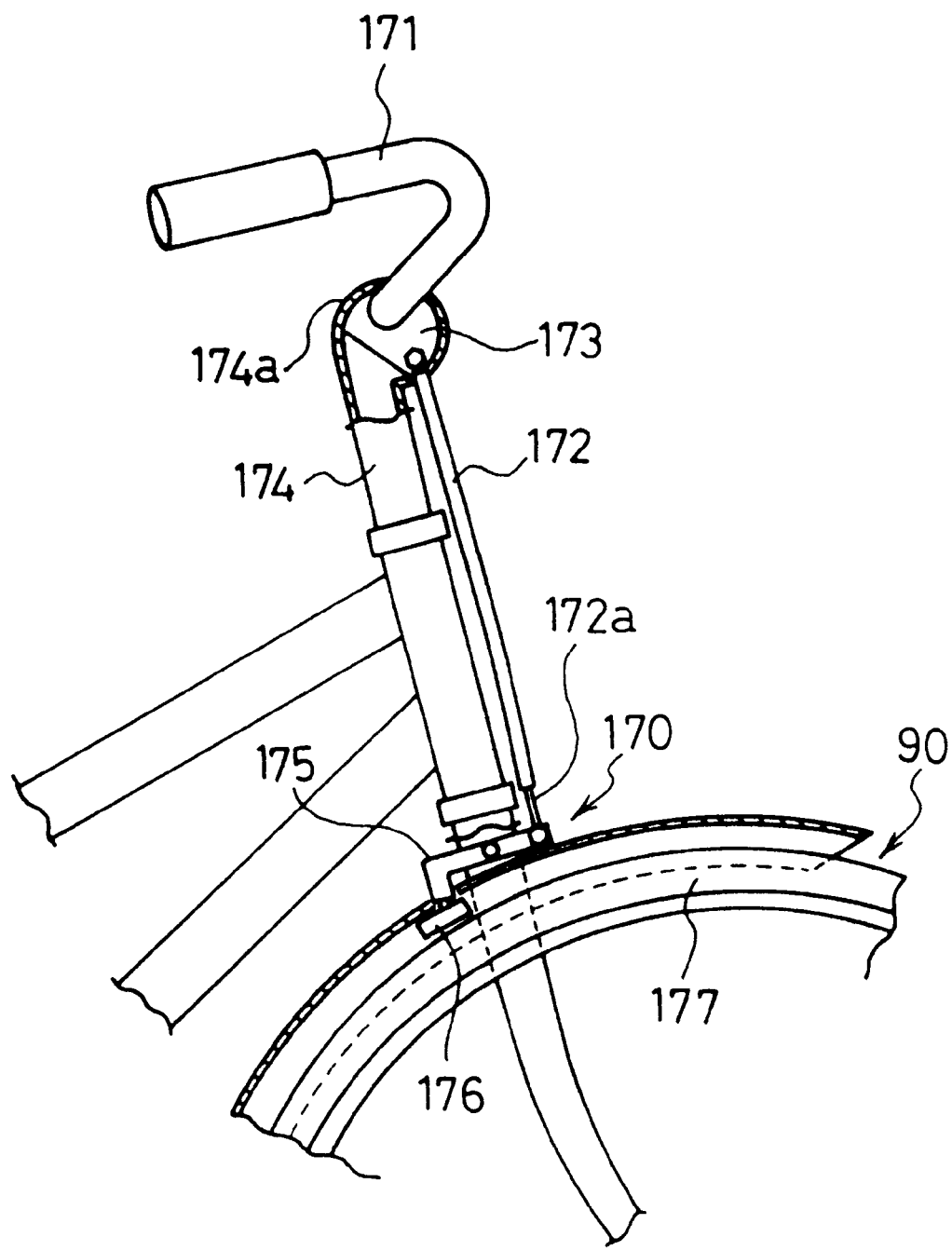
FIG. 38 is a fragmentary front view showing in said embodiment the state of a front wheel locking device when the handle is in the in-service state.
Figure 39:
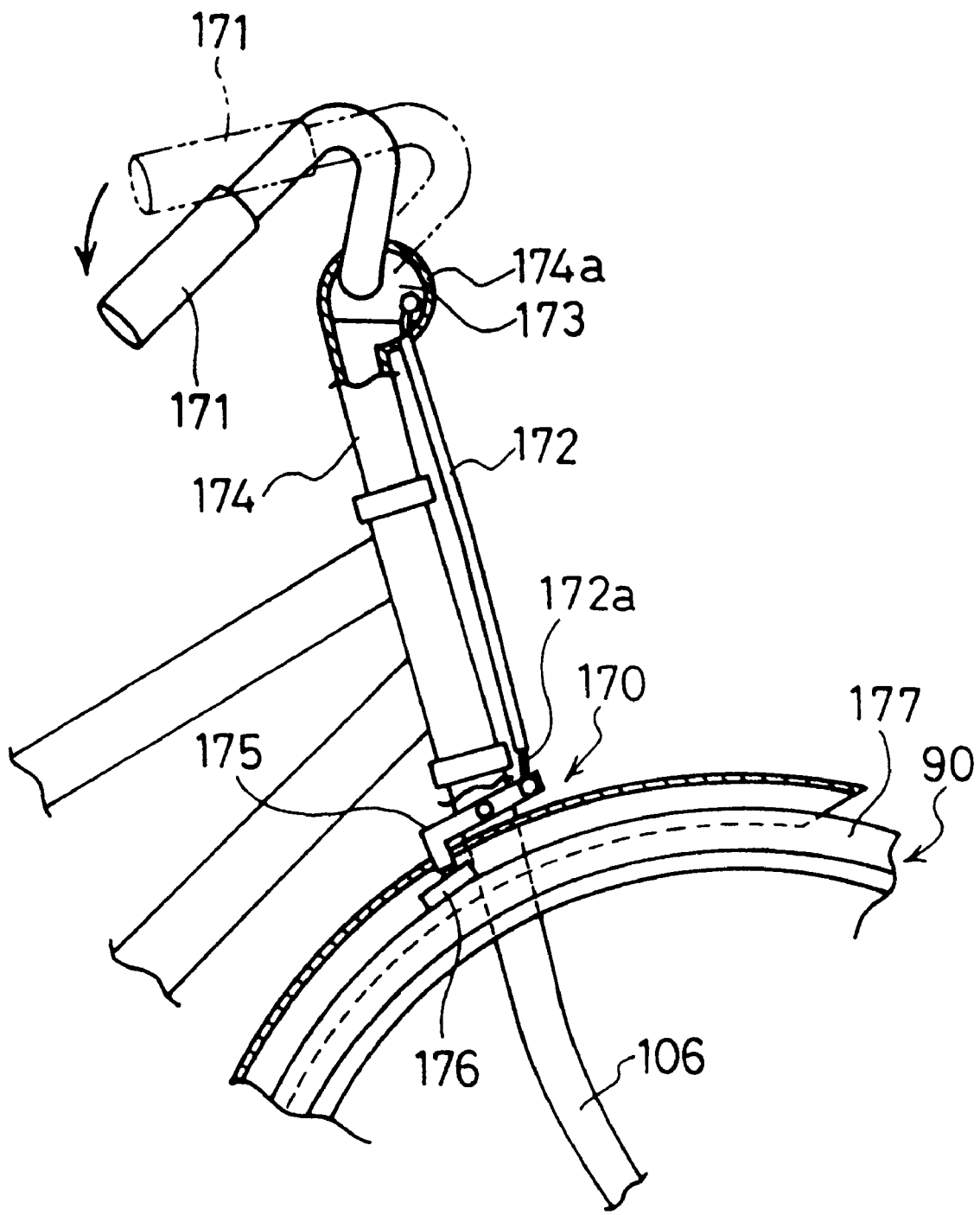
FIG. 39 is a fragmentary front view showing in said embodiment the state of the front wheel locking device when the handle is in the parked state.

FIGS. 37 through 39 show a 15th embodiment of the invention. The parts having the same constructions or functions as in the preceding embodiment are denoted by the same reference characters as used before and a detailed description thereof is omitted, and chiefly the parts different from those described above will be described. In this embodiment, the handle, i.e., handlebar 171 is downwardly turnable, it being arranged that when the handle 171 is turned downward, a front wheel locking device 170 for braking the front wheel 90 is actuated through the connecting wire 172. That is, in this embodiment, a circular member 173 attached to the middle of the handle 171 is turnable around a transverse axis in a cylindrical frame 174*a* formed in the upper end of the handle stem 174, and the inner wire 172*a* of the connecting wire 172 is connected to said circular member 173. And connected to the other end of said inner wire 172*a* is a connecting lever 175 swingably supported on a front fork 106, and a brake member 176 attached to said connecting lever 175 is allowed to abut against the tire 177 of the front wheel 90.

Therefore, when the handle 171, which is automatically locked by the cylinder lock 178, is turned downward, it becomes hard to hold by hand and with this downward turning movement, the brake member 176 is pressed against the tire 177 of the front wheel 90 through the connecting wire 172 and connecting lever 175, thereby restraining the rotation of the front wheel 90. In addition, the numeral 178 in FIG. 37 denotes a cylinder lock for locking the handle 171 in its individual positions (the upper normal position and the lower abnormal position).

Figure 40:
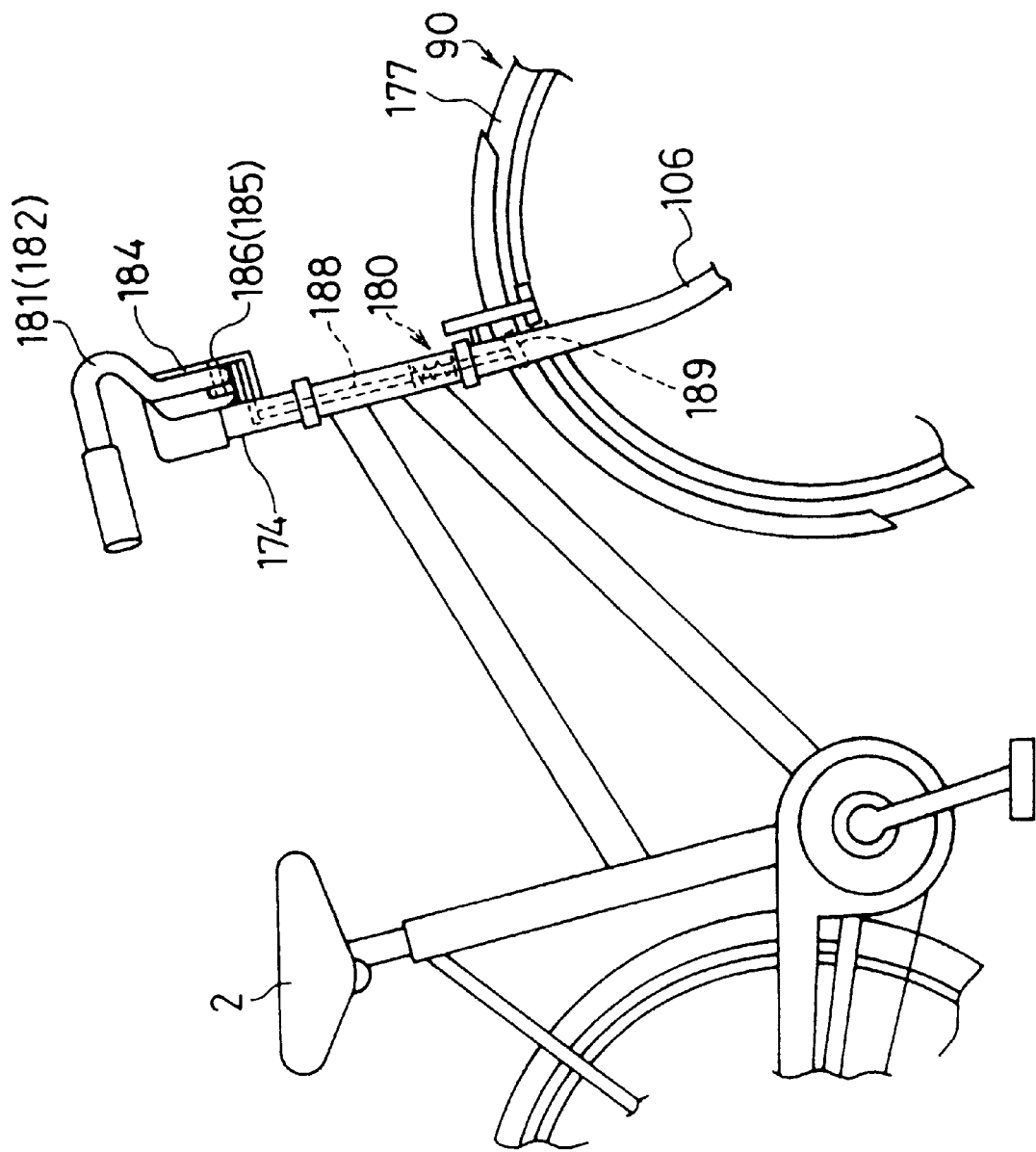
FIG. 40 is a fragmentary front view of a bicycle with an antitheft device according to a 16th embodiment of the present invention.
Figure 41:
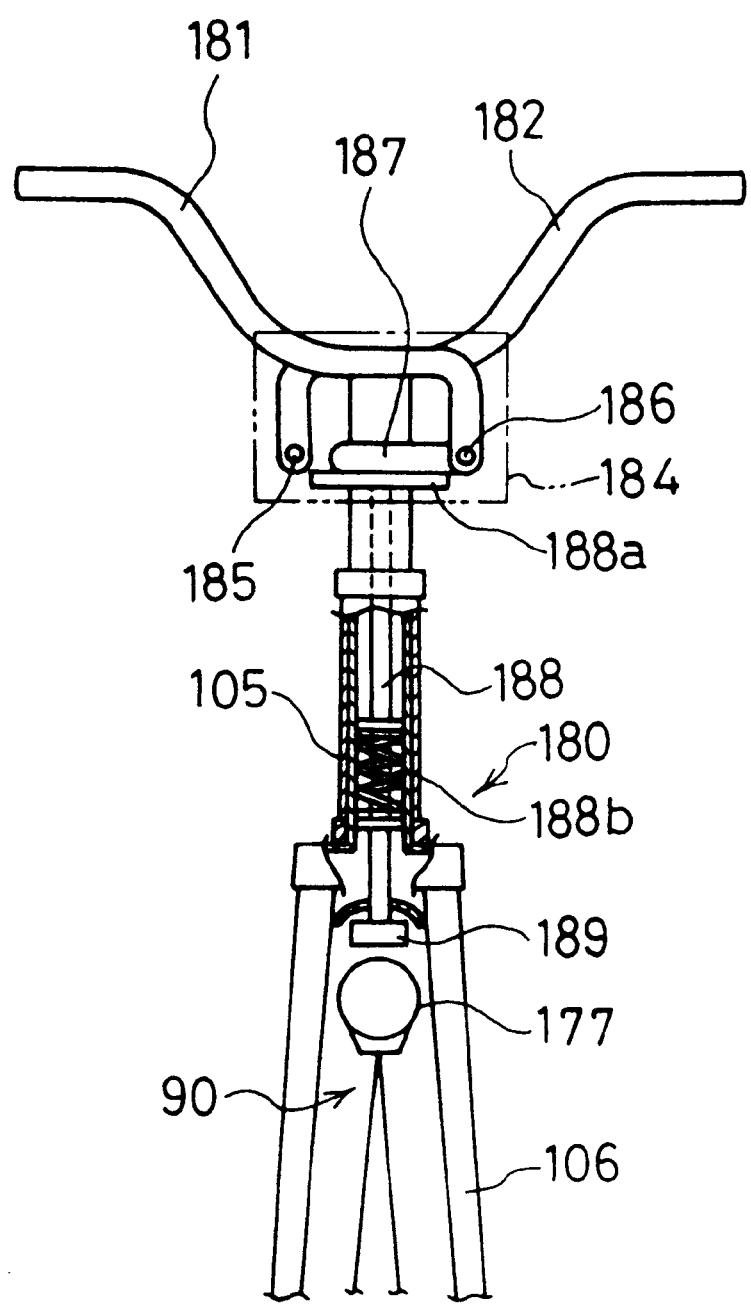
FIG. 41 is a fragmentary front view showing in said embodiment the state of a front wheel locking device when the handle is in the in-service state.
Figure 42:
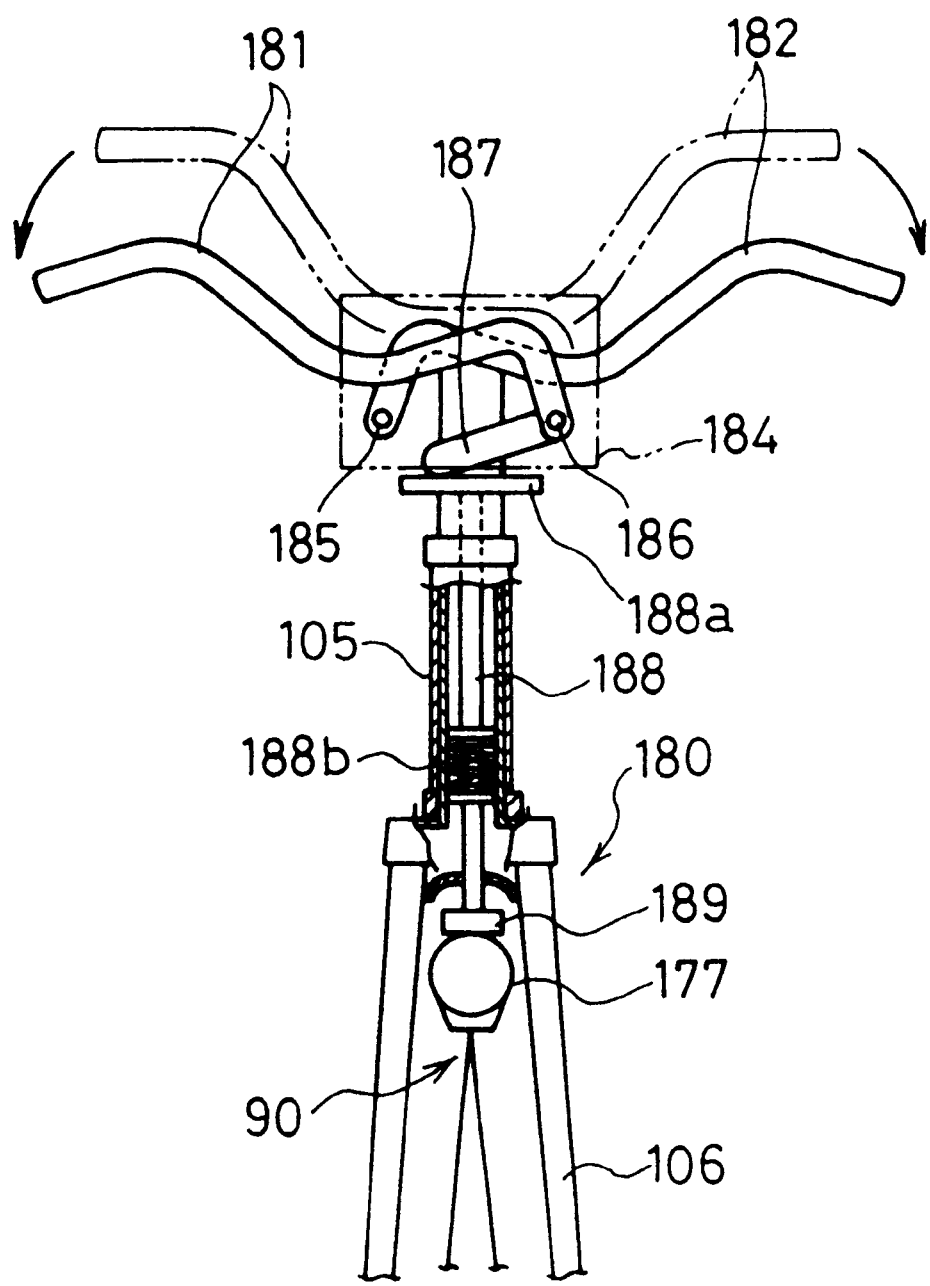
FIG. 42 is a fragmentary front view showing in said embodiment the state of the front wheel locking device when the handle is in the parked state.

FIGS. 40 through 42 show a 16th embodiment of the invention. The parts having the same constructions or functions as in the preceding embodiment are denoted by the same reference characters as used before and a detailed description thereof is omitted, and chiefly the parts different from those described above will be described. In this embodiment, handles, i.e., handlebars 181 and 182 are turnable, it being arranged that when these handles 181 and 182 are turned downward, a front wheel locking device 180 for braking the front wheel 90 is actuated through a connecting piston member 188. That is, in this embodiment, a handle support plate 184 is attached forwardly of the handle stem 174, and handles 181 and 182 are turnable around the axes of shafts 185 and 186 attached to said handle support plate 184 (the shaft of the cylinder lock described in the preceding embodiment is utilized in order to lock the handles 181 and 182 in the in-service position and in the parked position). And a handle connecting member 187 fixed to one handle 181 abuts against the upper plate 188a of the connecting piston member 188 liftably supported in a head tube 105, and a brake member 189 attached to the lower end of said connecting piston member 188 is adapted to abut against tire 177 of the front wheel 90.

Therefore, if the handles 181 and 182, which are locked by the cylinder lock, are unlocked by the key and turned downward to the parked position, they are rendered hard to hold by hand. And as the handle 181 is turned downward, the brake member 189 is pressed against the tire 177 of the front wheel 90 through the connecting piston member 188, thereby restraining the rotation of the front wheel 90. In addition, 188b in FIGS. 40 through 42 denotes a spring for urging the connecting piston upward.

Figure 43:
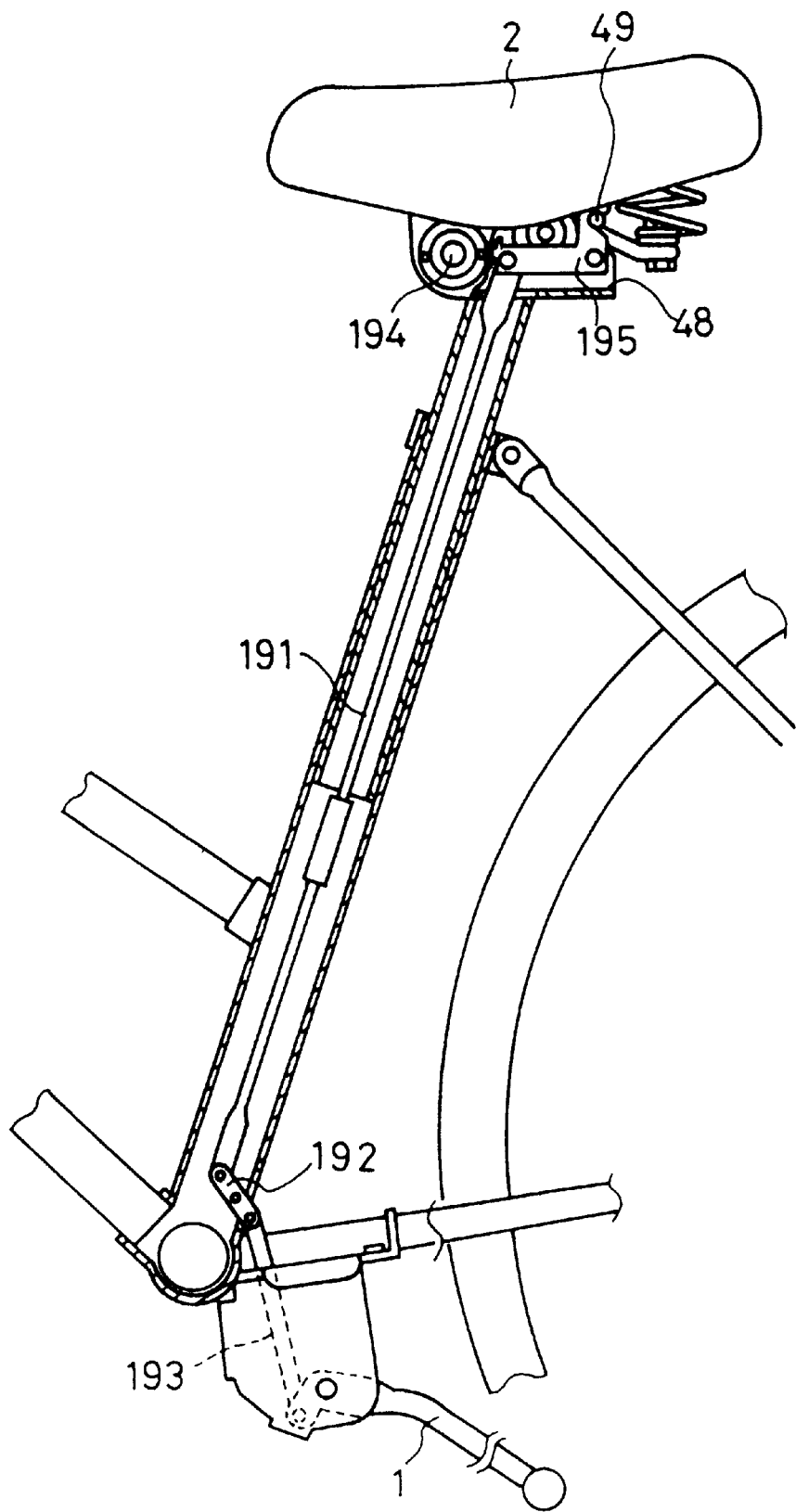
FIG. 43 is a fragmentary front view of a bicycle with an antitheft device according to a 17th embodiment of the present invention.
Figure 44:
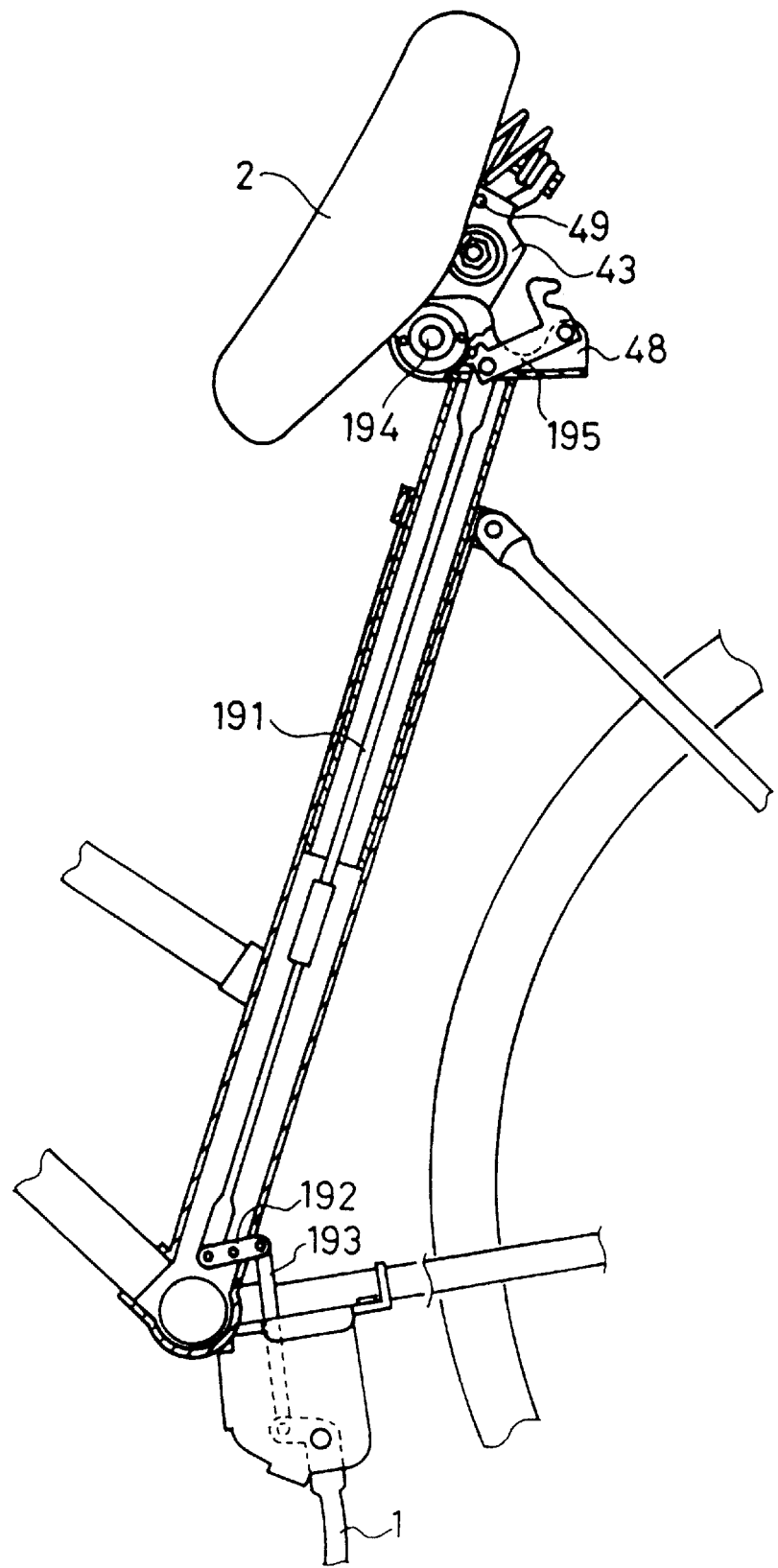
FIG. 44 is a fragmentary front view showing the bicycle * with an antitheft device in said embodiment when it is in the parked state.
Figure 45:
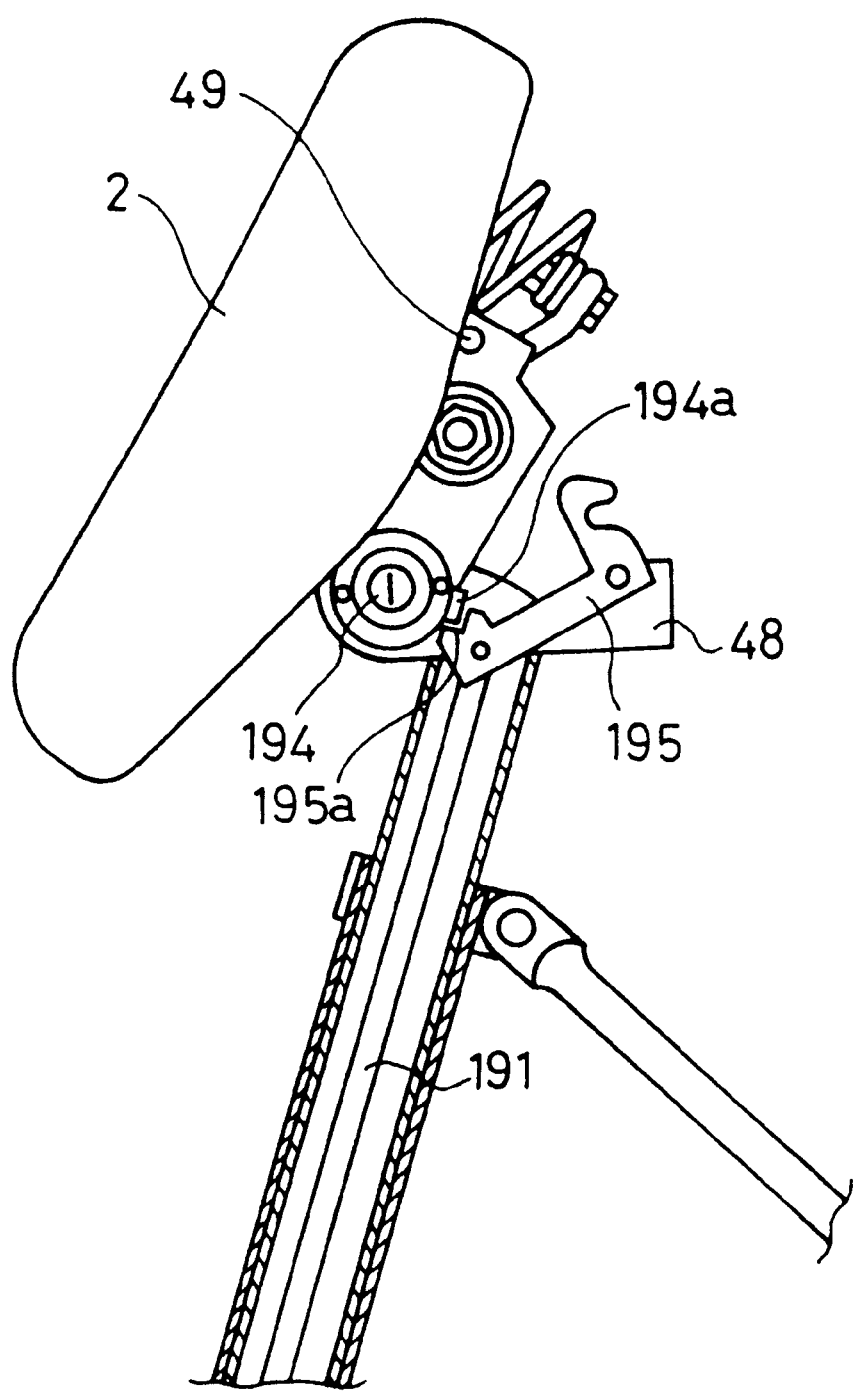
FIG. 45 is a fragmentary principal front view showing the bicycle with an antitheft device in said embodiment.

FIGS. 43 through 45 show a 17th embodiment of the present invention. The parts having the same constructions or functions as in the preceding embodiment are denoted by the same reference characters as used before and a detailed description thereof is omitted, and chiefly the parts different from those described above will be described. In this embodiment, the movement of the saddle 2 is operatively connected with the movement of the stand 1. That is, connected to the upper end of the connecting rod 191 for transmitting their movements is a hook 195 which is pivotally supported by a mounting member 48 disposed on the upper end of the seat pillar 3, said hook 195 being engageable with an engaging pin 49 fixed on the front end of the saddle support block 43. Further, the stand 1 is connected to the lower end of the connecting rod 191 through a first connecting link 192 and a second connecting link 193. And when the stand 1 is moved from the in-service position to the parked position, where the stand 1 is then erected, this movement of the stand 1 is transmitted to the hook 195 through the first connecting link 192, second connecting link 193 and connecting rod 191, whereupon the hook 195 is disengaged from the engaging pin 49 of the saddle support block 43, allowing the saddle 2 to be turned to the parked state.

Further, as shown in FIG. 45, a cylinder lock 194 is provided in the vicinity of the saddle 2. It is arranged that a locking lever 194a adapted to project when the cylinder lock 194 is fastened presses the recess 195a in the hook 195 to turn the saddle 2 until the latter assumes the parked state while the stand 1 is brought from the in-service position to the parked position.

That is, in this embodiment, either when the cylinder lock 194 associated with the saddle 2 is operated or when the stand 1 is operated, the movement involved is transmitted through the connecting rod 191 so that both the saddle 2 and the stand 1 are locked.

Figure 46:
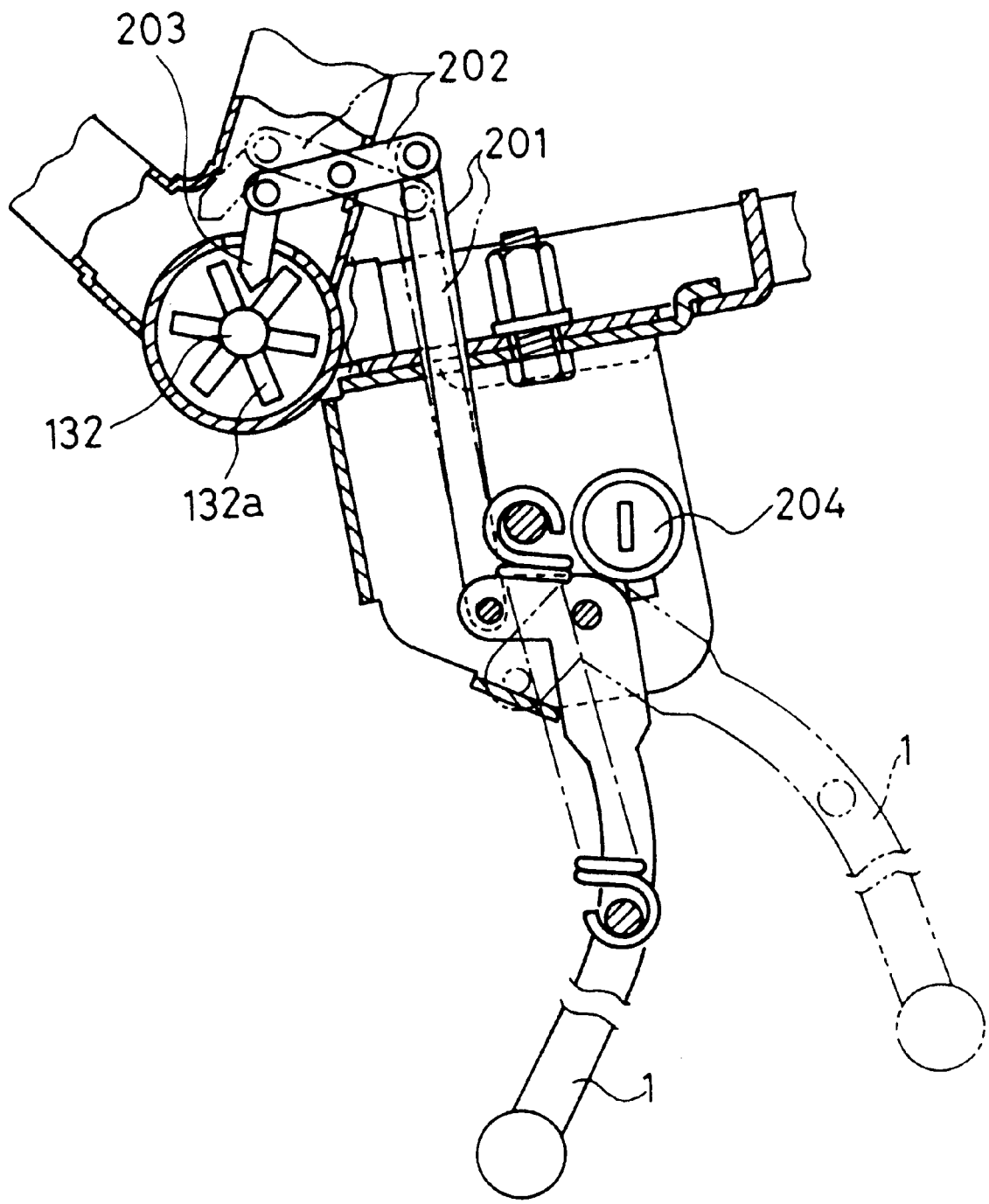
FIG. 46 is a fragmentary principal front view of a bicycle with an antitheft device according to a 18th embodiment of the present invention.

FIG. 46 shows a 18th embodiment of the invention. The parts having the same constructions or functions as in the preceding embodiment are denoted by the same reference characters as used before and a detailed description thereof is omitted, and chiefly the parts different from those described above will be described. In this embodiment, in connection with the movement for erecting the stand 1 and through a first connecting link 201 and a second connecting link 202, a locking toothed section 203 formed on the second connecting link 202 meshes with a toothed section 132a formed on a pedal crank shaft 132, thereby restraining the pedal crank 132 from moving. According to this embodiment, erecting the stand 1 makes it impossible to rotate the pedal crank shaft 132 and hence to ride the bicycle. In addition, 204 denotes a cylinder lock which, when the stand 1 is erected, automatically lock the stand 1 in that state.

Figure 47:
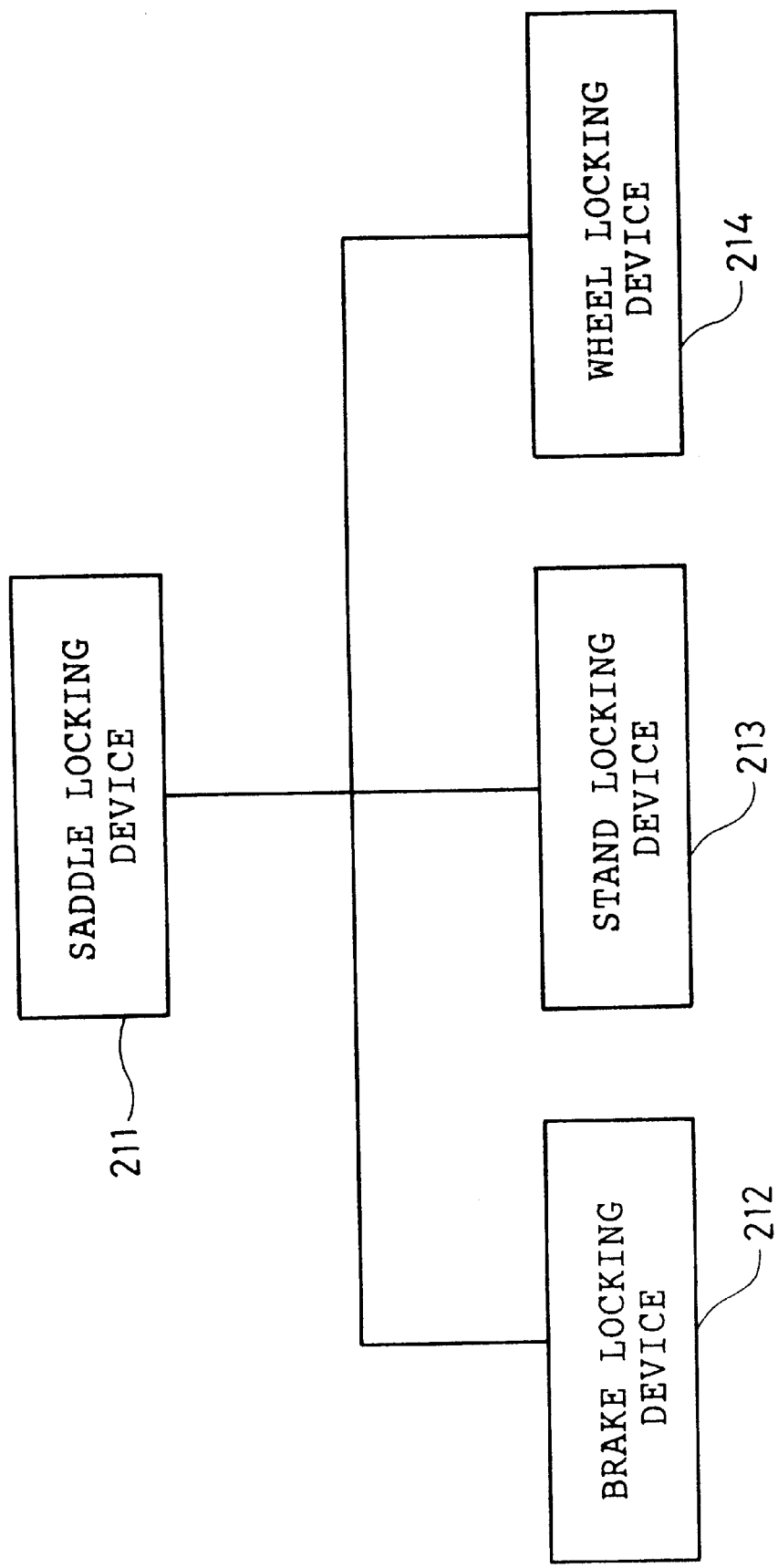
FIG. 47 is a block diagram of a bicycle with an antitheft device according to a 19th embodiment of the present invention.

As a further embodiment, as shown in FIG. 47, the locking operation of the saddle locking device 211 for locking the saddle in the parked state may be operatively connected with the brake locking device 212 for actuating the brakes, the stand locking device 213 for locking the stand in the erected state, and the wheel locking device 214 such as a circle lock for locking the wheel. According to this, simply operating the saddle enables separate three locking means to lock the respective portions; thus, theft can be prevented further reliably without requiring any troublesome operation.

In the above embodiments, as the plurality of functional means different in function constituting the bicycle, mention has been made of the saddle 2, running parts such as the front wheel 90 and rear wheel 71, and the torque transmission parts such as the handle 102 and pedal crank 122; however, the invention is not limited thereto.

What is claimed is:

1. A bicycle with an antitheft device, comprising:
    a saddle supported with respect to a seat pillar such that said saddle is movable between an in-service state and a parked state with a saddle seat surface inclined;
    a key device for locking the saddle in said parked state;
    a stand locking device for locking a stand in an erected state; and
    connecting means for bringing the stand locking device into a locked state in operative connection with the movement of the saddle from the in-service state to the parked state wherein the connecting means is disposed inside a seat tube of the bicycle frame.

2. A bicycle with an antitheft device, comprising:
    a saddle supported with respect to a seat pillar such that said saddle is movable between an in-service state and a parked state with a saddle seat surface being inclined;
    a key device for locking the saddle in said parked state;
    a stand locking device for locking a stand in an erected state; and
    a connecting rod adapted to be pulled up in operative connection with the movement of the saddle from the in-service state to the parked state and having a lower end connected to the stand locking device, said connecting rod being disposed inside a seat tube and seat pillar of a bicycle frame, said connecting rod being provided with fixing means adapted to be actuated with the saddle in said parked state for fixing the seat pillar with respect to the seat tube.

3. A bicycle with an antitheft device, comprising:
    a bicycle frame;
    a rear wheel supported by said bicycle frame and connected to transmission means including a pedal and a crank;
    a front wheel supported by said bicycle frame;
    a handlebar supported by said bicycle frame;

a saddle supported on a seat pillar installed on said bicycle frame;

a locking device for locking the bicycle in a non-running state;

wherein said saddle is attached to said seat pillar such that the saddle can be fixed at two positions establishing an in-service state and a parked state, said bicycle including elastic means for urging said saddle toward the parked position, said saddle being supported such that it can be manually moved from the parked position to the in-service position against the force of said elastic means;

a first locking device for locking said saddle in the parked position;

a second locking device adapted to be actuated in operative connection with movement of said saddle from the in-service position to the parked position for locking the bicycle in the non-running state; and connecting means which transmits to the second locking device the movement of the saddle from the in-service position to the parked position, said connecting means being disposed inside the bicycle frame.

4. A bicycle with an antitheft device, comprising:

a bicycle frame;

front and rear wheels supported by said bicycle frame;

a handlebar supported by said bicycle frame;

a saddle supported on a seat pillar installed on said bicycle frame, and a stand for supporting said bicycle frame and other components, wherein said saddle is attached to said seat pillar such that it can be fixed at two positions establishing an in-service state and a parked state;

elastic means for urging said saddle toward the parked position, said saddle being supported such that it can be manually moved from the parked position to the in-service position against the force of said elastic means;

an engagement device for maintaining the saddle in the in-service position, said engagement device requiring no key to release said saddle from the in-service position for moving the saddle to the parked position; and a first locking device for locking said saddle in the parked position, said first locking device being constructed such that it can be locked by the urging force of said elastic means and requires a key only when it is desired to undo the lock.

5. A bicycle with an antitheft device, comprising:

a bicycle frame;

front and rear wheels supported by said bicycle frame;

a handlebar supported by said bicycle frame;

a saddle supported on a seat pillar installed on said bicycle frame; and a locking device for locking the bicycle in a non-running state, wherein a key section for said locking device is disposed under said saddle and connecting means for transmitting the operation of said key section to the locking device is disposed inside the bicycle frame, the arrangement being such that operating said key section actuates said locking device.

6. A bicycle with an antitheft device, comprising:

a bicycle frame;

a rear wheel supported by said bicycle frame and connected to transmission means including a pedal and a crank; a front wheel supported by said bicycle frame;

a handlebar supported by said bicycle frame;

a saddle supported on a seat pillar installed on said bicycle frame, a locking device for locking the bicycle in a non-running state, and a key section connected with said locking device disposed in a movable section of the bicycle and connecting means for transmitting to the locking device the movement of said movable section to a parked position is disposed inside a seat tube of the bicycle frame, the arrangement being such that said locking device is actuated in operative connection with the movement of said movable section to the parked position.

7. A bicycle with an antitheft device, comprising:

a bicycle frame;

a rear wheel supported by said bicycle frame and connected to transmission means including a pedal and a crank; a front wheel supported by said bicycle frame;

a handlebar supported by said bicycle frame;

a saddle supported on a seat pillar installed on said bicycle frame;

a locking device for locking the bicycle in the non-running state;

a key section disposed in the vicinity of said saddle; and connecting means for transmitting the operation of said key section to the locking device disposed inside a seat tube of the bicycle frame, wherein an operation of said key section establishes an operative connection between the fixing of a movable section of said bicycle and the actuation of said locking device, the center of said seat tube and the center of rotation of said crank being in a non-crossing state.

8. A bicycle with an antitheft device, comprising:

a bicycle frame;

a rear wheel supported by said bicycle frame and connected to transmission means including a pedal and a crank;

a front wheel supported by said frame;

a handlebar supported by said bicycle frame;

a saddle supported on a seat pillar installed on said bicycle frame; and a locking device for locking the bicycle in a non-running state;

a key section disposed in the vicinity of said saddle; and connecting means for transmitting operation of said key section to the locking device disposed inside a seat tube of the bicycle frame, wherein operation of said key section actuates said locking device, and the interior of said seat tube being non-circular so as to prevent the seat pillar of any saddle in general use from being inserted therein.

9. A bicycle with an antitheft device, comprising:

a bicycle frame;

a rear wheel connected to transmission means including a pedal and a crank supported by said bicycle frame;

a front wheel supported by said bicycle frame;

a handlebar supported by said bicycle frame;

a saddle supported on a seat pillar installed on said bicycle frame, wherein the saddle is supported with respect to the seat pillar such that the saddle is movable between an in-service state and a parked state with a saddle seat surface inclined and such that said saddle can be stopped at such positions, said bicycle including a key device for locking the saddle in said parked state, and fixing means for fixing the seat pillar within said bicycle frame in operative connection with the movement of the saddle from the in-service state to the parked state.

\* \* \* \* \*